United States Patent
Danyi et al.

(10) Patent No.: US 11,379,475 B2
(45) Date of Patent: Jul. 5, 2022

(54) ANALYZING TAGS ASSOCIATED WITH HIGH-LATENCY AND ERROR SPANS FOR INSTRUMENTED SOFTWARE

(71) Applicant: Splunk Inc., San Francisco, CA (US)

(72) Inventors: Gergely Danyi, San Jose, CA (US); Steven Flanders, Nashua, NH (US); Joseph Ari Ross, Redwood City, CA (US); Justin Smith, San Francisco, CA (US); Eric Wohlstadter, Atherton, CA (US); Chengyu Yang, Menlo Park, CA (US)

(73) Assignee: Splunk Inc., San Francisco, CA (US)

( * ) Notice: Subject to any disclaimer, the term of this patent is extended or adjusted under 35 U.S.C. 154(b) by 156 days.

(21) Appl. No.: 16/858,477

(22) Filed: Apr. 24, 2020

(65) Prior Publication Data

US 2020/0257680 A1    Aug. 13, 2020

Related U.S. Application Data

(63) Continuation-in-part of application No. 16/757,354, filed as application No. PCT/US2019/058398 on Oct. 28, 2019.

(Continued)

(51) Int. Cl.
- *G06F 16/245* (2019.01)
- *G06F 11/34* (2006.01)
- *G06F 11/30* (2006.01)

(52) U.S. Cl.
CPC .......... *G06F 16/245* (2019.01); *G06F 11/302* (2013.01); *G06F 11/3495* (2013.01)

(58) Field of Classification Search
None
See application file for complete search history.

(56) References Cited

U.S. PATENT DOCUMENTS

9,792,231 B1 * 10/2017 Thompson ............. H04L 67/10
10,303,586 B1 * 5/2019 Falko .................. G06F 11/3636
(Continued)

OTHER PUBLICATIONS

Buthmann. "Making Sense of Mann-Whitney Test for Median Comparison". Six Sigma. Snapshot taken Apr. 8, 2016 via Archive.org. URL Link: <http://www.isixsigma.com/tools-templates/hypothesis-testing/making-sense-mann-whitney-test-median-comparison/>. Accessed Jan. 2022. (Year: 2016).*

(Continued)

*Primary Examiner* — Irene Baker

(57) ABSTRACT

A computer-implemented method for analyzing spans and traces associated with a microservices-based application executing in a distributed computing environment comprises aggregating a plurality of ingested spans associated with one or more applications executing in the distributed computing environment into a plurality of traces, wherein each of the plurality of ingested spans is associated with a plurality of tags. The method further comprises comparing durations of a set of related traces of the plurality of traces to determine patterns for the plurality of tags and generating a histogram that represents a distribution of the durations of the set of related traces. The method also comprises providing alerts for one or more tags from the plurality of tags associated with traces having a duration above a threshold based on the distribution of the durations.

20 Claims, 36 Drawing Sheets

Related U.S. Application Data

(60) Provisional application No. 62/751,486, filed on Oct. 26, 2018.

(56) References Cited

U.S. PATENT DOCUMENTS

| | | | | |
|---|---|---|---|---|
| 10,880,191 B1* | 12/2020 | Kant | ............... | G06F 11/3447 |
| 2009/0177928 A1* | 7/2009 | Bradley | ............... | G06F 11/364 |
| | | | | 714/45 |
| 2012/0101800 A1* | 4/2012 | Miao | ............... | G06F 11/3692 |
| | | | | 703/22 |
| 2012/0260135 A1* | 10/2012 | Beck | ............... | G06F 11/323 |
| | | | | 714/E11.181 |
| 2017/0323329 A1* | 11/2017 | Katariya | ............... | G06N 7/005 |

OTHER PUBLICATIONS

Basu et al. "Toward Web Service Dependency Discovery for SOA Management", 2008. IEEE. 978-0-7695-3283-7/08. DOI 10.1109/SCC.2008.45. p. 422-429. URL Link: <https://ieeexplore.ieee.org/document/4578551>. (Year: 2008).*

Haibo Mi et al., "Localizing root causes of performance anomalies in cloud computing systems by analyzing request trace logs", Science China Information Sciences, SP Science China Press, Heidelberg, vol. 55, No. 12, Dec. 29, 2012 (Dec. 20, 2012), pp. 2757-2773.

Parker Austin et al., "Distributed Tracing in Practice", Apr. 13, 2020 (Apr. 13, 2020), O'Reilly Media, Inc.

* cited by examiner

| Time 535 | Host 536 | Source 537 | Source Type 538 | Event 539 |
|---|---|---|---|---|
| 531 — 10/10/2000 1:55 p.m. | www1 | access.log | access_combined | 127.0.0.1 - frank [10/Oct/2000:13:55:36-0700] "GET/apache.gif HTTP/1.0" 200 2326 0.0947<br>540  541  542  545<br>543 |
| 532 — 10/10/2000 1:56 p.m. | www2 | access.log | access_combined | 127.0.0.1 - bob [10/Oct/2000:13:56:36-0700] "GET/mickey_mouse.gif HTTP/1.0" 200 2980 0.0899<br>546 |
| 533 — 10/10/2000 1:57 p.m. | www2 | access.log | access_combined | 127.0.0.1 - carlos [10/Oct/2000:13:57:36-0700] "GET/donald_duck.gif HTTP/1.0" 200 2900 0.0857 |
| 534 — 10/10/2000 1:58 p.m. | www2 | error.log | apache_error | [Sunday Oct 10 1:58:33 2010] [error] [client 127.10.1.1.015] File does not exist: /home/reba/public_html/images/daffy_duck.gif |

FIG. 5C

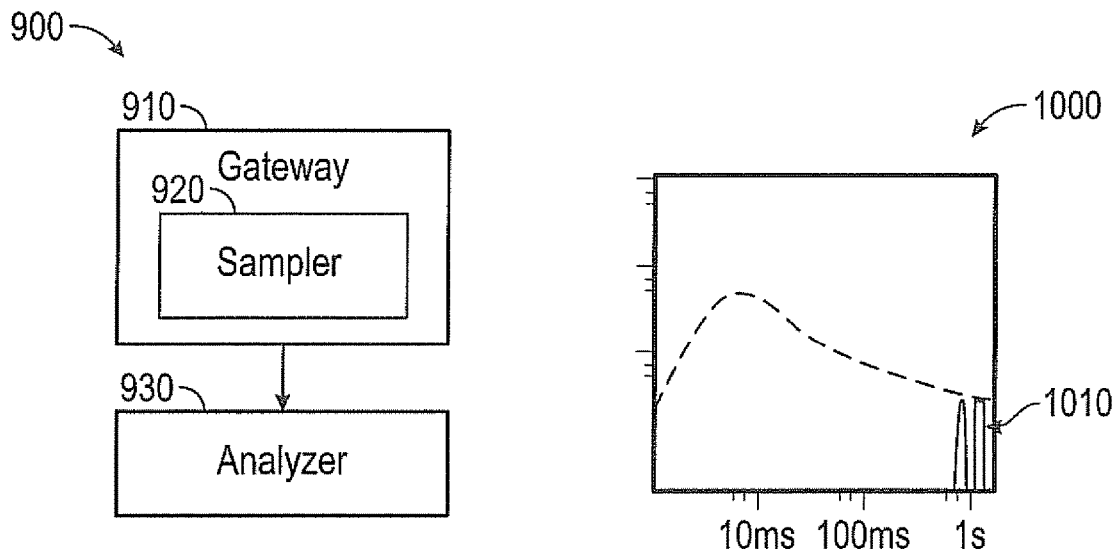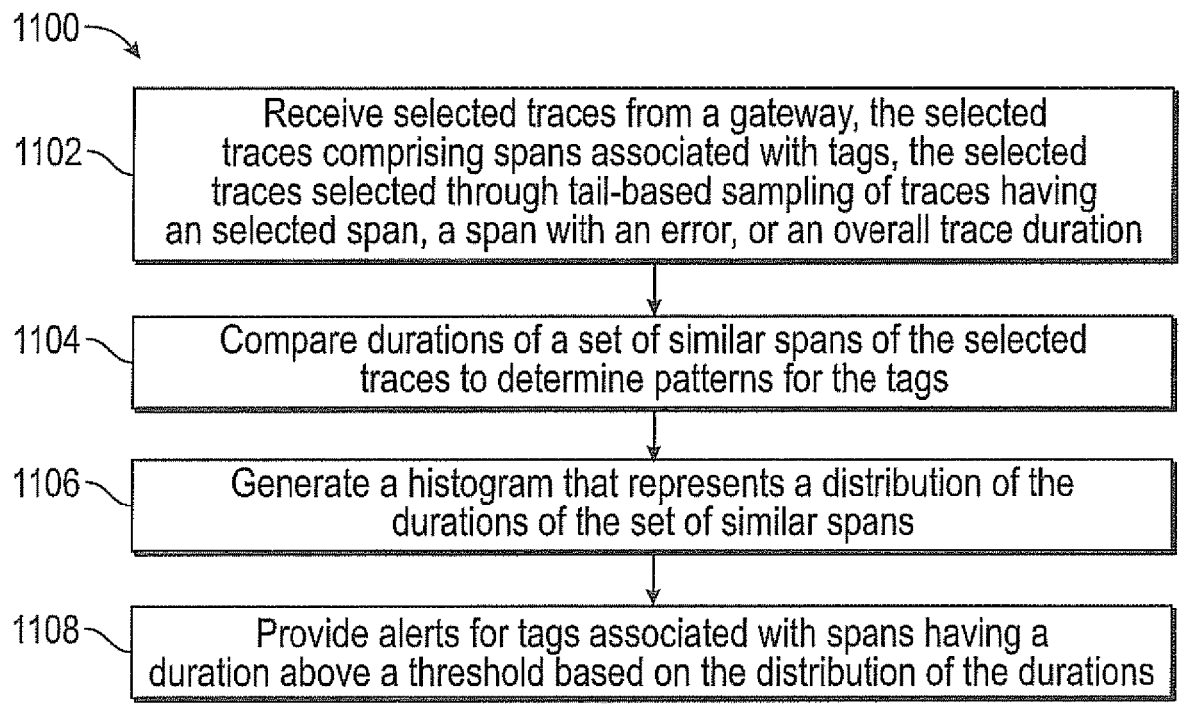

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

2290 — (first data row)
2292 — (second data row)

FIG. 22

Node_Health Exemplars:

| svc_name | env | pod | code | operation | trace_ids | Exemplar type |
|---|---|---|---|---|---|---|
| frontend | prod | frontend-dalluytgq-dd58f | 200 | /product | "ff0558ae875a250e" | request |
| product catalog service | prod | productcatalongservice-18iodsfh27-r234t | 200 | /GetProduct | "ff0558ae875a250e" | request |

2395 2396 2330 2390 2391

Edge_Health Exemplars:

| from service name | to service name | from pod | to pod | from operation | to operation | trace_ids | Exemplar type |
|---|---|---|---|---|---|---|---|
| frontend | product catalog service | frontend-dalluytgq-dd58f | product catalog service-18iodsfh27-r234t | /Product | /GetProduct | "ff0558ae875a250e" | request |

| | |
|---|---|
| ✓ Type | Select a condition for this alert |
| 2. Alert signal | |
| 3. Alert condition | ◯ Static Threshold |
| | Sudden Change |
| 4. Alert settings | |
| 5. Alert message | Alert when error rate goes above specified threshold. Learn more |
| 6. Alert recipients | When to use |
| 7. Activate... | Works well when a specific error rate threshold is known. |
| | [ Proceed To Alert Settings ] |

| | |
|---|---|
| ✓ Type | Select a condition for this alert |
| 2. Alert signal | |
| 3. Alert condition | ◯ Static Threshold — 2513 |
| | Sudden Change — 2514 |
| 4. Alert settings | Historical Anomaly — 2515 |
| 5. Alert message | Alert when latency spikes compared to cyclical periods in the past. Learn more |
| 6. Alert recipients | When to use |
| 7. Activate... | Works well for services that have patterns that repeat over known fixed periods of time, i.e., daily, weekly or seasonal usage patterns. |
| | [ Proceed To Alert Settings ] |

| | | 2588 |
|---|---|---|
| ✓ | Type | Customize the settings for this alert<br>Alert trigger: Latency in the last 10m is more than 5 deviations above the norm established in the preceding 1h. Clears when latency is less than 4 deviations above the norm. Learn more |
| ✓ | Alert signal | ALERT SETTINGS   SIMULATED EVENTS   DATA TABLE |
| ✓ | Alert condition | Trigger sensitivity ⓘ     ⊙ Low  ○ Medium  ○ High  ○ Custom<br>High advanced settings<br>Signal resolution — 2575 |
| | 4. Alert settings | Alert based on              [Deviations from norm ∨]  — 2583<br>Current window ⓘ           [10m]                        — 2584<br>Historical window ⓘ         [1h]                         — 2535<br>Trigger threshold ⓘ         [5]                          — 2586<br>Clear threshold ⓘ           [4]                          — 2587<br>Exclude errors? ⓘ           [Yes ∨]<br>Min. req/sec (absolute) ⓘ   [0]                          — 2589<br>Min. req/sec (% of history) ⓘ [20]  [%]                  — 2591 |
| | 5. Alert message | |
| | 6. Alert recipients | |
| | 7. Activate... — 2576 | [Proceed To Alert Message] |

FIG. 25D

ANALYZING TAGS ASSOCIATED WITH HIGH-LATENCY AND ERROR SPANS FOR INSTRUMENTED SOFTWARE

CROSS-REFERENCE TO RELATED APPLICATIONS

The present application is a continuation-in-part of U.S. application Ser. No. 16/757,354, entitled "TRACE AND SPAN SAMPLING AND ANALYSIS FOR INSTRUMENTED SOFTWARE," filed Apr. 17, 2020, by Ross et al., which claims priority to International Application No. PCT/US19/058398, entitled "TRACE AND SPAN SAMPLING AND ANALYSIS FOR INSTRUMENTED SOFTWARE," filed Oct. 28, 2019, by Ross et al., which in turn claims priority to U.S. Provisional Application No. 62/751,486, entitled "TRACE AND SPAN SAMPLING AND ANALYSIS FOR INSTRUMENTED SOFTWARE," filed Oct. 26, 2018, by Ross et al., all of which are hereby incorporated by reference in their entirety.

TECHNICAL FIELD

The present disclosure generally relates to analysis of instrumented software, and more particularly to trace and span sampling and analysis for instrumented software.

BACKGROUND

Software developers monitor different aspects of software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, among others. After development, similar aspects of the software are also monitored during production, such as when software is being executed on a cloud architecture.

Computing operations of the instrumented software can be described by spans and traces. However, communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

BRIEF SUMMARY

The subject disclosure provides for systems and methods for trace and span analysis for instrumented software. Each span may be annotated with one or more tags that provide context about an executed task, such as a user instrumenting the software, a document involved in a request, an infrastructure element used in servicing a request, etc. According to embodiments of the present disclosure, up to 100% of incoming spans transmitted from instrumented client applications may be ingested into an instrumentation analysis system. A latency analyzer comprised within the instrumentation analysis system may be configured to uncover patterns relating trace tags to trace durations (e.g., the histogram/distribution of trace durations), and thereby highlight possible explanations for degraded system performance. For example, the histogram associated with patterns relating trace tags to trace durations may allow an application owner to determine whether slow and longer duration traces are associated with a particular customer (whose requests may be unusually large or somehow malformed).

More specifically, according to embodiments of the present invention, the instrumentation analysis system may be configured to compare durations of a set of similar spans (e.g., spans for the same type of request) with the tags associated with these spans. The analysis system may then determine whether there are any patterns for a given tag. The analysis system generates a histogram that represents a distribution of durations for a set of spans.

According to embodiments of the present invention, the instrumentation analysis system also comprises an error analyzer, which may be configured to uncover patterns relating span tags to error spans, which are spans that cause an error or an exception to be thrown. This can highlight possible explanations for errors and help users understand patterns among errors. For example, the analysis system may determine if error spans tend to come from a particular user (e.g., whose requests might be somehow malformed).

Embodiments of the present invention also allow a client to store and analyze the trace data using multiple modalities of analysis, wherein each analysis modality extracts a different level of detail from the plurality of spans associated with the plurality of traces.

According to one embodiment of the present disclosure a computer-implemented method for analyzing spans and traces associated with a microservices-based application executing in a distributed computing environment is presented. The method comprises aggregating a plurality of ingested spans associated with one or more applications executing in the distributed computing environment into a plurality of traces, wherein each of the plurality of ingested spans is associated with a plurality of tags. The method further comprises comparing durations of a set of related traces of the plurality of traces to determine patterns for the plurality of tags and generating a histogram that represents a distribution of the durations of the set of related traces. The method also comprises providing alerts for one or more tags from the plurality of tags associated with traces having a duration above a threshold based on the distribution of the durations.

According to one embodiment of the present disclosure, a system for analyzing spans and traces associated with a microservices-based application executing in a distributed computing environment is presented. The system comprises at least one memory having instructions stored thereon and at least one processor configured to execute the instructions, wherein the at least one processor is configured to: a) aggregate a plurality of ingested spans associated with one or more applications executing in the distributed computing environment into a plurality of traces, wherein each of the plurality of ingested spans is associated with a plurality of tags; b) compare durations of a set of related traces of the plurality of traces to determine patterns for the plurality of tags; c) generate a histogram that represents a distribution of the durations of the set of related traces; and d) provide alerts for one or more tags from the plurality of tags associated with traces having a duration above a threshold based on the distribution of the durations.

According to one embodiment of the present disclosure, a non-transitory computer-readable storage medium comprising instructions stored thereon, which when executed by one or more processors, cause the one or more processors to perform operations for analyzing spans and traces associated with a microservices-based application executing in a distributed computing environment comprising aggregating a plurality of ingested spans associated with one or more applications executing in the distributed computing environment into a plurality of traces, wherein each of the plurality of ingested spans is associated with a plurality of tags. The operations further comprise comparing durations of a set of related spans of the plurality of spans to determine patterns for the plurality of tags and generating a histogram that represents a distribution of the durations of the set of related spans. Further, the operations comprise providing alerts for one or more tags from the plurality of tags associated with spans having a duration above a threshold based on the distribution of the durations.

BRIEF DESCRIPTION OF THE DRAWINGS

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 9 shows an example of a system for sampling and analyzing spans and traces of instrumented software, according to an embodiment of the present disclosure;

FIG. 10 illustrates a generated histogram for analysis of spans and traces, according to an embodiment of the present disclosure; and FIG. 11 is a flow diagram illustrative of an embodiment of a process for sampling and analyzing spans and traces of instrumented software, according to embodiments of the present disclosure.

FIG. 22 is a table illustrating an exemplary manner in which selected tags for each service in a cross-service span pair may be mapped to tag attributes and stored as part of a memory-resident data object associated with an edge in the service graph, in accordance with embodiments of the present invention.

FIG. 23C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an embodiment of the present invention.

FIG. 25B is an exemplary on-screen GUI showing the manner in which a client may configure a condition associated with the error alert configured in FIG. 18A, in accordance with embodiments of the present invention.

FIG. 25C is an exemplary on-screen GUI showing the manner in which a client may configure a condition associated with a latency-based alert, in accordance with embodiments of the present invention.

FIG. 25D is an exemplary on-screen GUI showing the manner in which a client may configure alert settings associated with a latency-based alert, in accordance with embodiments of the present invention.

DETAILED DESCRIPTION

Figure 1:
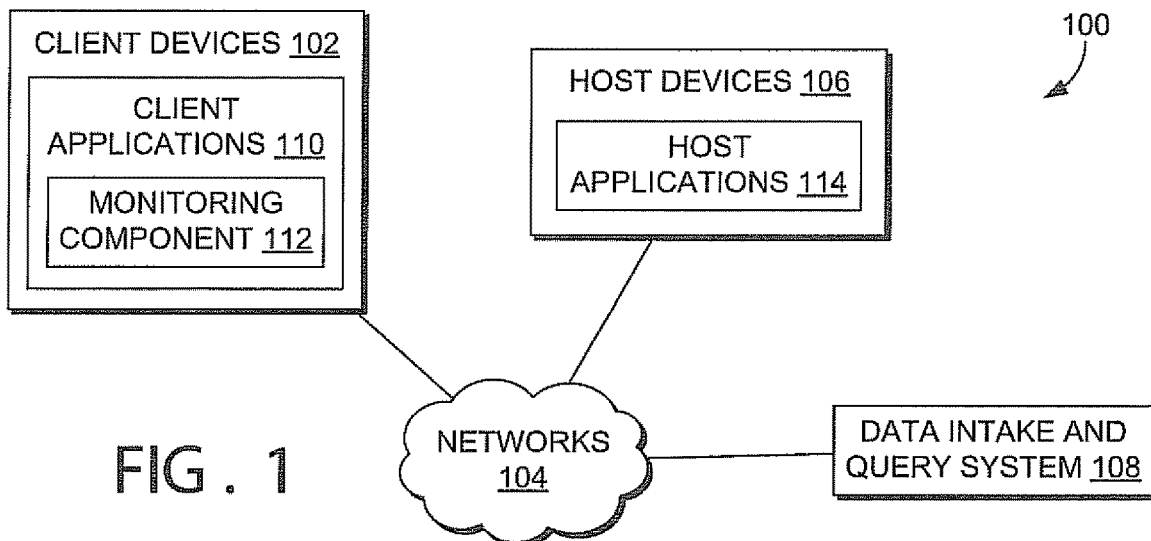
FIG. 1 is a block diagram of an example networked computer environment, in accordance with example embodiments.

Embodiments are described herein according to the following outline:
1.0. General Overview
2.0. Operating Environment
2.1. Host Devices
2.2. Client Devices
2.3. Client Device Applications
2.4. Data Server System
2.5 Cloud-Based System Overview
2.6 Searching Externally-Archived Data
2.6.1. ERP Process Features
2.7. Data Ingestion
2.7.1. Input
2.7.2. Parsing
2.7.3. Indexing
2.8. Query Processing
2.9. Pipelined Search Language
3.0. Trace and Span Sampling and Analysis for Instrumented Software
3.1. System for Reporting Based on Instrumented Software
3.2. Sampling Traces and Spans of Instrumented Software
3.3. Analyzing Traces and Spans of Instrumented Software
4.0 Multiple Modalities For Storing and Analyzing Data
4.1 Metric Time Series
4.1.1 Generating Metric Data Streams Using Span Identities
4.1.2 Real-Time Monitoring Using Metric Time Series Data
4.2 Metric Events
4.2.1 Metric Events Data Generation and Persistence
4.3 High-Fidelity Data
5.0 Application Performance Monitoring (APM) Detectors
5.1 Alert Configuration
5.2 Application of Alert Details
6.0 Analyzing Tags Associated with High-Latency Spans and Error Spans For Instrumented Software
6.1 Analyzing Tags Associated with High-Latency Spans
6.2 Analyzing Tags Associated with Error Spans
7.0 Terminology 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters forms a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
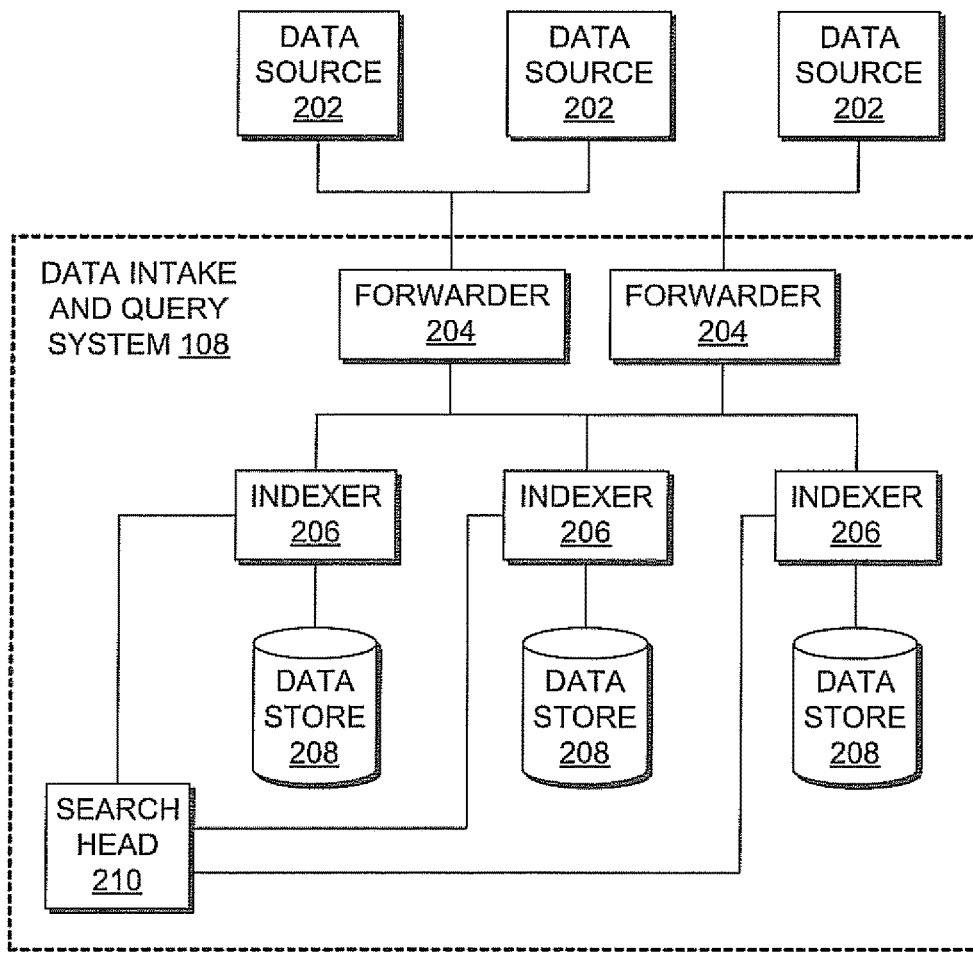
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 206 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
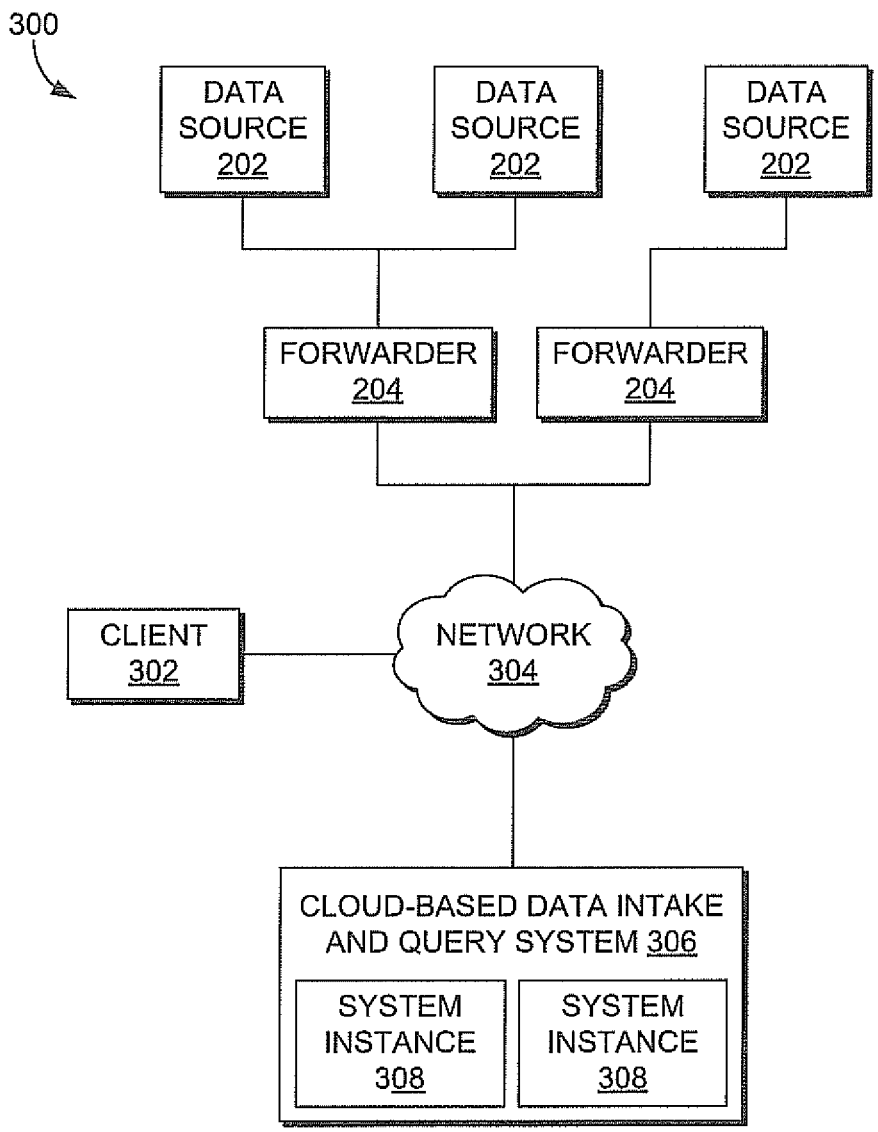
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.5.1 Containerized, Stateless Cloud-Based System Overview

As shown in the previous figures, various embodiments may refer to a data intake and query system 108 that includes one or more of a search head 210, an indexer 206, and a forwarder 204. In other implementations, data intake and query system 108 may be implemented in a cloud-based system, such as cloud-based data intake and query system 306, as shown in FIG. 3. In some implementations, the cloud-based data intake and query system have a different architecture, but may carry out indexing and searching in a way that is similar to and in some ways functionally equivalent from the perspective of the end user. For example, cloud-based data intake and query system 306 may be re-architected to run in a stateless, containerized environment. In some of these embodiments, cloud-based data intake and query system 306 may be run in a computing cloud provided by a third party, or provided by the operator of the cloud-based data intake and query system 306. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of the cloud-based data intake and query system 306.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system. In some embodiments, the cloud-based data intake and query system may be multi-tenant, so that containerized search and indexing may be done across multiple tenants.

2.6. Searching Externally-Archived Data

Figure 4:
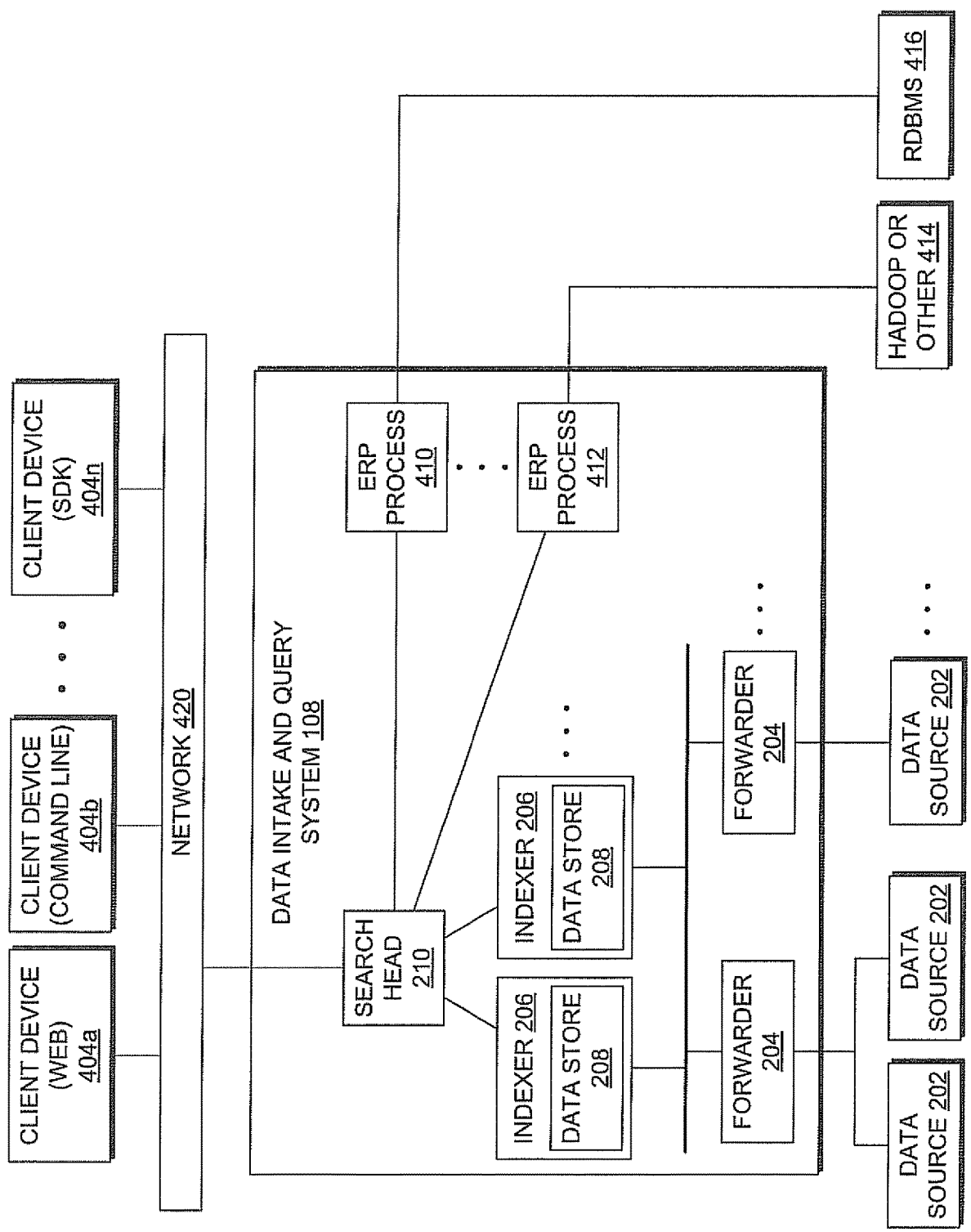
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b . . . 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1

May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
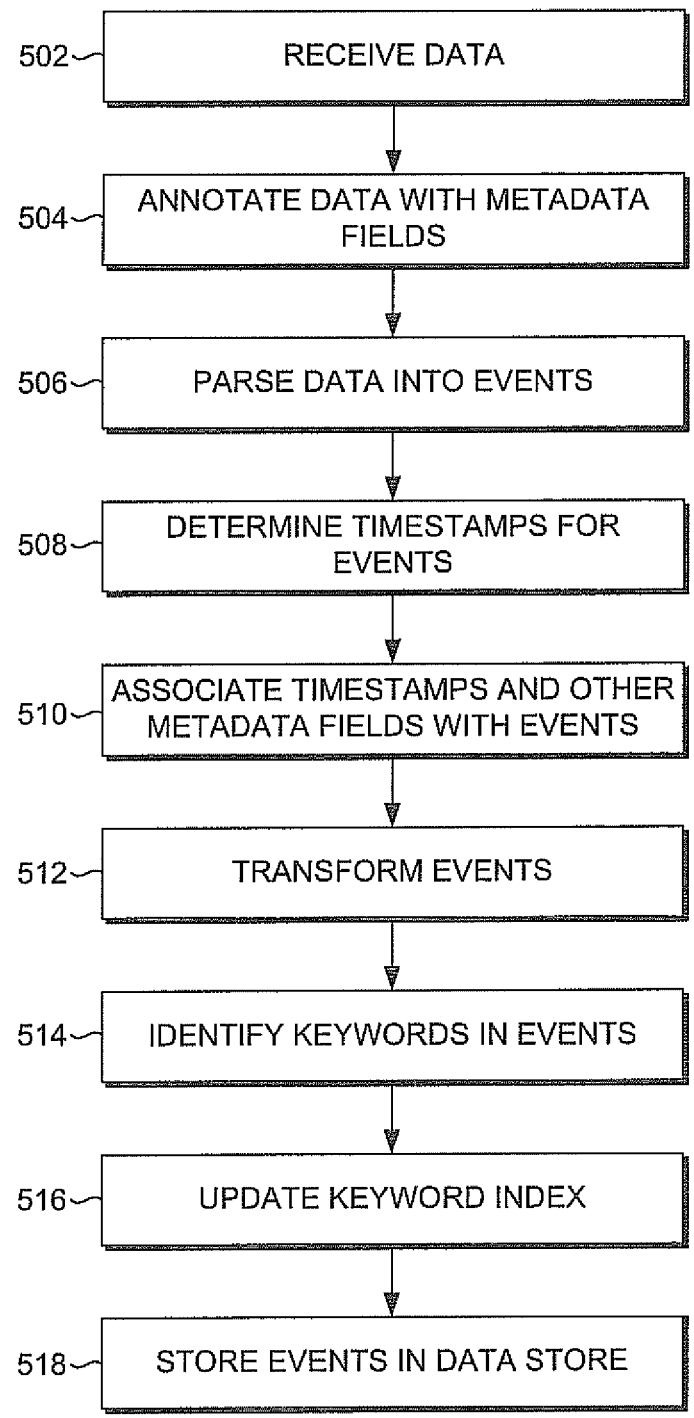
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Components and Protocols for Receiving Data

In various embodiments, forwarders 204 may communicate with indexers 206 via one or more data transfer protocols. Although any number of data transfer protocols may be used, in some implementations, forwarders 204 communicate with indexers 206 through use of a binary protocol referred to as "S2S" or "Splunk-to-Splunk" protocol. S2S protocol specifies that, after the forwarder 204 and indexer 206 connect over a network via a port, e.g., a Transmission Control Protocol (TCP) port, the forwarder 204 sends a message to the indexer 206 describing the S2S protocol features it would like to use. In response, the indexer 206 responds with a message that describes the S2S protocol features that have been accepted for network communication with the forwarder 204, based on the feature request description from forwarder 204. These requests may include, for example, per-event ACK (acknowledgement) payloads, or various compression algorithms used to reduce the size of events to be transferred. After the forwarder 204 receives notification of the features that will be used in communicating with indexer 206, the forwarder 204 begins sending serialized objects in binary format. The objects may include one or more events and/or various metadata associated with the events. The objects may be compressed using various compression algorithms, or otherwise packaged, reduced, or encrypted. In some embodiments, each event may be compressed separately, and in other embodiments, packages of events may be compressed together. In other embodiments, the S2S protocol may be used by forwarders 204 to send information to any receiving component of the data intake and query system 108, including, e.g., components of the cloud-based data intake and query system 306.

In various embodiments, other data transfer protocols may be used to transmit data from the one or more data sources 102 into the data intake and query system. Specifically, in various embodiments, it may be advantageous to set up protocols for transmitting data into the data intake and query system without requiring the use of forwarders 204. Thus, there are embodiments in which the HyperText Transfer Protocol (HTTP) can be used to transmit data from data sources 102 to the data intake and query system. In order to facilitate use of HTTP to transmit this data, various embodiments of data intake and query system 108 may include an HTTP Event Collector, or "HEC." The HEC is an agent that is part of the data intake and query system 108, and which can receive information sent from data sources 102. Use of the HEC has the advantage of generally not requiring any additional components, either hardware or software, to be added to or installed on the data sources 102, beyond what is required to send messages using HTTP "POST" commands.

In various embodiments, the HEC operates at the data intake and query system 108 to receive HTTP POST requests from various sources, e.g., data sources 102. The HEC begins the process through generation of tokens, which can be distributed to the data sources 102 through a variety of known methods, both manual and automated. A data source 102 can access the HEC by sending an HEC token to the HEC, e.g., through the authentication header of an HTTP POST request. Once this token is recognized by the HEC, the data source 102 can send data in any format to the HEC, using the HTTP POST command. Although any type of data can be sent to the HEC through an HTTP POST command, in various implementations, event data may be submitted, either in raw text format, or in JavaScript Object Notation (JSON) format. In various implementations, events sent in the JSON format may include metadata, such as one or more of a timestamp of the event, a host name of the event, a source of the event, and a sourcetype of the event. Upon receipt of the data from the HTTP POST command, the HEC may send the data to an indexer 206, or, for example, in a cloud-based data intake and query system 306, place the data in an ingestion buffer, such as a message-oriented pub/sub or a stream processor.

2.7.3. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-533 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 531-533 in the data store.

Event 534 is associated with an entry in a server error log, as indicated by "error.log" in the source column 537 that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.4. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=-10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
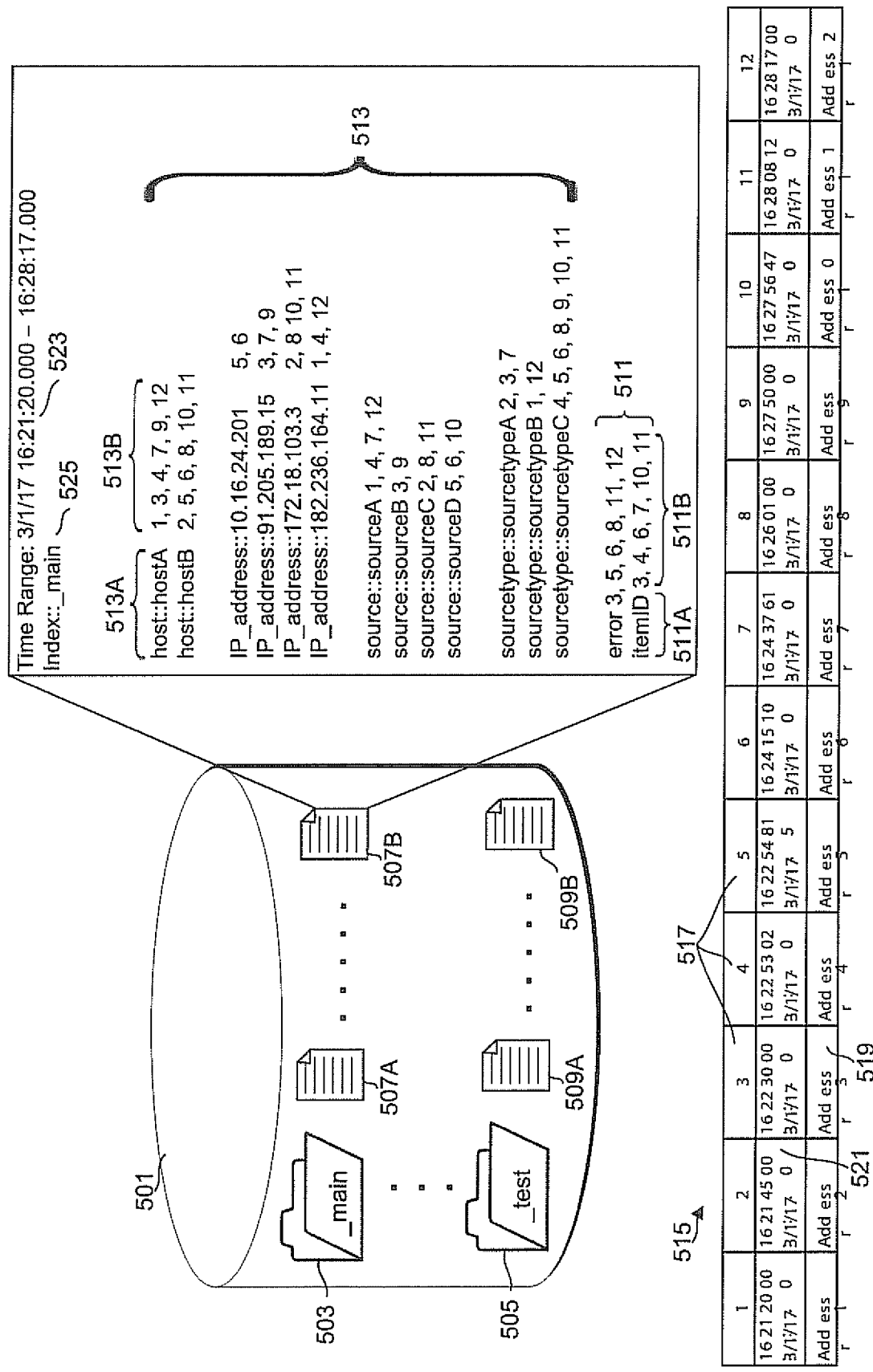
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, and/or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example, if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 515 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source:: sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with a partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 515 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
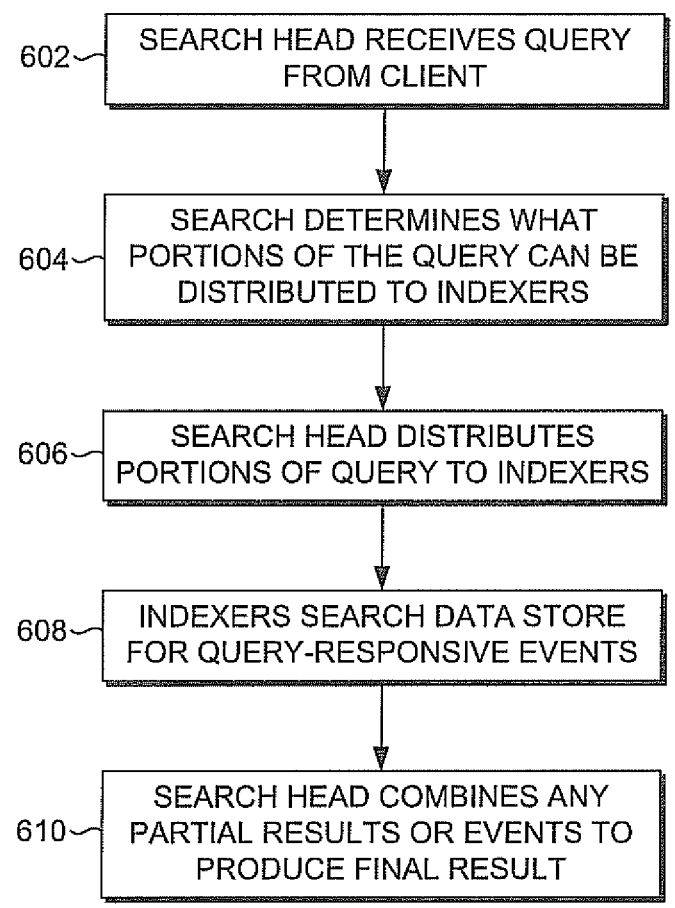
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "I". In such embodiments, a set of data, such as a set of events, can be operated on by a first SPL command in the sequence, and then a subsequent SPL command following a pipe symbol "I" after the first SPL command operates on the results produced by the first SPL command or other set of data, and so on for any additional SPL commands in the sequence. As such, a query formulated using SPL comprises a series of consecutive commands that are delimited by pipe "I" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
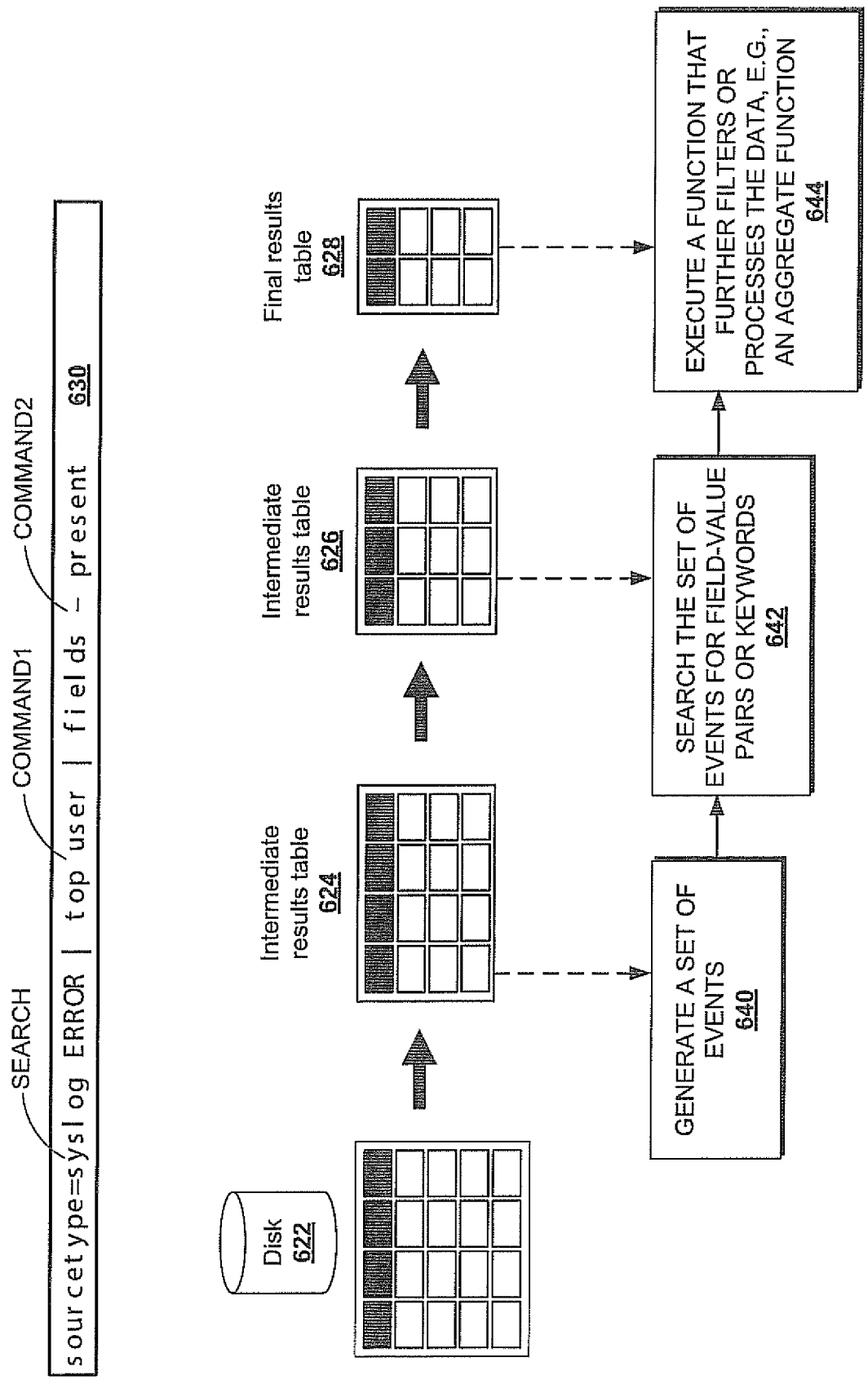
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

3.0. Trace and Span Sampling and Analysis for Instrumented Software

Software developers monitor different aspects of software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, and so on. After development, similar aspects of the software are also monitored during production, for example, when software is being executed on a cloud architecture.

Computing operations can be described by spans and traces. As used herein, a "span" is an atomic computing operation performed in handling a request, and may include an operation name (e.g., "start"), a service (e.g., "analytics"), and start and end timestamps. Spans may be annotated with additional tags, such as key:value pairs, that provide further context regarding the execution environment. As used herein, a "trace" is a set of spans traversed in the handing of a single request.

According to embodiments, each span and trace may have a duration equal to the difference between the start and end timestamps for the span, or for the group of span forming the trace. Instrumented software may be instrumented to emit spans and traces. The spans and traces can be generated according to an industry standard, such as the OpenTracing standard. Each span may be annotated with one or more tags that provide context about the execution, such as the user instrumenting the software, a document involved in the request, an infrastructure element used in servicing a request, etc.

Communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

To obtain a sample of traces that includes a higher proportion of interesting traces, a gateway performs tail-based sampling of traces. The gateway resides at the instrumented software, receives all emitted spans and traces, and in real or near-real time, selects traces to transmit to an analysis system. For example, the gateway selects a portion of traces that include an interesting span (e.g., selecting for spans with long durations), a portion of traces that include a span with an error, and a portion of traces selected based on overall trace duration. The gateway may select spans and traces using a statistical model that references a reservoir of spans and traces. The gateway maintains in the reservoir a collection of duration values that describe the distributions of durations for recently received traces and recently received spans, and the span or trace distribution is used to calculate a score for each received span or trace. Each emitted trace has a chance of being selected, but the gateway favors selecting longer or unusual spans and traces. Each selected trace is associated with a weight indicating the likelihood that the trace is stored according to the statistical model.

The gateway may use a dynamic timeout mechanism to determine when a trace is complete. For example, the dynamic timeout mechanism may include both a fixed duration (e.g., 100 ms) and a variable duration that is calculated based on durations of other traces. If a trace reaches the larger of the fixed duration and the variable duration, it is considered complete and passed through the sampling mechanism in the gateway. The reservoir of recently received traces may be used to calculate the variable duration; for example, the variable duration may be, for example, five times the 99$^{th}$ percentile duration for a trace or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

The analysis system receives the traces selected by the gateway and performs analysis on the selected traces. The analysis system may derive a distribution of all of the emitted spans and traces (not just the selected traces) based on the weights. The analysis system may receive traces, with their component spans and associated tags, from multiple instances of instrumented software.

In an embodiment, the analysis system compares durations of a set of similar spans (e.g., spans for the same type of request) with the tags associated with these spans and determines whether there are any patterns for a given tag. The analysis system generates a histogram that represents a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-value less than or equal to some threshold, e.g., 0.01.

In another embodiment, the analysis system uncovers patterns relating span tags to error spans, which are spans that cause an error or exception to be thrown. This can highlight possible explanations for errors and help users understand patterns among errors. For example, the analysis system can determine if error spans tend to come from a particular user (whose requests might be somehow malformed). To analyze errors, the analysis system computes, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analysis system may correct the p-value for the number of hypotheses tested, for example by multiplying the p-value by the total number of tags. This procedure defines a map from tags to non-negative real numbers. The analysis system sorts the tags by the associated p-value (in ascending order) and returns those with p-value less than or equal to some threshold, e.g., 0.01.

The disclosed system addresses a problem in traditional data analysis of instrumented software tied to computer technology, namely, the technical problem of infrastructure data storage cost. The disclosed system solves this technical problem by providing a solution also rooted in computer technology, namely, by providing for tail-based sampling and analysis of instrumented software that includes a higher proportion of traces of interest. The disclosed subject technology further provides improvements to the functioning of the computer itself because it reduces the cost of data storage on the infrastructure.

3.1. System for Reporting Based on Instrumented Software

Figure 7:
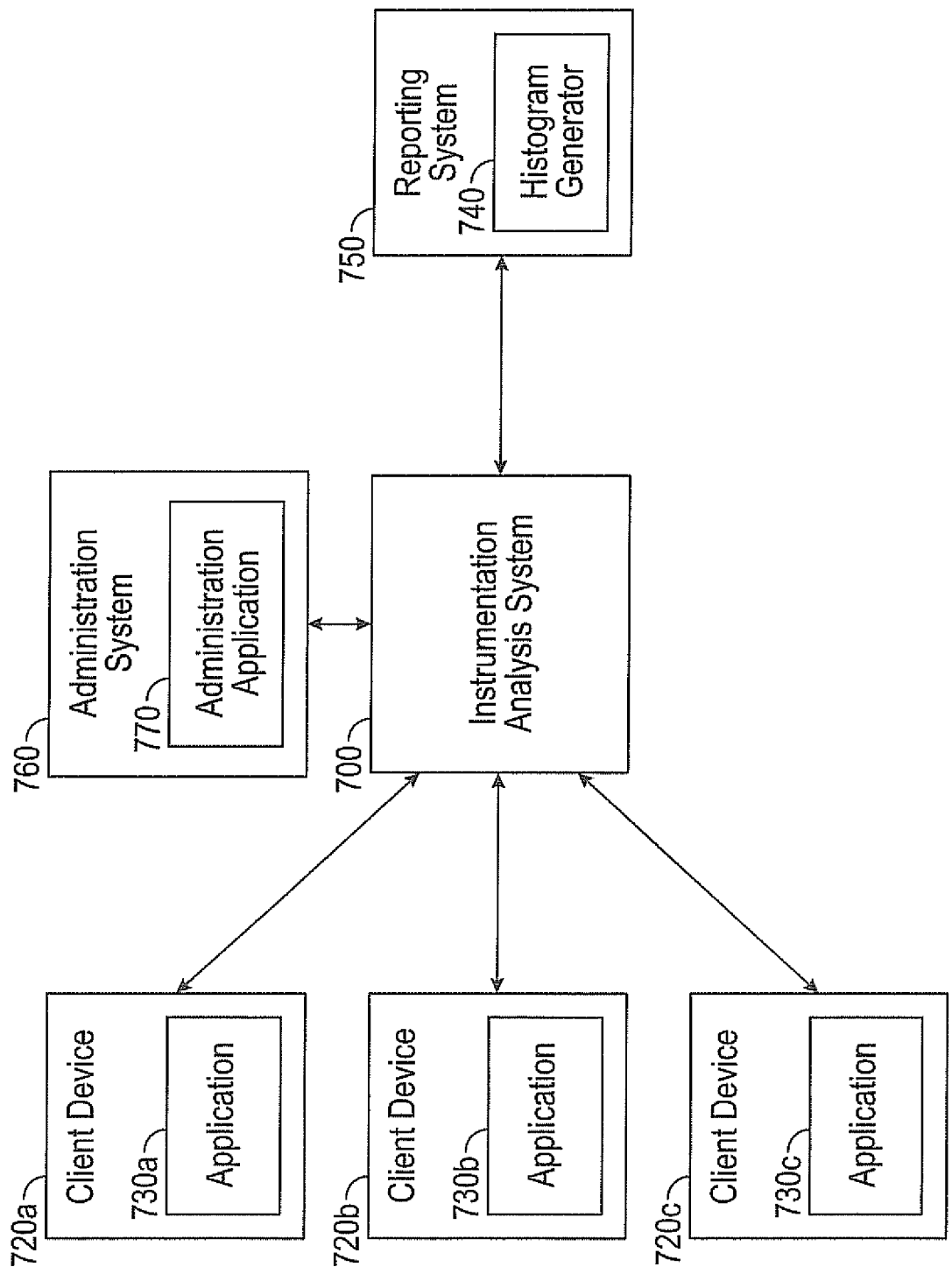
FIG. 7 shows an overall system environment for reporting based on instrumented software, according to an embodiment of the present disclosure.

FIG. 7 shows the overall system environment for reporting based on instrumented software, according to an embodiment. The overall system environment includes an instrumentation analysis system 700, one or more client devices 720, an administration system 760, and a reporting system 750. In other embodiments, more or less components than those indicated in FIG. 7 may be used. For example, client devices 720, administration system 760, and reporting system 750 may interact with instrumentation analysis system 700 via a network (not shown in FIG. 7). Furthermore, there may be more or less instances of each system shown in FIG. 7, for example, there may be multiple reporting systems 750.

FIG. 7 and the other figures use like reference numerals to identify like elements. A letter after a reference numeral, such as "730*a*," indicates that the text refers specifically to the element having that particular reference numeral. A reference numeral in the text without a following letter, such as "730," refers to any or all of the elements in the figures bearing that reference numeral (e.g., "730" in the text refers to reference numerals "730*a*" and/or "730*b*" in the figures).

The instrumentation analysis system 700 receives data comprising values of metrics sent by different client devices 720 (e.g., the instrumentation analysis system 700 may also be referred to herein as an analysis system or a data analysis system. A client device 720 executes instrumented software, for example, application 730. Although, application 730 is shown in FIG. 7 as an example of instrumented software, the techniques disclosed herein are not limited to application software but are applicable to other kinds of software, for example, server software, software executing on customer devices, websites, and so on. Furthermore, a client device 720 may include any computing system that is configured to execute instrumented software, whether or not it is used for development of improved software. For example, the client device 720 may be a computing system used for testing purposes, staging purposes, or any production system executing in an enterprise.

The software executing on a client device 720 is configured to send information generated as a result of instrumenting the software to instrumentation analysis system 700. For example, the application 730 may send values corresponding to various metrics as they are generated to instrumentation analysis system 700. The application 730 may send group values of metrics and send them periodically to instrumentation analysis system 700. Different applications 730 may send the same metric or different metrics at different rates. The same application may send different metrics at different rates. In an implementation, the application 730 may send data to the instrumentation analysis system 700 by invoking an application programming interface (API) supported by the instrumentation analysis system 700.

A gauge comprises instructions to measure certain runtime characteristics of the application 730, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 700 periodically.

A software program may be instrumented to generate spans with a common field in their data structures to designate spans that are part of a common trace. For example, the spans may include a trace identifier such that spans with the same trace identifier are a part of the same trace. A length of each trace may be determined by an administrator through the administration system 760.

The administration system 760 allows a privileged user, for example, a system administrator to associate data streams with metadata. The administration system 760 comprises the administration application 770 that provides a user interface for a system administrator to specify the metadata. The metadata comprises properties, for example, name-value pairs. The instrumentation analysis system 700 receives metadata describing data streams and stores the metadata. The ability to specify metadata describing data streams independently from the data received from each data stream provides several benefits in generating reports based on the data stream.

As an example, the instrumentation analysis system 700 can receive modifications to metadata describing each data stream without requiring any modifications to the instrumented software of the application 730. As a result, the instrumentation analysis system 700 receives specifications of new reports and modifications to existing reports and generates results based on the new/modified reports without requiring the developers to modify applications 730.

Furthermore, the instrumentation analysis system 700 can also receive and process reports built on top of existing reports by composing existing reports and adding new analytics functionality. The instrumentation analysis system 700 generates results of the new reports and sends them for presentation in real-time as the instrumentation analysis system 700 receives data streams from instrumented software. The instrumentation analysis system 700 generates these additional reports and modifies existing reports without requiring any modifications to the instrumented code of application 730.

Furthermore, the instrumentation analysis system 700 provides separation of the metadata describing the data streams from the data of the data streams. Accordingly, the amount of data that needs to be transmitted from the client devices 720 to the instrumentation analysis system 700 is reduced. Each application 730 transmits only the data values of the metrics and information identifying the metric. The metadata information is received separately from a source independent of the data source of the data streams. Accordingly, any amount of metadata may be introduced without increasing the amount of data of each data stream.

The reporting system 750 may be configured to generate a histogram to analyze generated spans and traces. In an implementation, the reporting system 750 may include a histogram generator 740 that interacts with the instrumentation analysis system 700 to generate a histogram.

The reporting system 750 can be a conventional computer system (e.g., a desktop or laptop computer), a tablet, or a device having computer functionality such as a personal digital assistant (PDA), a mobile telephone, a smart phone or another suitable device. The reporting system 750 interacts with instrumentation analysis system 700 via a network. The network may comprise any combination of local area and/or wide area networks, using both wired and/or wireless communication systems. In one embodiment, the network uses standard communications technologies and/or protocols.

The instrumentation analysis system 700 may be hosted on a computing system that includes one or more processors, memory, secondary storage and input/output controller. The computing system used for hosting the instrumentation analysis system 700 is typically a server class system that uses powerful processors, large memory, and fast input/output systems compared to a typical computing system used, for example, as a reporting system 750.

In an embodiment, data from several client devices 720 may be consolidated, for example, by a server and the combined data sent to the instrumentation analysis system 700. For example, an enterprise may install a server that receives data stream internally from different client devices 720 and sends the combined data in a batch form to the instrumentation analysis system 700 periodically. This allows efficiency of external communication from the enterprise.

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in a metadata store. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name.) For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on. According to embodiments, each data stream may include spans and traces.

As another example of a dimension, a system may define customer name as a dimension. The name of the customer may be reported by the instrumented software, for example, based on the configuration parameters of the instrumented software executing on a client device 720. The customer name may be specified for the instrumented software using a system property. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on.

A data stream may be obtained from instrumented software or may be generated as a result of execution of blocks of a data stream language program within the instrumentation analysis system. A data stream may also comprise data stored in the instrumentation analysis system, for example, in a data store, such as a time series data store 860 described herein.

Figure 8:
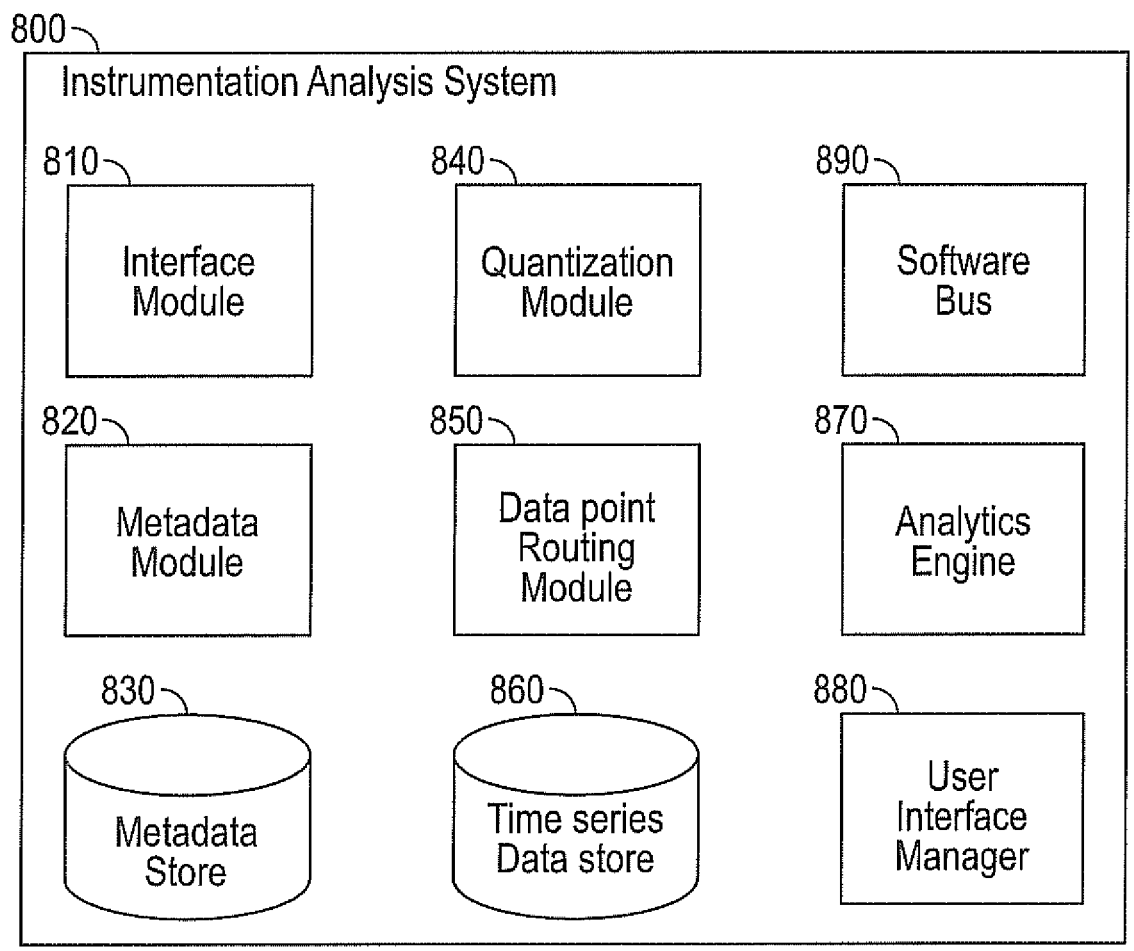
FIG. 8 shows an architecture of a system for processing data streams received from instrumented software, according to an embodiment of the present disclosure.

FIG. 8 shows an architecture of a system for processing data streams received from instrumented software, according to an embodiment. The instrumentation analysis system 700 includes an interface module 810, a quantization module 840, metadata module 820, metadata store 830, a data point routing module 850, an analytics engine 870, a user interface manager 880, a time series data store 860, and software bus 890. In other embodiments, the instrumentation analysis system 700 may include other modules not described herein. Functionality indicated as provided by a particular module may be implemented by other modules instead.

The interface module 810 receives requests from external systems, for example, client devices 720 that communicate with the instrumentation analysis system 700. The interface module 810 supports various application programming interfaces (APIs) that external systems can invoke. The interface module 810 can receive and process data provided by applications 730 that are instrumented using functionality provided by different vendors, so long as the instrumented code sends the information in a format that can be processed by the interface module 810.

The interface module 810 receives data in the form of data streams comprising spans and traces from one or more client devices 720. In an embodiment, the interface module 810 receives data and represents the incoming data as tuples. Accordingly, each data stream is represented as a plurality of tuples, each tuple representing a data point. A tuple of data received by the interface module 810 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 730 sending the data, one or more properties associated with the data.

In an embodiment, the timestamp associated with a tuple represents the time that the data value was received by the instrumentation analysis system 700. The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 810 generates and assigns an identifier to records received by the interface module 810. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 700.

The metadata module 820 receives and stores metadata information describing various data streams received from the client devices 720. In an embodiment, the metadata stored in the metadata module 820 is received from a user, for example, a system administrator interacting with the instrumentation analysis system 700 using the administration system 760.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata store 830 stores the metadata objects and their associations with the data streams. The metadata store 830 stores an identifier (ID) for each metadata object and the properties represented by the metadata object. In an embodiment, each data stream is associated with a time series identifier that uniquely identifies the data stream. The metadata store 830 stores an index that maps each metadata object to a set of time series identifier values. The metadata store 830 may receive instructions to modify a metadata object. For example, the metadata store 830 may receive instructions to modify, add or delete some properties represented by a metadata object. Alternatively, the metadata store 830 may receive instructions to modify the mapping from a metadata object to a data stream. For example, the metadata store 830 may receive instructions to associate a data stream with a metadata object or delete an association between a metadata object and a data stream.

In an embodiment, the metadata store 830 is represented as a relational database but may be represented as any other type of database or data store. For example, the metadata store 830 may be a relational database storing tables that map metadata object IDs to time series IDs identifying data streams. Other database tables may store the properties associated with each metadata object as a mapping from metadata object ID to each property represented as a name-value pair.

The time series data store 860 stores data received from various sources, for example, client devices 720. The time series data store 860 is also referred to herein as time series database (or TSDB.) In an embodiment, the time series data store 860 also stores the time series data after the data is quantized. The time series data store 860 may also store rollup data for each time series. The time series data store 860 also stores results of various analytics requests, for example, results of various reports requested by user. The analytics engine 870 computes results for certain reports, for example, moving averages over intervals of time by combining data stored in the time series data store 860 with new data obtained as data stream from various sources.

The software bus 890 provides a mechanism for modules of the instrumentation analysis system 700 to provide data of data streams to other modules of the instrumentation analysis system 700. A data stream language program may send a data stream to the software bus 890. Other modules, for example, fetch modules, window modules, and so on can read the data from the software bus 890 and perform further processing on the data. For example, a data stream output of a data stream language program published on the software bus 890 may be identified by a find block of another data stream language program executing as a job.

3.2. Sampling Traces and Spans of Instrumented Software

Embodiments of the present disclosure provide for tail-based sampling of traces that satisfies three somewhat conflicting requirements: 1) sampling should prefer "interesting traces", 2) trace duration histograms should be reflective of the overall population, not only a persisted subpopulation, and 3) there should be minimal coordination between a sampler (e.g., a process that makes sampling decisions) and an analyzer (e.g., a process that calculates distributions). As used herein, "interesting traces" include traces that are instances of relatively infrequently occurring paths, have abnormally long durations, contain a span of abnormally long duration, or contain an error span.

FIG. 9 shows an example of a system 900 for sampling and analyzing spans and traces of instrumented software, according to an embodiment of the present disclosure. The system 900 may include a gateway 910 having a sampler 920. The gateway 910 may also be communicatively coupled to an analyzer 930.

To obtain a sample of traces that includes a higher proportion of interesting traces, the gateway 910 may be configured to perform tail-based sampling of traces through the sampler 920. In an implementation, the gateway 910 may reside at the instrumented software to receive all emitted spans and traces, and in real or near-real time, select traces to transmit to the analyzer 930. For example, the gateway 910 may be configured to select a portion of traces that include an interesting span (e.g., selecting for spans with long durations), a portion of traces that include a span with an error, and a portion of traces selected based on overall trace duration.

According to embodiments, the gateway 910 be configured to select spans and traces using a statistical model that references a reservoir of spans and traces. The gateway 910 may maintain in the reservoir a collection of duration values that describe distributions of durations for recently received traces and recently received spans. The span or trace distribution may then be utilized to calculate a score for each received span or trace. Each emitted trace has a chance of being selected, but the gateway 910 favors selecting longer or unusual spans and traces. Each selected trace may be associated with a weight indicating a likelihood that the trace is stored according to the statistical model.

According to embodiments, the gateway 910 may use a dynamic timeout mechanism to determine when a trace is complete. For example, the dynamic timeout mechanism may include both a fixed duration (e.g., 100 ms) and a variable duration that is calculated based on durations of other traces. For example, if a trace reaches the larger of the fixed duration and the variable duration, it is considered complete and passed through the sampling mechanism in the gateway. In an implementation, the reservoir of recently received traces may be used to calculate a variable duration. For example, the variable duration may be, five times the $99^{th}$ percentile duration for a trace, or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

According to embodiments, the statistical model may be included in the sampler 920. For example, the sampler 920 may configured to perform tail-based sampling of spans and traces according to an algorithm. The algorithm may include the following steps:

(1) Partition the set of spans by operation, service, and whether the span is an error, and maintain for each element s of the partition: an exponentially decaying reservoir of durations $R_s$, and an (exponentially weighted) estimate $c_s$ of the count of the span over some interval T. For example, s may be a tuple of (operation, service, error), where the error component is Boolean.

(2) Partition the set of traces by initiating span, initiating service, and (if present) HTTP method, and maintain for each element t of the partition: an exponentially decaying reservoir of durations $R_t$, and an (exponentially weighted) estimate $c_t$ of the count of the trace over some interval T.

(3) The algorithm takes as input a budget B of traces to keep per time interval T; and a decomposition $B=B_{trace}+B_{span}+B_{errorSpan}$, expressing how the budget will be divided. For example, B may be determined dynamically.

(4) During the first time interval T, keep spans and traces until the budget is exhausted. Use all spans and traces to estimate the counts and reservoirs.

(5) When, as is typical, $\Sigma s' \in (*,*, \text{False})^{c_s} > B_{span}$ (or similarly for other index sets), divide up $B_{span}$ among the various (non-erroneous) s using the heuristic that if span α is ten times more common than span β, span α should appear in the sampled set only twice as often as does span β. Let w: $R_{>0} \rightarrow R$ denote the function mapping x to $2^{log\ x}$, (e.g., log may be base 10). The span s is allocated $w(c_s)/\Sigma_{s'} w(c_{s'})$ of the budget $B_{span}$. Therefore the aim is to keep $B_{span} w(c_s) \Sigma_{s'} w(c_{s'})$ of these every time interval, and the baseline probability $p_s$ is $$\min\left(\frac{B_{span} w(c_s)}{c_s \Sigma_{s'} w(c_{s'})}, 1\right).$$

When $$\frac{B_{span} w(c_s)}{(c_s \Sigma_{s'} w(c_{s'}))} > 1,$$

re-allocate the unused budget among the other spans. Repeat the above for error spans and traces. This step (refreshing how the budget is allocated) is repeated once every time interval T.

(6) Span-level procedure. Use Rs to calculate the (exponentially weighted) percentile (expressed as a number between 0 and 1) of the duration of an instance of a span s, and denote this percentile by x; let $a_s$ denote the (unique) real number satisfying $a_s(1-\ln a_s)=p_s$ and keep the instance of this span with probability $\min(a_s(1-x), 1)$. Once the decision is made to keep a span, keep the containing trace. Incorporate the instance into $R_s$, $c_s$. The number $a_s$ is selected so that $$\int_0^1 \min\left(\frac{a_s}{1-x}, 1\right) dx = p_s,$$

(i.e., keep proportion $p_s$ overall). The sampling curve 1/(1−x) is selected to retain the same number of samples from the regions [0, 1/2], [1/2, 3/4], [3/4, 7/8], etc.

(7) Trace-level procedure and scoring. Use the procedure described in (6) (with $R_t$, $p_t$) to decide whether to keep a trace. If it is decided to keep the trace, annotate it with a count field with value the reciprocal of the probability, i.e., $1/\min(a_t (1-x), 1)$. Do this even if it was already decided to keep the trace because of the span-level procedure. Thus, traces kept for span-level reasons may or may not have the count field. According to embodiments, the field being absent will be interpreted as zero for the purposes of histogram estimation. During initialization/priming (the first time interval T), do not record a count. Incorporate the instance of the trace into $R_t$, $c_t$.

According to embodiments, a mechanism may be implemented to protect against retaining too many traces when an overall volume of traffic increases. As described above, the relation:

$$\frac{B_{span} w(c_s)}{\sum_{s'} w(c_{s'})}$$

may specify a target retention volume per unit time for the identity indexed by s. The baseline probability $p_s$ may dynamically adjusted during the time interval according to how much of this quantity has been consumed. If traffic increases during the beginning of the interval, the baseline $p_s$ will be lowered with the goal of retaining the target during the interval. For example, keeping $p_s$ would retain too many traces in this scenario. If traffic dips, the baseline will be correspondingly increased. There is essentially no adjustment when the traffic is steady and is distributed uniformly throughout the interval.

The analyzer 930 may then receive the tail-based samples of spans and traces to construct a histogram. According to embodiments, when constructing a histogram of trace durations, the analyzer 930 may use the count field to estimate the probability density function. In this way, any bias that may have been introduced by the sampler 920 may be negated. As a result, the persisted subpopulation will be biased towards the upper tail (e.g., as many samples in P50, P75 as in P0, P50), so the density function will lie above the persisted subpopulation towards the lower tail and below it towards the upper tail.

3.3. Analyzing Traces and Spans of Instrumented Software

According to embodiments, the analyzer 930 receives the traces selected by the gateway 910 and performs analysis on the selected traces. The analyzer 930 may derive a distribution of all of the emitted spans and traces (i.e., not just the selected traces) based on the calculated weights. In an implementation, the analyzer 930 may receive traces, with their component spans and associated tags, from multiple instances of instrumented software.

According to embodiments, the analyzer 930 may be configured to compare durations of a set of similar spans (e.g., spans for the same type of request) with the tags associated with these spans. The analyzer 930 may then determine whether there are any patterns for a given tag. The analysis system generates a histogram that represents a distribution of durations for a set of spans. For a given tag, the analyzer 930 may calculate a p-value indicating a likelihood that the ranks of the spans for that tag in the distribution arose by chance.

In an implementation, the analyzer 930 may calculate a Mann-Whitney U-statistic p-value that compares the ranks of the durations of the traces having the tag to the other traces in the distribution. For example, a larger U-statistic indicates that the spans for that tag skew rightward (e.g., that they tend to have long durations relative to other spans in the distribution).

The analyzer 930 may also be configured to provide alerts regarding the tags whose spans have a relatively long duration. This is because long duration spans may be indicative of configuration problems at the instrumented systems. The analyzer 930 may correct the p-value for the number of hypotheses tested. For example, the analyzer 930 may be configured to multiply the p-value by the total number of tags. In this way, a mapping of tags to non-negative real numbers may be defined. The analyzer 930 may then sort the tags by the associated p-value (e.g., in ascending order) and returns those with p-value less than or equal to a pre-defined threshold (e.g., 0.01).

According to embodiments, the analyzer 930 may be configured to uncover patterns relating span tags to error spans, which are spans that cause an error or an exception to be thrown. This can highlight possible explanations for errors and help users understand patterns among errors. For example, the analyzer 930 may determine if error spans tend to come from a particular user (e.g., whose requests might be somehow malformed). To analyze such errors, the analyzer 930 may compute, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analyzer 930 may correct the p-value for the number of hypotheses tested, for example by multiplying the p-value by the total number of tags. This procedure defines a map from tags to non-negative real numbers. The analyzer 930 sorts the tags by the associated p-value (in ascending order) and returns those with p-value less than or equal to a pre-defined threshold (e.g., 0.01).

FIG. 10 illustrates a generated histogram 1000 for analysis of spans and traces, according to an embodiment of the present disclosure. The histogram 1000 may be generated by querying stored traces through a user interface. As shown, the histogram 1000 illustrates latencies of the traces in a given time period. For example, the histogram 1000 may be right-skewed.

As discussed above, each trace is comprised of multiple spans, and each span may include tags (e.g., key:value pairs) that provide information regarding characteristics of the span (e.g., such as what hosts the span ran on, or the user that made the request). For each trace, all of the tags on all of the spans that make up that trace may be accumulated. A comparison may then be made between traces containing a specific tag with traces not containing the specific tag. For example, distributions of traces containing the specific tag may be compared with distributions not containing the specific tag to determine a difference between the distributions. A statistic may be calculated based on the determined difference for each comparison. The calculated statistics may then be compared with each other to determine which tags 1010 are most overrepresented on the right hand side of the distribution. For example, it may be determined that the presence of these tags 1010 (e.g., for traces that took longer than a second) correlate to a particular host or were requests made by particular user. With this information, steps may be taken to remedy the appropriate characteristic.

According to embodiments, the histogram 1000 uncovers patterns relating trace tags to trace durations (i.e., the histogram/distribution of trace durations), and thereby highlights possible explanations for degraded system performance (or slowness in steady state). For example, the histogram 1000 may be utilized to explain whether slow (i.e., longer duration) traces come from a particular customer, whose requests might be large or somehow malformed. The histogram may also be utilized to explain whether the slow traces tend to pass through the same (i.e., possibly overloaded or misconfigured) infrastructure.

In an implementation, an algorithm for analyzing the tail-based samples of spans and traces may be as follows:

(1) Given a collection of traces, associate with each trace the tags of all its constituent spans. This may be represented as a multimap of {key: {values} } because different spans in the same trace may have different values for the same key. For example, in a microservices environment, a trace will typically traverse many hosts.

(2) For every tag k:v, define T(k:v) to be those traces containing the tag on some span (i.e., the value v is in the set associated with the key k).

(3) For each tag, compute the p-value of the Mann-Whitney U-statistic comparing the ranks of the durations of the traces in T(k:v) (traces containing the tag) to the ranks of the durations of its complement (traces not containing the tag). A larger U-statistic corresponds to a smaller p-value, which corresponds to more rightward skew. This means traces with the tag are overrepresented among the slower traces. The statistic can be viewed as a measure of stochastic dominance. Correct the p-value for the number of hypotheses tested, for example by multiplying the p-value by the total number of tags.

(4) Altogether the procedure of the preceding paragraph defines a map from tags to non-negative real numbers. Sort the tags by the associated p-value (in ascending order) and return those with p-value less than or equal to a pre-defined threshold (e.g., 0.01).

According to embodiments, this algorithm may be integrated into a user interface that supports querying for and visualizing of trace data. The result is a list of tags, sorted by how overrepresented they are among the slower traces. The results can easily be used as filters to further refine the trace query. In particular, the procedure can be applied iteratively (e.g., using the first result until a certain dataset size is reached).

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 11 is a flow diagram illustrative of an embodiment of a process 1100 for sampling and analyzing spans and traces of instrumented software, according to embodiments of the present disclosure. For explanatory purposes, the steps of the example process 1100 are described herein as occurring in serial, or linearly. However, multiple instances of the example process 1100 may occur in parallel.

At step 1102, selected traces are received from a gateway. The selected traces may include spans associated with tags. The selected traces may be selected through tail-based sampling of traces having a selected span, a span with an error, or an overall trace duration. At step 1104, durations of a set of similar spans of the selected traces are compared to determine patterns for the tags. At step 1106, a histogram is generated that represents a distribution of the durations of the set of similar spans. At step 1108, alerts are provided for tags associated with spans having a duration above a threshold based on the distribution of the durations.

In an implementation, a gateway (e.g., gateway 910 of FIG. 9) may select traces based on a tail-based sampling algorithm. For example, a sampler (e.g., sampler 920 of FIG. 9) may be integrated with the gateway to execute the tail-based sampling algorithm. An analyzer (e.g., analyzer 930 of FIG. 9) may be configured to compare durations of similar spans to determine patterns for tags of the spans. The analyzer may further be configured to generate a histogram (e.g., histogram 1000 of FIG. 10) that represents a distribution of durations for the similar spans. The analyzer may further be configured to generate alerts based on tags associated with the spans to improve performance of the instrumented software.

According to embodiments, the tail-based sampling is based on a statistical model that references decaying reservoirs of spans and traces. According to embodiments, each selected trace is associated with a weight. According to embodiments, the selected traces include at least one of an infrequently occurring path, an abnormally long duration, a span of abnormally long duration, or an error span.

According to embodiments, the process 1100 further includes partitioning a set of spans based on at least one of an operation, a service, or an error, and partitioning a set of traces by at least one of an initiating span, an initiating service, or an HTTP method. According to embodiments, the process 1100 further includes calculating a score for each received span or trace.

According to embodiments, the process 1100 further includes defining a duration of each trace based on a dynamic timeout mechanism, the dynamic timeout mechanism including a fixed duration and a variable duration, the variable duration calculated based on durations of other traces. According to embodiments, the process 1100 further includes defining the duration of each trace based on a longer of the fixed duration and the variable duration According to embodiments, the process 1100 further includes calculating a Mann-Whitney U-statistic p-value to compare ranks of durations of traces having a specific tag to other traces in the distribution. According to embodiments, the process 1100 further includes sorting the tags by an associated p-value, and identifying tags with p-values less than or equal to a pre-defined threshold.

4.0 Multiple Modalities for Storing and Analyzing Data

As mentioned earlier, communicating all of the spans and traces produced by a software application to an analysis system and storing these spans and traces imposes a serious infrastructure cost. In certain embodiments, however, incurring the infrastructural cost is advantageous in order to be able to ingest up to 100% of all the incoming spans and traces into an analysis system (e.g., instrumentation analysis system 700) disposed within a cloud architecture, and configured, for example, within a Software as a Service (SaaS) based service offering. Ingesting up to 100% the incoming spans and traces improves the accuracy of the information computed, e.g., request, latency, error, and other statistical computations. Further, information pertaining to the spans and traces can be retained for further analysis. Accordingly, in an embodiment of the present invention, instead of sampling or selecting traces using a gateway and transmitting only select traces or metrics associated with the traces to the instrumentation analysis system 700, up to 100% of the spans generated by client devices 720 are transmitted to and ingested by the instrumentation analysis system 700 residing in a cloud architecture.

In one embodiment, therefore, an analyzer, e.g., analyzer 930 as described above receives and performs computations on all the spans from the instrumented client software instead of a select set of spans and/or metrics received from a gateway or sampler (e.g., gateway 910 and associated sampler 920). The analyzer 930 may also be configured within a SaaS based service offering implemented on a cloud architecture. As noted above, analyzer 930, among other things, may be configured to ingest up to 100% of the incoming spans and compare durations of a set of similar spans (e.g., spans for the same type of request) with the tags associated with these spans and generating a histogram that represents a distribution of durations for a set of spans. Further, analyzer 930 may be configured to provide alerts regarding the tags whose spans have a relatively long duration. Also, analyzer 930 may be configured to uncover patterns relating span tags to error spans, which are spans that cause an error or an exception to be thrown.

Historically, there have been several challenges associated with implementing an analytics tool such as an instrumentation analysis system 700 within a heterogeneous distributed system. One of the challenges associated with microservices architectures, for example, is efficiently ingesting and aggregating significant amounts of span and trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, embodiments of the present invention also allow clients of a monitoring platform the ability to ingest up to 100% of the spans and create streams of metric data using the ingested spans prior to consolidating the spans into traces (through a sessionization process). Note that a monitoring platform may, for example, comprise instrumentation analysis system 700, administration system 760 and reporting system 750. Alternatively, it may comprise one or more of the instrumentation analysis system 700, administration system 760 and reporting system 750. The metric time series provide valuable real-time information pertaining to services or endpoints within an application and also allow alerts to be configured to manage anomalous behavior on the endpoints.

Embodiments of the present invention also sessionize and store up to 100% of the spans received from the client in real time. Embodiments of the present invention comprise an ingestion streaming pipeline that is able to ingest and consolidate the incoming spans into traces, and is further able to use advanced compression methods to store the traces. Additionally, because incoming trace and span information may be efficiently ingested and aggregated in real time, a monitoring platform configured, in accordance with embodiments of the present invention, is able to advantageously convey meaningful and accurate information regarding throughput, latency and error rate (without the need for sampling) for the services in the microservices-based application. High-cardinality metrics pertaining to throughput, latency and error rate may be calculated with a high degree of accuracy because all incoming data is ingested into the instrumentation analysis system 700 and there is no data loss as a result of sampling.

Embodiments of the present invention further allow a client to store and analyze the trace data using multiple modalities of analysis. In one embodiment, a first modality comprise converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a user. Because the metric time series are created without paying a time penalty associated with sessionization, they can be used to perform real-time monitoring with sub-second resolution and generate alerts within two to three seconds if a condition is violated.

In one or more embodiments, a second modality of analysis sessionizes the incoming spans and supports deriving higher-cardinality metrics (as compared with metric time series data) for a selected set of indexed tags, e.g., user-selected tags, global tags of the trace, etc. over selected time durations (referred to herein as the "metric events modality"). This modality is particularly useful for clients that need accurate SLI information for a larger set of high-value indexed tags. The metric events modality enables developers to aggregate metrics that have been generated using the sessionized trace data to efficiently respond to queries submitted by a client. The aggregated metrics provide a user visibility into the performance of services within a microservices-based application. The metric events modality may deprioritize speed as compared to the metric time series to provide a user resolution into a larger set of indexed tags. As such, responses provided by the metric events modality are typically slightly slower (e.g., 45 seconds to 1 minute) as compared with the sub-second response rates of the metric time series.

In one or more embodiments, the metric events modality may also keep track of exemplary traces associated with a pre-configured set of indexed tags. The tags to be indexed may be pre-selected by the user or the monitoring platform. The Trace IDs may be used to retrieve the associated traces and analysis on the retrieved traces may be performed to generate more particularized information, e.g., span duration, span count, span workload percentage, etc. for each span in a given trace. In one embodiment, once the traces are retrieved, an analysis may be run on an arbitrary set of tags (in addition to the pre-configured indexed tags).

Additionally, in one or more embodiments, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data that was ingested by the monitoring platform without relying on sampling. The full-fidelity mode may sacrifice speed for accuracy, and may be used by clients that need a more thorough analysis of the services across every dimension or attribute.

In an embodiment, the three modalities may be supported by the monitoring platform simultaneously by storing ingested trace data using three different formats, wherein each format corresponds to one of the three available modalities of analysis. Note that embodiments of the present invention are not restricted to three discrete data sets. The data sets for the different modalities may overlap or may be saved as part of a single data set. When a user submits a query, the monitoring platform may determine which of the data sets is most suitable for addressing the query. Thereafter, the monitoring platform executes the query against the selected data set to deliver results to the user. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 12:
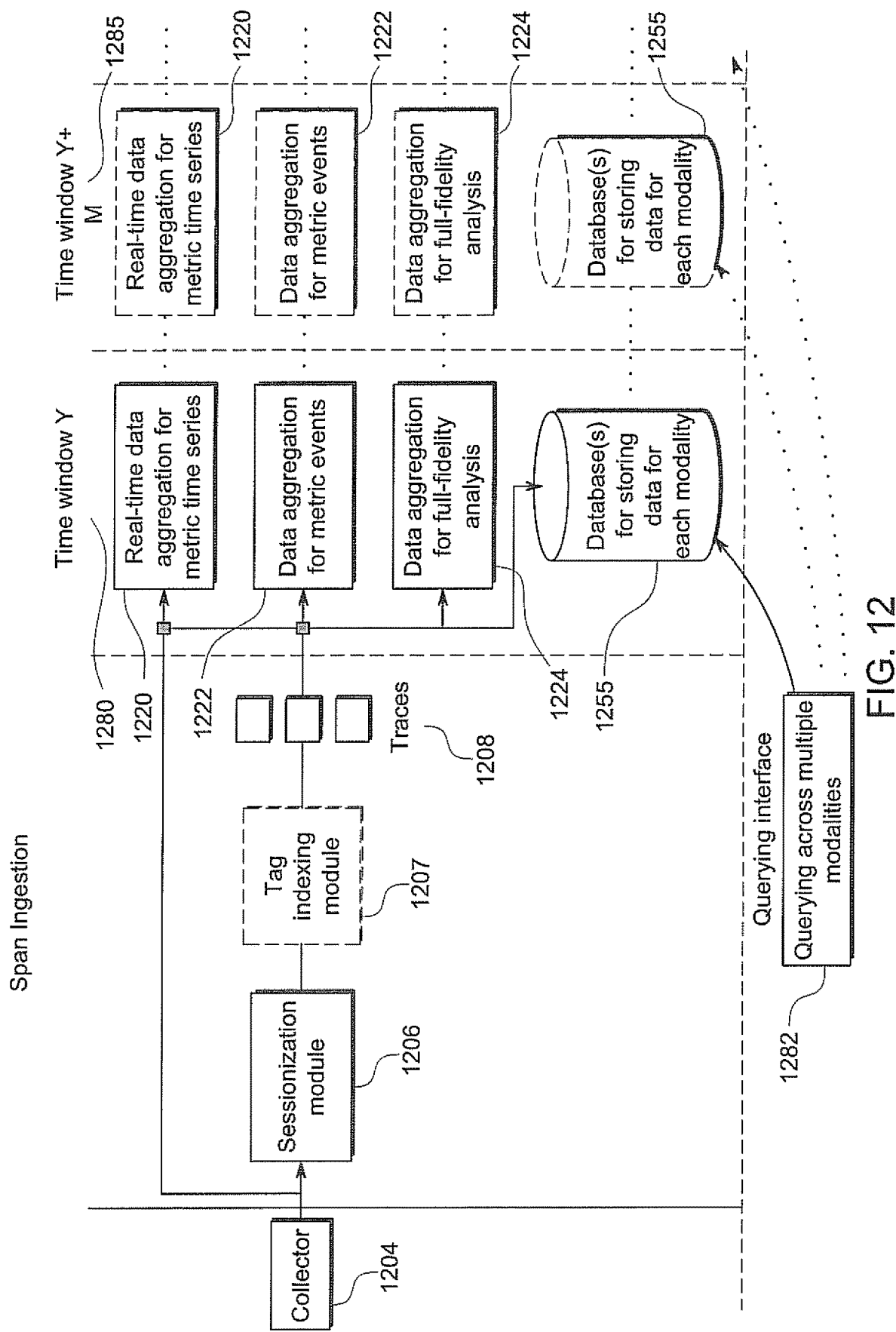
FIG. 12 is a flow diagram that illustrates an exemplary method of ingesting and aggregating span information to support multiple modalities of analysis, in accordance with embodiments of the present invention.

FIG. 12 is a flow diagram that illustrates an exemplary method of ingesting and aggregating span information to support multiple modalities of analysis, in accordance with embodiments of the present invention. Span information may be received from client devices 720 (shown in FIG. 7) or the spans may be collected from the client devices 720 by a collector 1204 (shown in FIG. 12) and transmitted to the monitoring platform.

In one embodiment, incoming spans from one or more clients are converted into a plurality of metric data streams prior to consolidating the spans into traces through a sessionization process. The incoming spans are received and the metric data streams are generated by module 1220 prior to the spans being sessionized. Because the metric time series are created without paying a time penalty associated with sessionization, they can be used to perform real-time monitoring and alerting.

The incoming spans are also sessionized where the span information is combined into traces in a process called sessionization. The sessionization module 1206 is responsible for stitching together or combining the traces 1208 using, among other things, the Trace IDs associated with each user-request (and typically also the Parent Span IDs of each span). Note that, in one embodiment, the sessionized traces may also be inputted to the module 1220 to create metric time series to track traces (separately from the time series created to track spans).

In addition to a Trace ID, each trace also comprises a time-stamp; using the time-stamps and the Trace IDs, the sessionization module 1206 creates traces 1208 from the incoming spans in real time and sessionizes them into discrete time windows. For example, the sessionization process may consolidate traces (from spans) within a first time window (associated with time window Y 1280) before transmitting the traces to modules 1220, 1222, or 1224. Thereafter, the sessionization process may consolidate traces within the subsequent time window (associated with time window "Y+M" 1285) before transmitting those traces to the modules 1220, 1222, or 1224. It should be noted that the time windows associated with each of the modules 1220, 1222, and 1224 may be different. In other words, the metric time series data may be collected over short time windows of 10 seconds each. By comparison, traces for the metric events modality (associated with the module 1222) may be collected over 10 minute time windows.

In some embodiments of the present invention, the sessionization module is able to ingest, process and store all or most of the spans received from client devices 720 (or through an associated collector, which collects all the spans from the client devices 720 and transmits them to the instrumentation analysis system 700). By comparison, conventional monitoring systems do not accept all of the incoming spans or traces; instead, they sample incoming spans (or traces) to calculate SLIs at the root level of a trace before discarding the spans. Embodiments of the present invention, by comparison, comprise an ingestion streaming pipeline that is able to ingest and consolidate all the incoming spans into traces in real time, and is further able to use advanced compression methods to store the traces. Further, embodiments of the present invention are able to generate metric time series from the span data (prior to sessionizing the spans) to provide real-time monitoring and alerting of certain KPIs.

As noted above, the sessionization module 1206 has the ability to collect all the traces within a first time window Y 1280 using the time-stamps for the traces. Subsequently, the sessionized traces are fed to the modules 1222 and 1224, for the respective modes (metric events and full-fidelity) for extraction and persistence.

In one embodiment, subsequent to consolidation, the trace data is indexed by an optional tag indexing module 1207, which indexes one or more tags in the trace data. The tags may be user-selected tags or tags that the monitoring platform is configured to index by default. In a different embodiment, tag indexing may be performed as part of data aggregation, e.g., by module 1222 associated with metric events.

In an embodiment, data sets associated with each of the modalities may be persisted in one or more databases 1255. As noted previously, the data sets for the respective modalities may be separate data sets, overlapping data sets or a single data set that supports all the modalities. Note that the databases 1255 may be a single database that stores data sets corresponding to all three modalities. Alternatively, the databases 1255 may represent different respective databases for each of the three modalities. Furthermore, the databases 1255 may also represent distributed databases across which relevant information for each of the three modalities is stored.

In one embodiment, data associated with each of the three modalities is generated at the time of ingestion and stored separately from each other. The structure, content, type or syntax of query submitted by a user will typically dictate which of the three modalities and corresponding data set will be selected. In one embodiment, an interface through which the query is submitted may also determine which of the three modalities and corresponding data set is selected. In an embodiment, there may be some commonality in the data for the three modalities in which case the storage for the data may overlap. An alternative embodiment may also comprise one or two of the three modalities (instead of all three) described above.

A client may send in a request to retrieve information pertaining to an application through query interface 1282. The underlying querying engine will analyze the structure, content, type and/or syntax of the query, and also the interface through which the query is submitted, to determine which of the three modalities and respective data set to access to service the query. In an embodiment, the three data sets corresponding to the three modalities are structured in a way that allows the querying engine to navigate between them fluidly. For example, a client may submit a query through the query interface 1282, which may potentially result in the query engine accessing and returning data associated with the metric events modality. Thereafter, if the client requires more in-depth information, the querying engine may seamlessly navigate to data associated with a different mode (e.g., full-fidelity) to provide the user with further details. Conventional monitoring systems, by comparison, do not provide more than a single modality or the ability to navigate between multiple modalities of data analysis.

4.1 Metric Time Series

Embodiments of the present invention allow trace data to be stored and analyzed using multiple modalities of analysis. In one embodiment, incoming spans from one or more clients are converted into a plurality of metric data streams (also referred to as metric time series) and transmitted to the analytics engine (e.g., the instrumentation analysis system 700) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a user. Because the metric time series are created without paying a time penalty associated with sessionization, they can be used to perform real-time monitoring with sub-second resolution and generate alerts within two to three seconds if some condition is violated.

4.1.1 Generating Metric Data Streams Using Span Identities

A client application associated with, for example, an online retailer's website may potentially generate millions of spans from which a monitoring platform may need to extract meaningful and structured information. To organize the significant amounts of incoming span data, in an embodiment, incoming spans may be automatically grouped by mapping each span to a base "span identity," wherein a base span identity comprises some key attributes that summarize a type of span. An exemplary span identity may be represented as the following exemplary tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some embodiments, the tuple used to represent the span identity may include other identifying dimensions as well. For example, if a user needs visibility into metadata tags from the spans in addition to the dimensions extracted for a base span identity by default (e.g., service, operation, kind, etc.), an extended identity may be created. An extended identity supports custom dimensionalization by a user, where dimensionalization refers to the ability to extract information pertaining to additional tags or metadata in a span. An extended identity provides a customer the ability to dimensionalize the span using pre-selected dimensions. Conventional methods of monitoring by comparison did not offer customers the flexibility to add custom dimensions to streams of metric data. An extended identity comprises the span's base identity and additionally a map of the span's tag key:value pairs that matched a user's configuration settings. An exemplary extended identity may be represented as the following exemplary tuple: {operation, service, kind, isError, httpMethod, isServiceMesh, keyValueMap . . . }, where the keyValueMap field represents one or more additional tags or dimensions configured by the user to be extracted as part of the span's identity, e.g., customer name, member ID, etc.

By extracting information related to additional tags, higher cardinality metrics may be computed using the metric time series modality. Further, a user is able to configure alerts on the custom dimensions as well, wherein the alerts inform a user if a particular dimension has crossed some critical threshold. In alternate embodiments of the present invention, the tuple used to represent a span's base or extended identity may contain fewer elements.

If the tuple of information of an incoming span happens to be the same as another span, both spans relate to the same identity. In an embodiment, spans with the same base identity may be grouped together. A fixed size bin histogram is generated for each span identity to track metrics associated with the span identity. In this way the same type of spans are organized together and the user can track one or more metrics associated with each group of spans sharing a common identity. In an embodiment, a fixed size bin histogram is generated for each unique span identity. The fixed size bin histogram may be a data structure, for example, that is preserved in memory.

As noted above, each span identity may be tracked with a respective histogram. The histograms associated with the corresponding span identities, in one embodiment, are generated and updated in fixed time duration windows. For example, histogram data may be generated for the incoming spans in memory every 10 seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in one embodiment, may be aggregated by a monitoring platform to provide a user meaningful information regarding the application being monitored.

Figure 13:
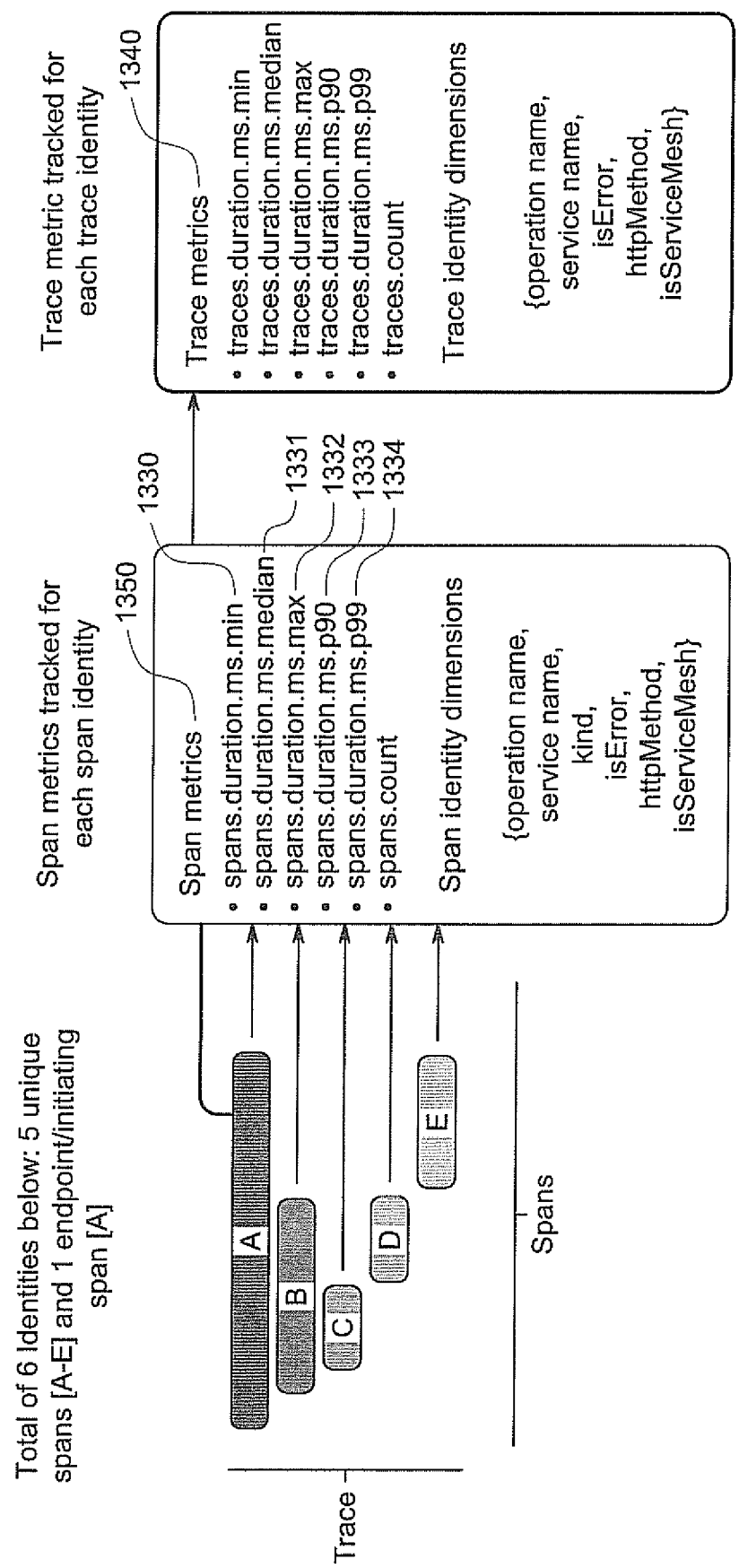
FIG. 13 illustrates the manner in which span metrics and trace metrics are generated, in accordance with embodiments of the present invention.

FIG. 13 illustrates the manner in which span metrics and trace metrics are automatically generated, in accordance with embodiments of the present invention. FIG. 13 illustrates 5 unique spans (A-E) including a root span (an initiating span) A. In an embodiment, each group of spans identified by the same span identity is associated with one or more span metrics 1350. For example, a minimum span duration 1330, a median span duration 1331, a maximum span duration 1332, a p90 latency value 1333, a p99 latency value 1334 and a span count (how many times a particular identity was counted) may be tracked for each span identity. A histogram corresponding to the span identity may track these metrics over fixed sized durations, e.g., 10 seconds. For example, over a 10 second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the user has configured additional metadata to be extracted from the spans.

As shown in FIG. 13, in an embodiment, the initiating span A comprises a trace identity that is used to emit trace metrics 1340. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An exemplary trace identity may be represented as the following exemplary tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 1340 are computed after the spans have been consolidated into a trace following a sessionization process. The trace metrics are also turned into streams of metric data similar to the metric time series associated with the spans.

Figure 14:
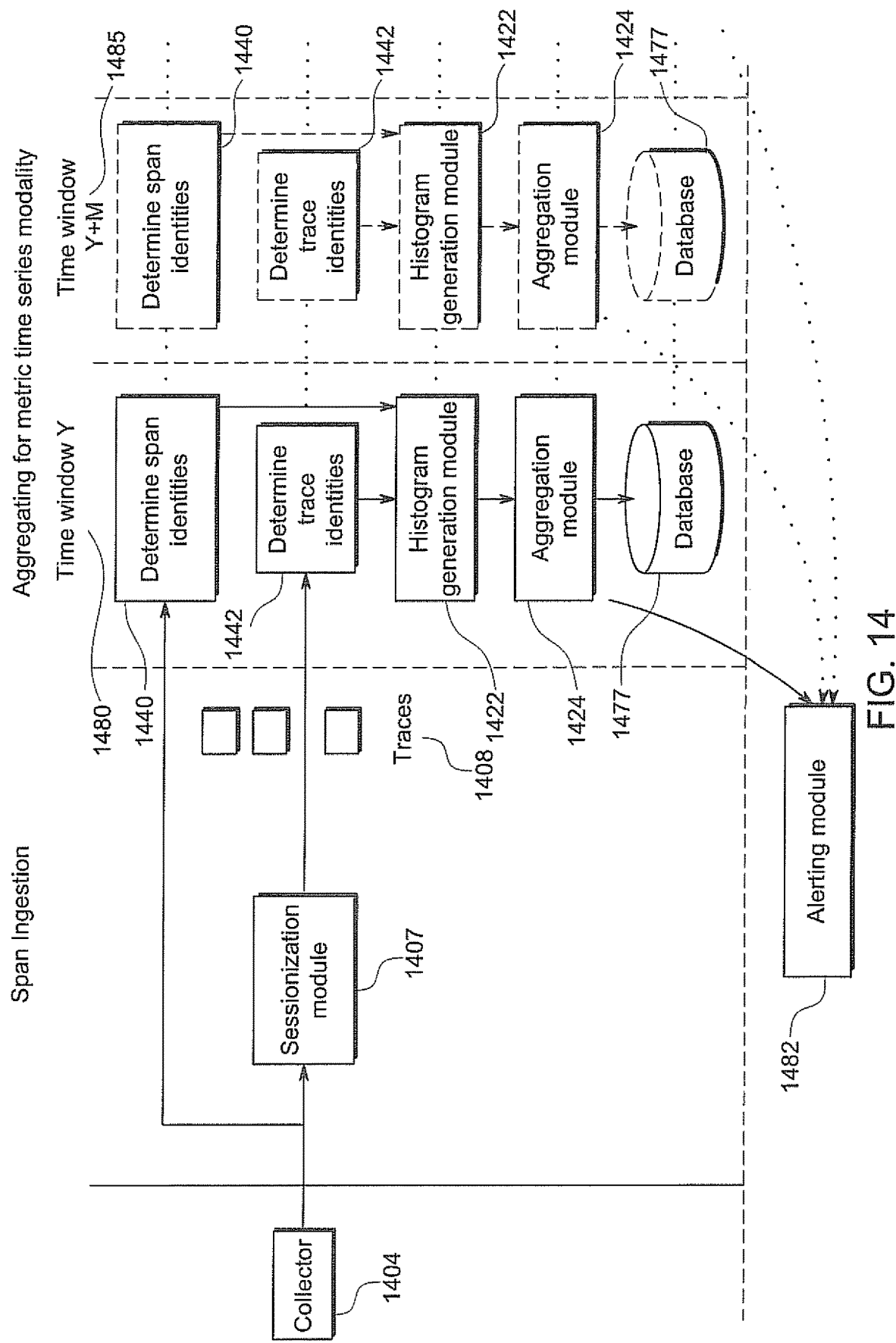
FIG. 14 is a flow diagram that illustrates an exemplary method of generating metric time series from ingested spans, in accordance with embodiments of the present invention.

FIG. 14 is a flow diagram that illustrates an exemplary computer implemented method of generating metric time series from ingested spans, in accordance with embodiments of the present invention. As mentioned previously, incoming spans are received at a monitoring service from client devices 720 (shown in FIG. 7) or an associated collector 1404. Prior to being sessionized, span identities are generated for the spans and the spans with identical base identities are grouped together by module 1440.

In one embodiment, a histogram generation module 1422 generates a histogram respective to each span identity. The histogram may represent a distribution of durations for a set of spans. Information from each incoming span (e.g., span duration information) corresponding to a given span identity is added to the fixed size bins of the respective histogram for the identity. The histogram is maintained for a fixed sized time window Y 1480 (e.g., 10 seconds) after which the histogram generation module 1422 emits the aggregated metrics and resets all the counters in the histogram for the next segment. Subsequently, the histogram generation module 1422 generates metrics for the next duration of time Y+M 1485, and emits metrics corresponding to that time window. In this way, histogram generation module periodically emits one or more metrics (e.g., six span metrics as seen in FIG. 6), including user-configured custom metrics, corresponding to each type of span to the analytics engine.

In one embodiment, the span information is also combined into traces 1408 using a sessionization module 1407 as discussed in connection with FIG. 5. The sessionization process may consolidate traces (from spans) within a first minute window (associated with time window Y 1480). Thereafter, the sessionization process may consolidate traces within the subsequent window (associated with time window "Y+M" 1485). Trace identities are determined for the sessionized traces 1408 using module 1442 after which the trace metrics are determined using the histogram generation module 1422 in a process similar to the manner in which span metrics are generated.

In an embodiment, an aggregation module 1424 may aggregate the periodic metric data from the histogram generation module 1422 and create metric time series from the data for each span identity. In some embodiments, the aggregation module 1424 may generate quantized data streams from the metric data received from the histogram generation module 1422. The quantized data stream has data values occurring periodically at fixed time intervals.

In one embodiment, the aggregation module 1424 may identify a function for aggregating the metric for which values are provided by one or more input data streams. The aggregation module 1424 generates the quantized data streams by determining an aggregate value for each input data stream for each fixed time interval by applying the identified function over data values of the input data stream received within the fixed time interval. The aggregation module 1424 may further receive a request to evaluate an expression based on the data values from the input data streams. The system periodically evaluates the expression using the data values of the quantized data streams.

In one embodiment, the aggregation module 1424 may, for example, perform aggregations on the various metric time series to provide real-time monitoring of certain higher priority endpoints in the application. For example, aggregations may be performed to determine request, error and latency metrics for certain designated services. In order to do that, the aggregation module 1424 may, for example, aggregate values across all span identities that are associated with the designated service.

Further, in some embodiments, alerting module 1482 may monitor one or more metric time series from the aggregation module 1424 and may be configured to generate alerts if certain metrics being monitored exhibit anomalous behavior. For example, if a maximum span duration associated with a given span identity crosses over a certain threshold, an alert configured using the alerting module 1482 may be triggered. The alert may, for example, be responsive to a metric time series associated with span metric 1332 from FIG. 13, wherein the alert is triggered if the maximum span duration exceeds a given threshold.

In one embodiment, the histograms generated by the histogram generation module 1422 may be stored in database 1477. In an embodiment, the histogram data may be stored as parquet-formatted files.

4.1.2 Real-Time Monitoring Using Metric Time Series Data

Figure 15:
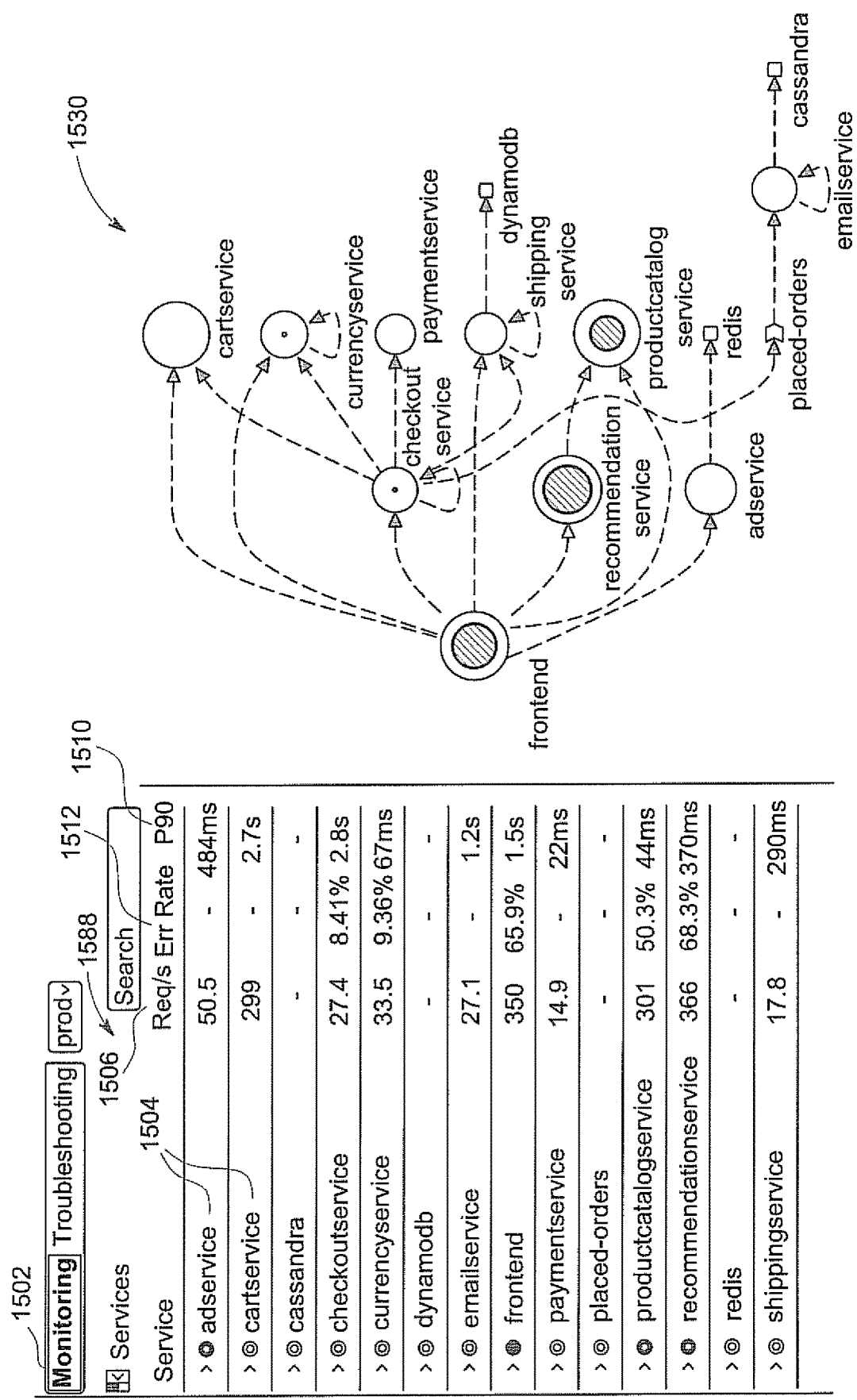
FIG. 15 illustrates an exemplary on-screen GUI illustrating a monitoring mode for an application displaying metric values aggregated from metric time series data, in accordance with embodiments of the present invention.

FIG. 15 illustrates an exemplary on-screen GUI illustrating a monitoring mode for an application displaying metric values aggregated from metric time series data, in accordance with embodiments of the present invention. In one embodiment, the GUI of FIG. 15 displays a monitoring mode indication when a corresponding monitoring mode option 1502 is selected. The monitoring mode displays a panel 1588 listing services 1504 comprised within the application being monitored. Each service is displayed alongside metrics pertaining to requests/second 1506, error rate 1512 and P90 latency values 1510. The metrics data displayed in the panel 1588 is computed in real-time and is aggregated using the metric time series data. In an embodiment, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

The monitoring mode also comprises an application topology graph 1530. The service graph 1530 facilitates visualizing cross-service relationships between services comprised within the application and external to the application (as will be discussed further in connection with the metric events modality). In an embodiment, the service graph may be created using information gleaned from the metric time series data aggregated by the aggregation module 1424 discussed in connection with FIG. 14.

By ingesting up to 100% of the incoming spans from the client software and implementing the monitoring platform as a Software as a Service (SaaS) based service offering, embodiments of the present invention advantageously retain valuable information pertaining to the spans that is further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, embodiments of the present invention retain high-fidelity information related to all the incoming spans for deeper analysis. The metadata retained provides a user the ability to filter based on certain dimensions and services that would not have been possible using conventional monitoring systems. Further, the metadata retained may be used in conjunction with data sets for other modalities such as metric events and full-fidelity to allow a user to provide a thorough investigation of an alert.

In one embodiment, using, for example, the "service," "operation," and "kind" fields in the tuple, the aggregation module 1424 (from FIG. 14) may be able to determine span identities associated with cross-service calls. Spans associated with inter-service calls are of interest to a user because they provide user information regarding the manner in which two services within an application are interacting. Embodiments of the present invention are able to advantageously use the metadata saved for the metric time series to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in one embodiment, if a user identifies a span identity associated with a cross-service call or a span identity associated with a high value operation, the user may create an extended identity for the corresponding span identities and supplement those identities with additional custom dimensions to be monitored. For example, the user may want to monitor a customer name association with such spans. The user may simply reconfigure the analytics engine to extract the additional customer name dimension as part of the spans' extended identity. Retaining span information associated with incoming spans provides a user additional metadata to perform intelligent processing.

In an embodiment, the user may only collect data pertaining to select operations. In other words, the user may filter out data pertaining to select operations that are of less interest to a user. The number of unique span identities may typically roughly correlate with the number of unique operation names present on the span. In an embodiment, the user is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a user. For example, spans associated with calls that a service makes to operations internal to the service do not convey information and can be filtered. Accordingly, additional resources can be directed towards processing spans associated with services and operations that are of greater interest to a user. Conventional monitoring systems by comparison would not have the flexibility to selectively focus on spans associated with high value services or operations by filtering out the less valuable spans.

Figure 16:
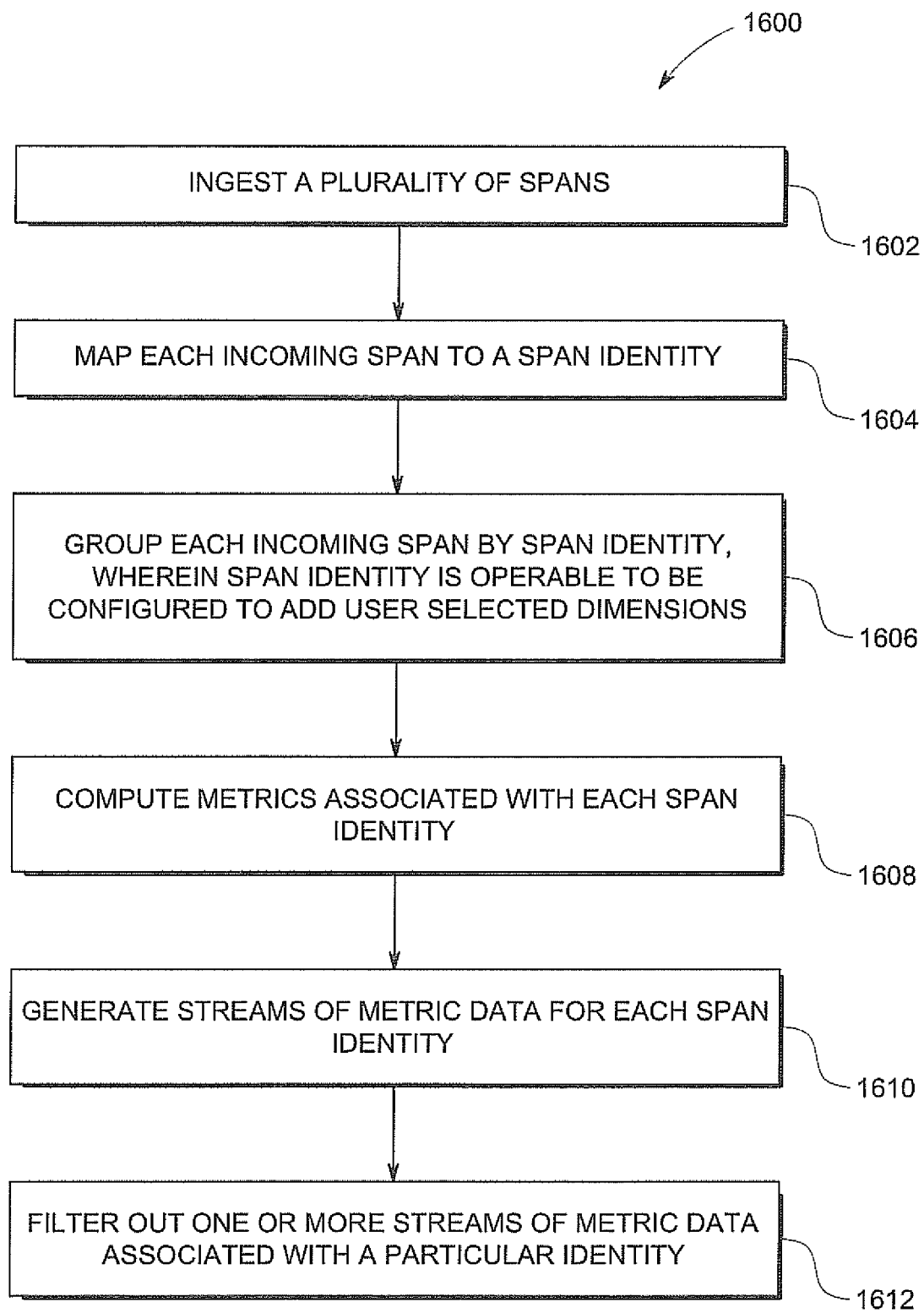
FIG. 16 presents a flowchart illustrating a computerized process to generate streams of metric data associated with selected operations, in accordance with embodiments of the present invention.

FIG. 16 presents a flowchart illustrating a computerized process to generate streams of metric data associated with selected operations, in accordance with embodiments of the present invention. Blocks 1602-1612 describe exemplary steps comprising the process 1600 depicted in FIG. 16, in accordance with the various embodiments herein described. In one embodiment, the process 1600 is implemented at least in part as computer-executable instructions stored in a computer-readable medium and executed in one or more processing devices.

At block 1602, a plurality of spans are ingested into a cloud-based monitoring platform. At block 1604, each incoming span is associated with a unique span identity. At block 1606, spans are grouped by span identity, where a span identity can be extended to include additional custom configured dimensions.

At block 1608, a histogram associated with each span identity is generated to compute metrics (e.g., six metrics discussed in connection with FIG. 6) for each span identity. At block 1610, streams of metric data (metric time series) can be generated for each span identity.

At block 1612, metric data pertaining to certain operations of no interest to a user may be filtered out. This way metrics data pertaining to only high value operations may be aggregated.

4.2 Metric Events

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a user.

Figure 17:
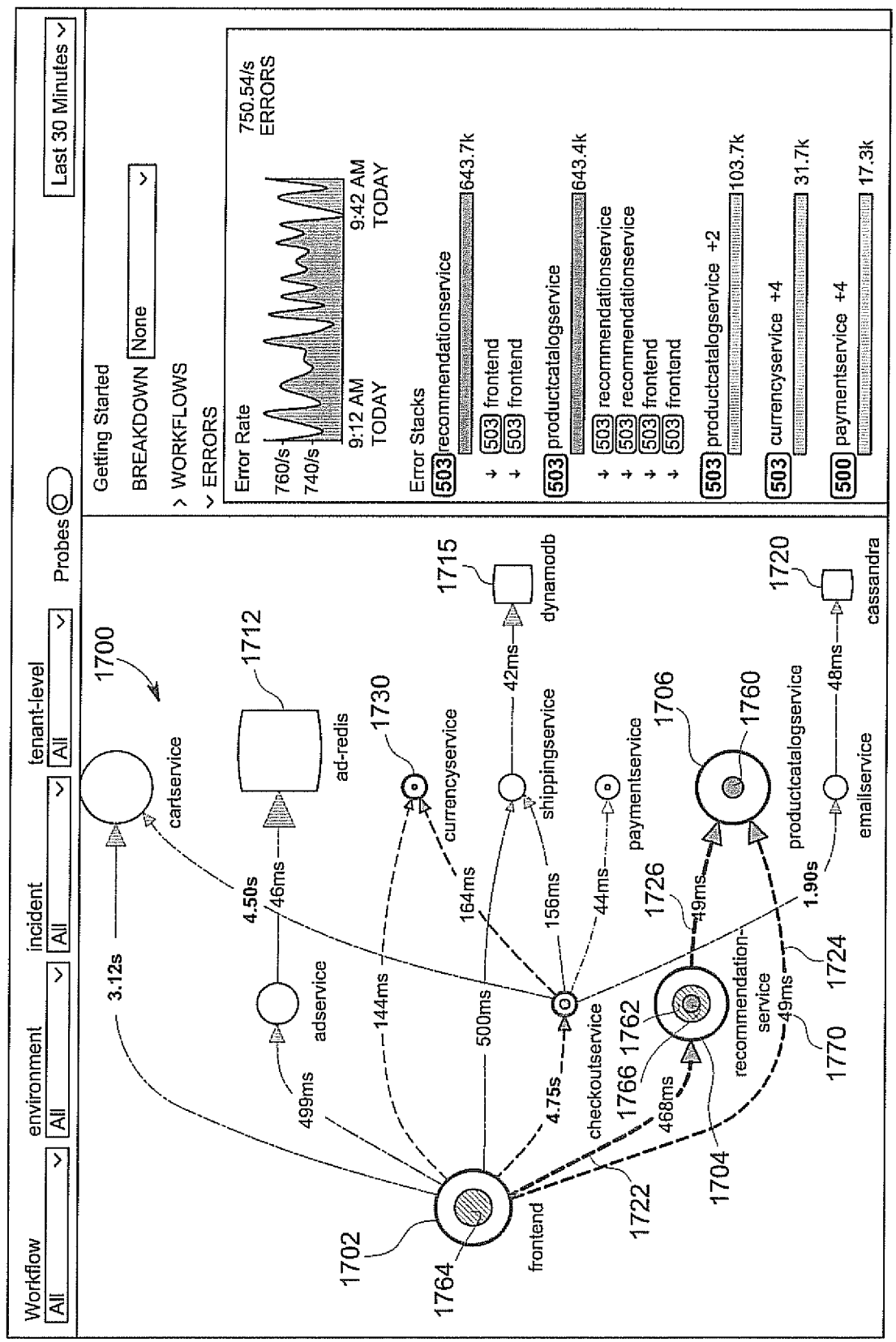
FIG. 17 illustrates an exemplary on-screen GUI comprising an interactive topology graph for an application created from the aggregated metric events data, in accordance with embodiments of the present invention.

Embodiments of the present invention use the aggregated rows of metrics data created in association with the metric events modality to generate a full-context application topology graph using the metric events data (e.g., by module 1222 in FIG. 12). FIG. 17 illustrates an exemplary on-screen GUI comprising an interactive topology graph for an application created from the aggregated metric events data of the metric events modality, in accordance with embodiments of the present invention. The service graph facilitates visualizing cross-service relationships between services comprised within the application and external to the application. The exemplary GUI of FIG. 17 also enables customers to track the causal chain of operations resulting in an error.

It should be noted that the service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 17 illustrates an on-screen GUI comprising an interactive full-context service graph 1700, which is constructed for an exemplary microservices-based application using the metrics data generated in connection with the metric events modality. Each circular node (e.g., nodes associated with services 1702, 1704 and 1706 of FIG. 17) represents a single microservice. Alternatively, in an embodiment, a circular node may also represent a group of multiple microservices, where the GUI for the monitoring platform (associated with, for example, the monitoring service 306) provides a client the ability to expand the node into its sub-components.

In an embodiment, services that are part of the client's application may be represented differently from services that are external to the client's application. For example, circular nodes (e.g., nodes associated with services 1702, 1704 and 1706) of the exemplary application represented by service graph 1700 are associated with services comprised within the client's application. By contrast, squarish nodes (e.g., nodes associated with databases dynamodb 1715, Cassandra 1720, ad-redis 1712) are associated with services or databases that are external to the client's application.

A user may submit a request at the front-end service 1702; the user's request at the front-end service 1702 may set off a chain of subsequent calls. For example, a request entered by the user at the front end of the platform may generate a call from the front-end service 1702 to the recommendation service 1704, which in turn may generate a further call to the product catalog service 1706. As noted previously, a chain of calls to service a request may also comprise calls that a service makes to internal sub-functions or operations within the same service.

Each edge in the service graph 1700 (e.g., the edges 1722, 1724 and 1726) represents a cross-service dependency (or a cross-service call). The front-end service 1702 depends on the recommendation service 1704 because it calls the recommendation service 1704. Similarly, the recommendation service 1704 depends on the product catalog service 1706 because it makes a call to the product catalog service 1706. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some embodiments, the GUI comprising service graph 1700 may be configured so that the nodes themselves provide a visual indication regarding the number of errors that originated at a particular node versus errors that propagated through the particular node but originated elsewhere. In an embodiment, the high-cardinality metrics data aggregated in association with the metric events modality may be used to compute the number of errors that are used to render the nodes of the service graph.

For example, as shown in the service graph of FIG. 17, the front-end service 1702 makes calls to the recommendation service 1704. Errors may be generated at the recommendation service 1704 not only in response to calls from the front-end service 1702, but also in response to calls that the recommendation service 1704 makes to itself (e.g., in response to sub-functions or operations that are part of recommendation service). For such errors, the recommendation service 1704 would be considered the "originator" for the error. The recommendation service 1704 also makes calls to the product catalog service 1706 and these calls may result in their own set of errors for which the product catalog service 1706 would be considered the error originator. The errors originating at the product catalog service 1706 may propagate upstream to the front-end service 1702 through the recommendation service 1704; these errors would be observed at the recommendation service 1704 even though the recommendation service 1704 is not the originator of those errors.

It is appreciated that conventional monitoring technologies would not provide adequate means for a client to distinguish between errors that originated at the recommendation service 1704 versus errors that propagated through the recommendation service 1704 but originated elsewhere. By performing computations using the metrics data associated with the metric events modality, embodiments of the present invention are able to render a service graph that visually indicates critical information regarding the services in an architecture, e.g., number of requests between services, the number of errors generated by a service, number of errors for which the service was the root cause, etc. The service graph 1700 allows clients the ability to visually distinguish between errors that originated at the recommendation service 1704 as compared with errors that simply propagated through the recommendation service 1704. As shown in FIG. 17, the node associated the recommendation service 1704 comprises a solid-filled circular region 1766 and a partially-filled region 1762, where the region 1766 represents errors that originated at the recommendation service 1704 while the region 1762 represents errors that propagated through the recommendation service 1704 but originated elsewhere (e.g., at the product catalog service 1706).

Similarly, solid-filled region 1760 within the node associated with the product catalog service 1706 represents the errors that originated at the product catalog service. Note that the errors returned by the product catalog service 1706 originated at the product catalog service. In other words, the product catalog service 1706 does not have errors from another downstream service propagating through it because it does not make calls to another service that is further downstream in the execution pipeline. Conversely, the front-end service 1702 comprises a partially-filled region 1764 because the errors observed at the front-end service 1702 propagated to it from other downstream services (e.g., the recommendation service 1704, the currency service 1730, the product catalog service 1706, etc.) The front-end service 1702 was not the originator of errors in the example shown in FIG. 17. Note that in other embodiments solid-filled regions (e.g., region 1766) and partially-filled regions (e.g., region 1764) may be represented differently. For example, different shades, patterns, or colors may be used to distinguish these regions from each other.

Embodiments of the present invention use the aggregated rows of metrics data created for the metric events modality to determine full-fidelity SLIs associated with the services in an application (e.g., by the module 1222 in FIG. 12). An SLI is a service level indicator-a defined quantitative measure of some aspect of the level of service that is provided. The SLIs are aggregated and extracted for the various services in a microservices architecture so that the behavior of applications may be understood. Most clients consider request latency-how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In one embodiment, the GUI comprising service graph 1700 is interactive, thereby, allowing a developer to access the SLIs associated with the various nodes and edges within the application by interacting with respective portions of the service graph. Referring to FIG. 17, in an embodiment, a client may be able to hover their cursor over various regions of the on-screen displayed service graph 1700, including but not limited to the nodes (e.g., the nodes associated with services 1704, 1706 etc.) and edges (e.g., the edges 1722, 1726, etc.), to receive SLI-related information for the associated microservices through a pop-up window or other interface.

Figure 18:
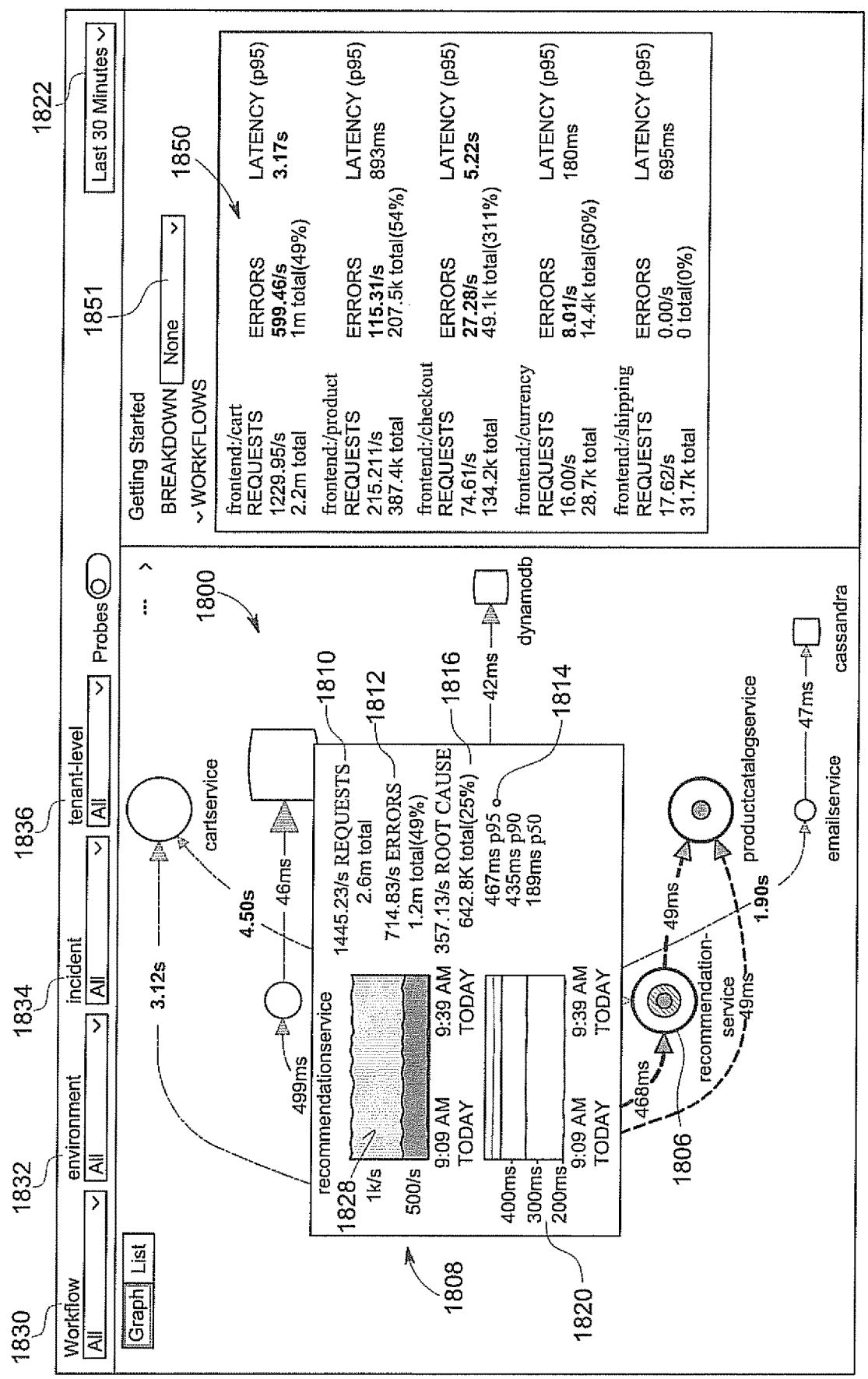
FIG. 18 illustrates an exemplary on-screen displayed GUI showing the manner in which a client may access SLIs pertaining to a service within an interactive topology graph, in accordance with embodiments of the present invention.

FIG. 18 illustrates an exemplary on-screen displayed GUI showing the manner in which a client may access SLIs pertaining to a service within an interactive topology graph, in accordance with embodiments of the present invention. As shown in FIG. 18, when a client hovers the cursor over the node associated with, for example, the recommendation service 1806, a pop-up window 1808 is overlaid on the service graph 1800 comprising SLIs pertaining to the recommendation service 1806. Specifically, SLIs pertaining to Requests 1810, Errors 1812 and Latency percentiles 1814 are provided. Furthermore, in an embodiment, information pertaining to Root Cause 1816 is also provided to the client.

For example, the SLIs related to Requests 1810 comprise information regarding the rate of requests and number of requests serviced by the recommendation service 1806 during a specific time duration. The time duration over which the SLIs are calculated may be adjusted using drop-down menu 1822. The time duration over which SLIs are calculated may vary, for example, from 1 minute to 3 days. As indicated by the time axis on hover chart 1828, for this example, a time window of 30 minutes (from 9:09 to 9:39 a.m.) is selected.

In an embodiment, the pop-up window 1808 also provides the client information pertaining to SLIs related to Errors 1812. In the example of FIG. 18, the pop-up window 1808 provides information regarding the error rate and the total number of errors that occurred during the specified time duration. The client is also provided information regarding what percentage of the total number of requests resulted in errors.

In an embodiment, the pop-up window 1808 also provides the client information pertaining to Latency Percentiles 1814 and a graphical representation 1820 of the same. For example, SLI p95 indicates that for 95% of the users, the latency for servicing the requests was less than 467 ms. Latency-related SLIs also include information regarding p90 and p50 percentiles. The graphical representation 1820, in the example of FIG. 18, shows the latency information regarding the p95 percentile graphically.

In one embodiment of the present invention, the pop-up window 1808 also displays information pertaining to errors for which the selected service was the root-cause. The Root Cause information 1816 includes the number of errors for which the selected service (e.g., the recommendation service 1806 in the example of FIG. 18) was the originator, the associated error rate and the percentage of the total number of requests that represents. In this way, embodiments of the present invention, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 1808 are computed accurately using the metrics data gathered for the metric events modality. Because embodiments of the present invention are able to ingest up to 100% the incoming span data (without sampling), the SLIs are computed factoring in all the incoming data, which results in accurate measurements. For the example of FIG. 18, there were a total of 2.6 million requests served by the recommendation service 1806 at a rate of 1445.23 requests/second ("sec"). Of these, 1.2 million of the requests resulted in errors at a rate of 714.83/sec, which represents approximately 49% of the total number of requests. In this way, embodiments of the present invention provide a modality of analysis that enables a client to gather critical SLIs pertaining to the recommendation service 1806 including an indication of how many of the errors originated at the recommendation service 1806.

Figure 19:
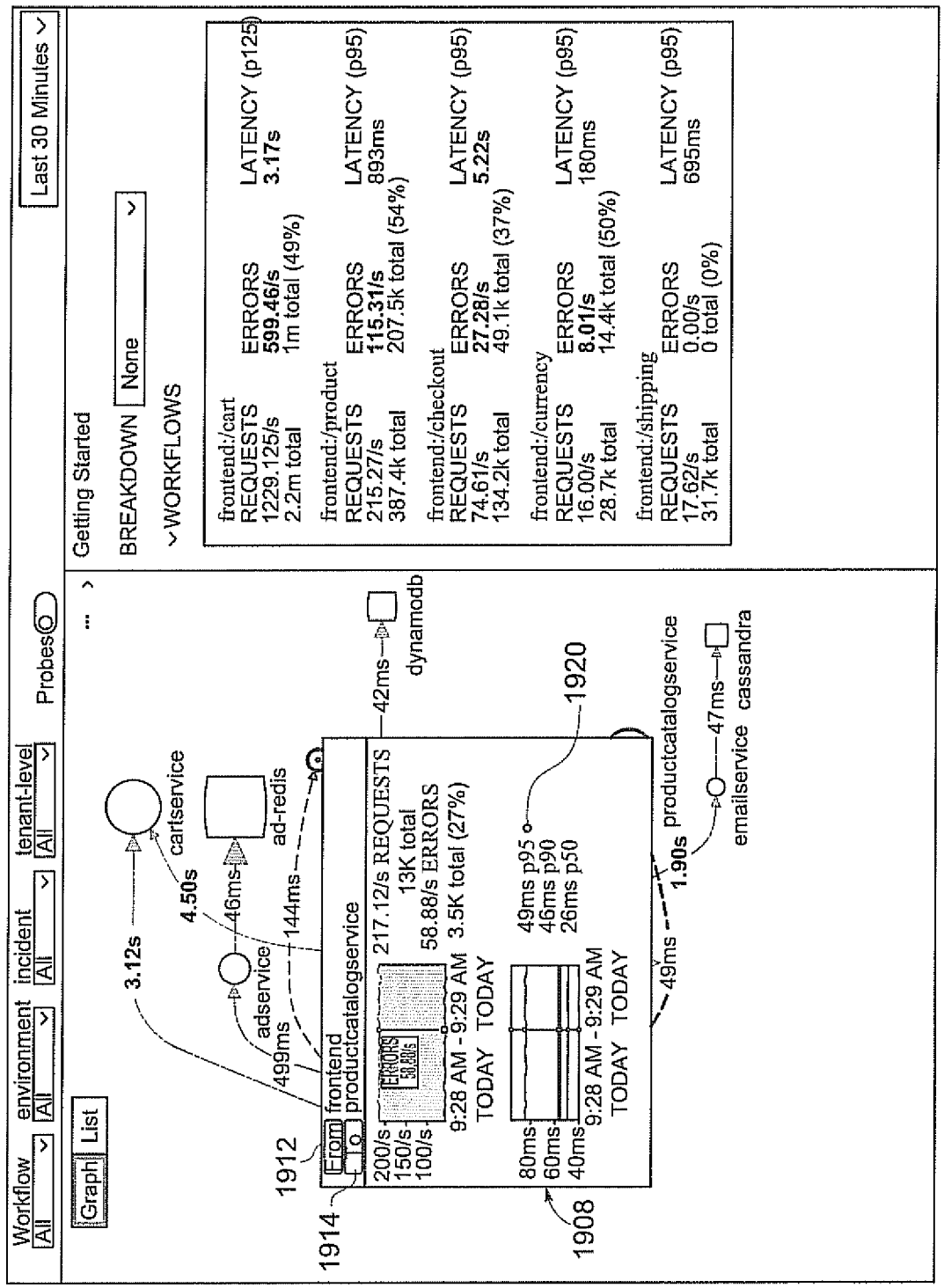
FIG. 19 illustrates an exemplary on-screen GUI showing the manner in which a client may access SLIs pertaining to an edge within an interactive topology graph, in accordance with embodiments of the present invention.

FIG. 19 illustrates an exemplary on-screen GUI showing the manner in which a client may access SLIs pertaining to an edge within an interactive topology graph, in accordance with embodiments of the present invention. The SLIs pertaining to edges are also computed using the metrics data associated with the metric events modality. As shown in FIG. 19, if a user hovers over or selects a particular edge, e.g., the edge 1724 (as shown in FIG. 17) (which represents the cross-service dependency of the front-end service 1702 on the product catalog service 1706) a pop-up dialog box 1908 opens up on-screen that reports SLIs specific to the dependency. The "From" field 1912 represents the service that executes the call and the "To" field 1914 represents the service that is called (the service that the calling service depends on). As shown in the dialog box 1908, SLIs pertaining to the number of requests (or calls) that were made, the number of those that returned in errors, and the latency associated with servicing the requests are provided. It should be noted that a latency value 1920 of 49 ms shown in FIG. 19 for this particular dependency may be annotated directly on the edge of the service graph.

In one embodiment, the metrics data associated with the metric events modality are used to compute accurate SLIs across multiple dimensions. Further, embodiments of the present invention support high dimensionality and high cardinality tags for the metric events modality. In one embodiment, the GUI of FIG. 18 may display one or more attribute (or tag) categories that comprise dimensions that may be varied across the service graph 1800. For example, attribute categories (e.g., Workflow 1830, environment 1832, incident 1834 and tenant-level 1836) may be depicted within the GUI, each of which may correspond to attributes that may be varied to compute SLIs and error-related information for different combinations of the attributes. The categories of dimensions across which the SLIs may be computed, include, but are not limited to, workflow 1830, environment 1832, incident 1834 and tenant-level 1836. Each of the categories comprises a drop-down menu with options for the different dimensions. The metrics events data allows users to easily and rapidly compute measurements across various cross-combinations of tags or attributes.

In an embodiment, the GUI may include a panel 1850 that may display SLIs across the various workflows. Further, the GUI allows users the ability to break down the workflows across multiple different attributes using drop down menu 1851. The computations for each of the break-downs may be efficiently determined using the metrics data aggregated for the metric events mode.

Figure 20:
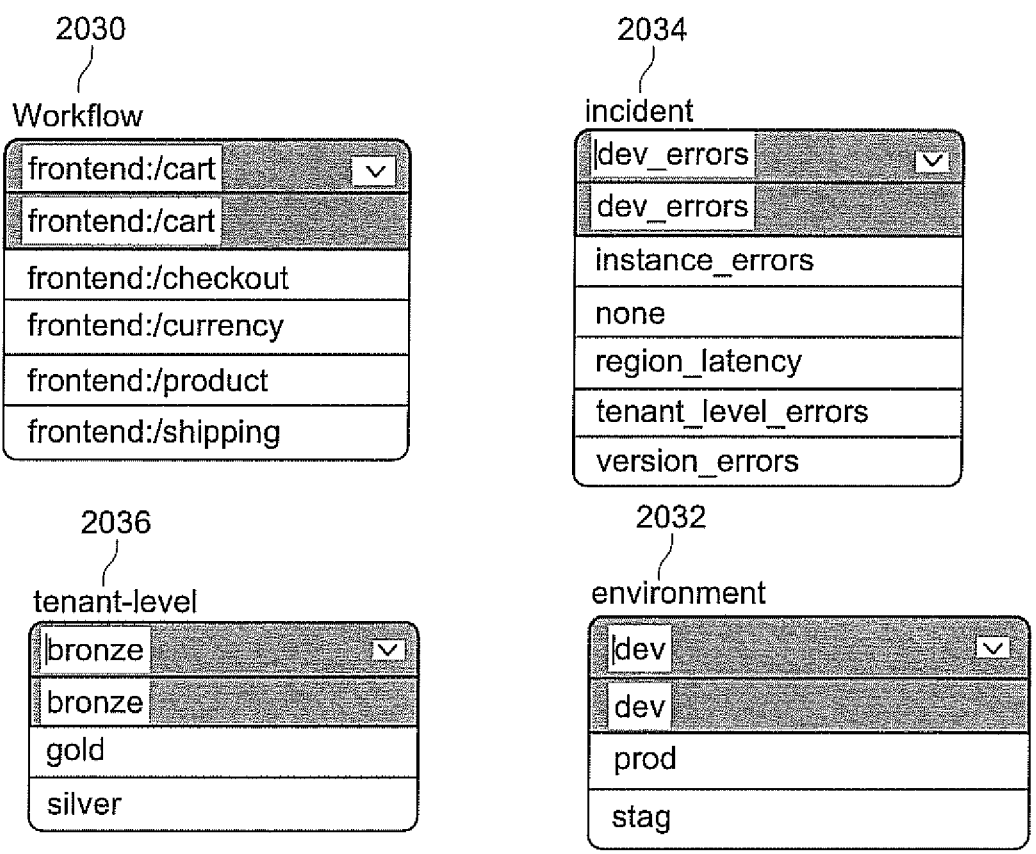
FIG. 20 illustrates on-screen displays that represent exemplary categories of dimensions across which SLIs may be computed, in accordance with embodiments of the present invention.

FIG. 20 illustrates on-screen displays that represent exemplary categories of dimensions across which SLIs may be computed, in accordance with embodiments of the present invention. The exemplary category of dimensions corresponds to the categories associated with drop-down menus (e.g., 1830, 1832, 1834 and 1836) discussed in connection with FIG. 18. The metrics data aggregated using the metric event modality allows users to easily and rapidly compute measurements across various cross-combinations of attributes. Drop-down on-screen menu 2030, corresponding to workflow, illustrates different workflows specific to the application discussed in connection with FIG. 18. A "workflow" is a type of category of dimension of the request that was processed; a workflow may be conceptualized as a type of "global tag" that is attributed to each span in a given trace. A workflow may, for example, be associated with a type of business action, e.g., "checkout," that is generated on the back-end in response to a request.

Similarly, drop down on-screen menus 2034, 2036 and 2032, relating to incident, tenant-level and environment respectively, provide further categories of dimensions across which SLIs may be computed. Each of the drop down on-screen menus 2030, 2032, 2034 and 2036 comprises various dimensions (associated with the respective categories) across which aggregations may be made. For example, the user may submit a query asking for the number of requests in a trace where "Workflow=frontend:/cart" and "incident=instance_errors" and "tenant-level=gold." By aggregating metrics data associated with the indexed tags, the metric events modality is able to respond to the user's query rapidly and efficiently.

Note that SLIs may be computed for each attribute of the categories in FIG. 20 and also for each combination of attributes associated with the categories. In an embodiment, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIG. 18). In this way, embodiments of the present invention enable a client to use the metric events modality to slice the application topology graph across several different attributes.

It should be noted that clients might have different attributes or dimensions that may be of interest for their respective application. In an embodiment, the monitoring platform may be configured to provide insight into client-specific dimensions. Consequently, the specific attributes or dimensions available in each of the drop-down menus may vary by client.

4.2.1 Metric Events Data Generation and Persistence

Figure 21:
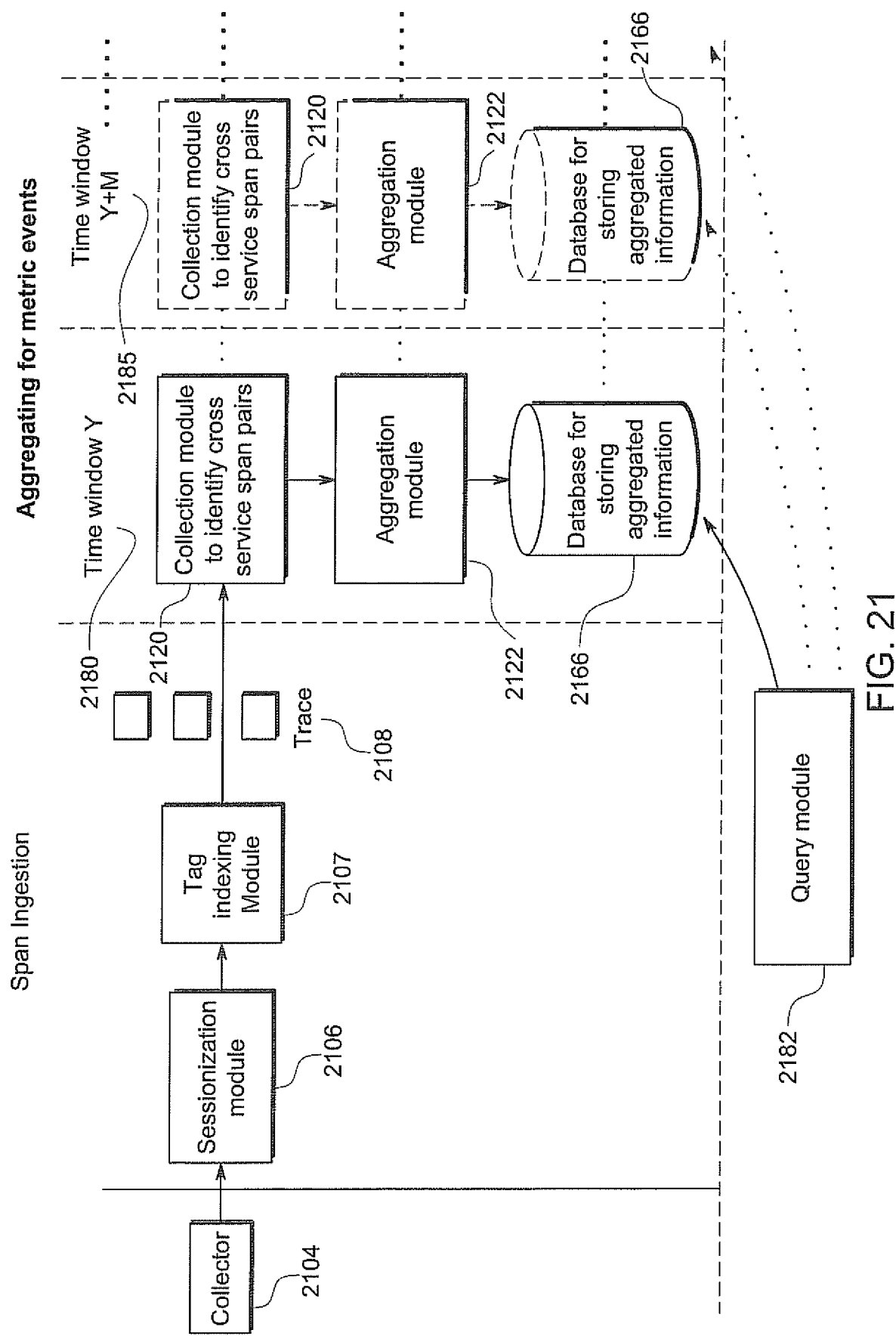
FIG. 21 is a flow diagram that illustrates an exemplary method of aggregating metrics data from ingested traces for the metric events modality, in accordance with embodiments of the present invention.

FIG. 21 is a flow diagram that illustrates an exemplary method of aggregating metrics data from ingested traces for the metric events modality, in accordance with embodiments of the present invention. As mentioned previously, span information is received at a monitoring service from a collector 2104. The span information is then combined into traces 2108 in real time using module 2106 in a process called sessionization as discussed in connection with FIG. 5. The sessionization process may consolidate traces (from spans) within a first time window (associated with time window Y 2180) before transmitting the traces to the collection module 2120. Thereafter, the sessionization process may consolidate traces within the subsequent window (associated with time window "Y+M" 2185).

Subsequent to consolidation, the trace data is indexed by tag indexing module 2107, which indexes one or more tags in the trace data. The tags may be client-selected tags or tags that the monitoring platform is configured to index by default. In one embodiment, the metric events modality indexes a subset of tags associated with the spans of a trace, but indexes that set of tags with perfect accuracy because the metrics calculated take into account all the ingested spans.

In one or more embodiments, collection module 2120 receives one or more traces 2108 generated within a predetermined time window Y 2180, and traverses the traces to identify and collect cross-service span pairs that represent cross-service calls. To collect the cross-service span pairs, the collection module 2120 identifies parent-child span pairs in a given trace where the service name for the parent and the child are different. Stated differently, the collection module 2120 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a user, e.g., to render the service graph and display the SLIs associated with the various dependencies between services. Spans associated with calls to internal operations that a service might make may not be of interest to an application owner and may, therefore, be ignored by the collection module 2120 when determining the cross-service span pairs.

It should be noted that, in one embodiment, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 2120 from service tiers associated with a cross-service span pair. In a different embodiment, however, the tags may be extracted directly from the parent span and child span in a cross-service span pair rather than the respective service tier associated with the parent span or child span.

In one or more embodiments, once the cross-service span pairs are collected and the indexed tags extracted from the respective service tiers, the collection module 2120 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM"

and "TO" tag attributes to indicate the direction of the dependency between services in a cross-service call, there may be several different ways to record dependency information between the two services.

In one embodiment, the aggregation module 2166 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this embodiment, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces.

In a different embodiment, the count may be maintained at the service level. Accordingly, the count may be increased each time the same cross-service span pair is encountered within the trace information ingested from the client.

The aggregation module 2122 advantageously prevents duplication by storing a single instance of each unique set of "FROM" tag attributes and "TO" tag attributes for a given cross-service span pair with an associated count in the storage module 2166. The information in the storage module 2166 may be accessed by querying module 2182 where the querying module 2182 determines that the query is associated with the metric events modality. The querying module 2182 may, for example, be associated with a query engine and reporting system, e.g., reporting system 750 in FIG. 7.

The aggregated cross-service "FROM" and "TO" tag attribute sets and associated count values stored in the storage module 2166 may be used by the querying module 2182 to respond to queries in accordance with the metric events modality. Note that the collection and aggregation process is repeated for subsequent time windows (including window Y+M 2185) after time window Y 2180. In this way, the aggregation process is performed over time. This allows the metric events modality to deliver query results over varying time durations (as discussed, for example, in connection with the drop-down menu 1822 in FIG. 18).

FIG. 22 is a table illustrating an exemplary manner in which selected tags for each service in a cross-service span pair may be mapped to tag attributes and stored as part of a memory-resident data object associated with an edge in the service graph, in accordance with embodiments of the present invention. As noted above, in one or more embodiments, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one embodiment, one or more edge data objects similar to the one shown in FIG. 22 is used to persist the data for the metric events modality (in addition to node data objects which will be discussed in connection with FIG. 23B).

The table of FIG. 22 illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations associated with the "FROM" tag attribute, e.g., {(span.kind=client, region=us-west) (span.kind=client, region=us-east) (span.kind=server, region=us-west) (span.kind=client, region=us-east). Similarly, if all possible combinations exist in Service B, there may also be 4 unique tag combinations associated with the "TO" tag attribute. Assuming there is a complete interaction between Service and Service B, there may be 16 (4×4) different edges between the two services based on the unique set of "FROM" and "TO" type tag attributes.

Note that the example in FIG. 22 illustrates information for two unique sets of "FROM" and "TO" tag attributes. Edge 2290 is associated with a TO-type attribute of "region=us-east" while edge 2292 is associated with a TO-type attribute of "region=us-west." Because the two sets of "FROM" and "TO" attributes are not identical, a separate count is maintained for each. The edge 2290 has an associated count of 2, while the edge 2292 has an associated count of 1. To determine the total number of requests or total count associated with the cross-service call from Service A to Service B, the number of counts for each set of "FROM" and TO" tag attributes for an associated cross-service call may be summed up. In the example of FIG. 22 then, a total of 3 requests is computed to occur between Service A and Service B.

In one embodiment, data sets for the metric events mode are stored as row of metrics extracted from the indexed tags in the service tiers, where each row is associated with either an edge or a node in the service graph. In an embodiment, the edges on the service graph (e.g., the edges 1722 and 1726 of FIG. 17) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an embodiment, this grouping may be performed using "group by" statements in a query language, e.g., SQL. In one embodiment, the value of the number of requests between two services may be used to determine the thickness of the edge between the two services in the service graph.

In one embodiment, the nodes (e.g., nodes associated with services 1702, 1704, 1706) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an embodiment, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In one embodiment, the value of the number of requests may also be used to determine the size of the node when rendering the service graph.

In an embodiment, the "TO" type tag attributes for rendering the nodes may be aggregated separately from the "FROM" and "TO" tag attribute sets aggregated for rendering the edges (as will be discussed in connection with FIG. 23B). In the exemplary table of FIG. 22, information for Service B may be determined, for example, by analyzing the "TO" type tag attributes in the table.

Figure 23A:
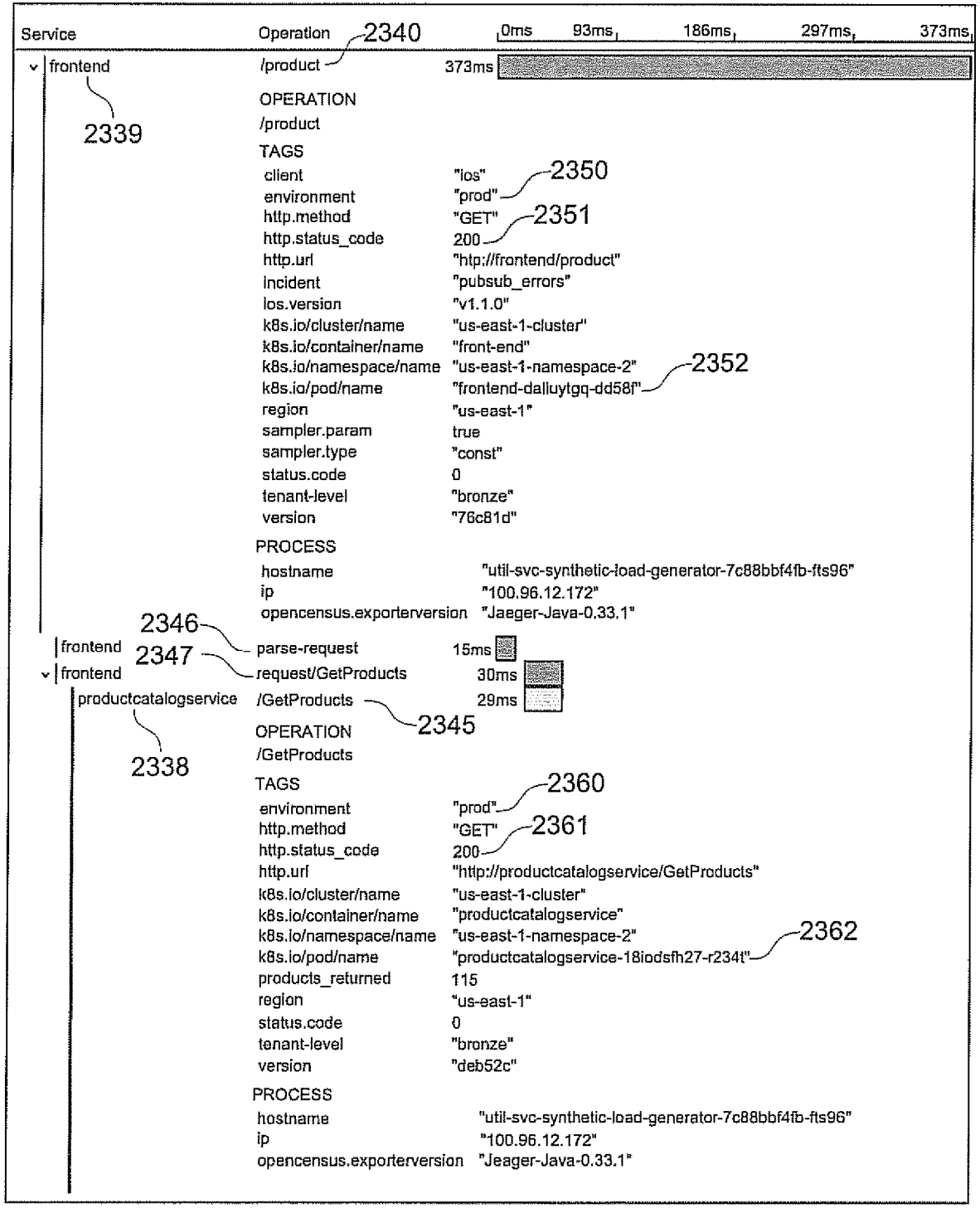
FIG. 23A illustrates an exemplary on-screen GUI showing a visual representation of a portion of an exemplary trace illustrating a cross-service call, in accordance with embodiments of the present invention.

FIG. 23A illustrates an exemplary on-screen GUI showing a visual representation of a portion of an exemplary trace illustrating a cross-service call, in accordance with embodiments of the present invention. As shown in FIG. 23A, front-end service 2339 makes a call to product catalog service 2338. Accordingly, the front-end service 2339 and the product catalog service 2338 comprise a cross-service span pair. Note that spans 2340, 2346 and 2347 may be part of the service tier for front-end service 2339. Accordingly, even though the call is made by the span 2347 ('frontend: request/GetProduct') to span 2345 ('productcatalogservice:/ GetProducts), indexed tags associated with the front-end service 2339 may also be extracted from the spans that are part of the service tier for the front-end service 2339. In one embodiment, the first matching tag within a service tier is extracted. For example, indexed tag "environment=prod" 2350 may be extracted from the span 2340, even though it is repeated in the spans 2346 and 2347 because the span 2340 comprises the first matching instance of the tag 2350. Assuming tags "environment" (referred to herein as "env"), "http.status_code" (referred to herein as "code") and "k8s.io/pod/name" (referred to herein as "pod") are indexed, then tags 2350, 2351 and 2352 are extracted from the front-end service 2339 while tags 2360, 2361 and 2362 are extracted from the product catalog service 2338.

In an embodiment, the extracted indexed tags are mapped to tag attributes. The extracted tags 2350, 2351 and 2352 in the parent span (associated with the front-end service 2339) may be mapped to a "FROM" tag attribute while the extracted tags 2360, 2361 and 2362 in the child span may be mapped to a "TO" tag attribute. In one embodiment, the mapped tags may be used to create node and edge data objects that are used to persist data for the metric events modality as shown in FIG. 23B.

Figure 23B:
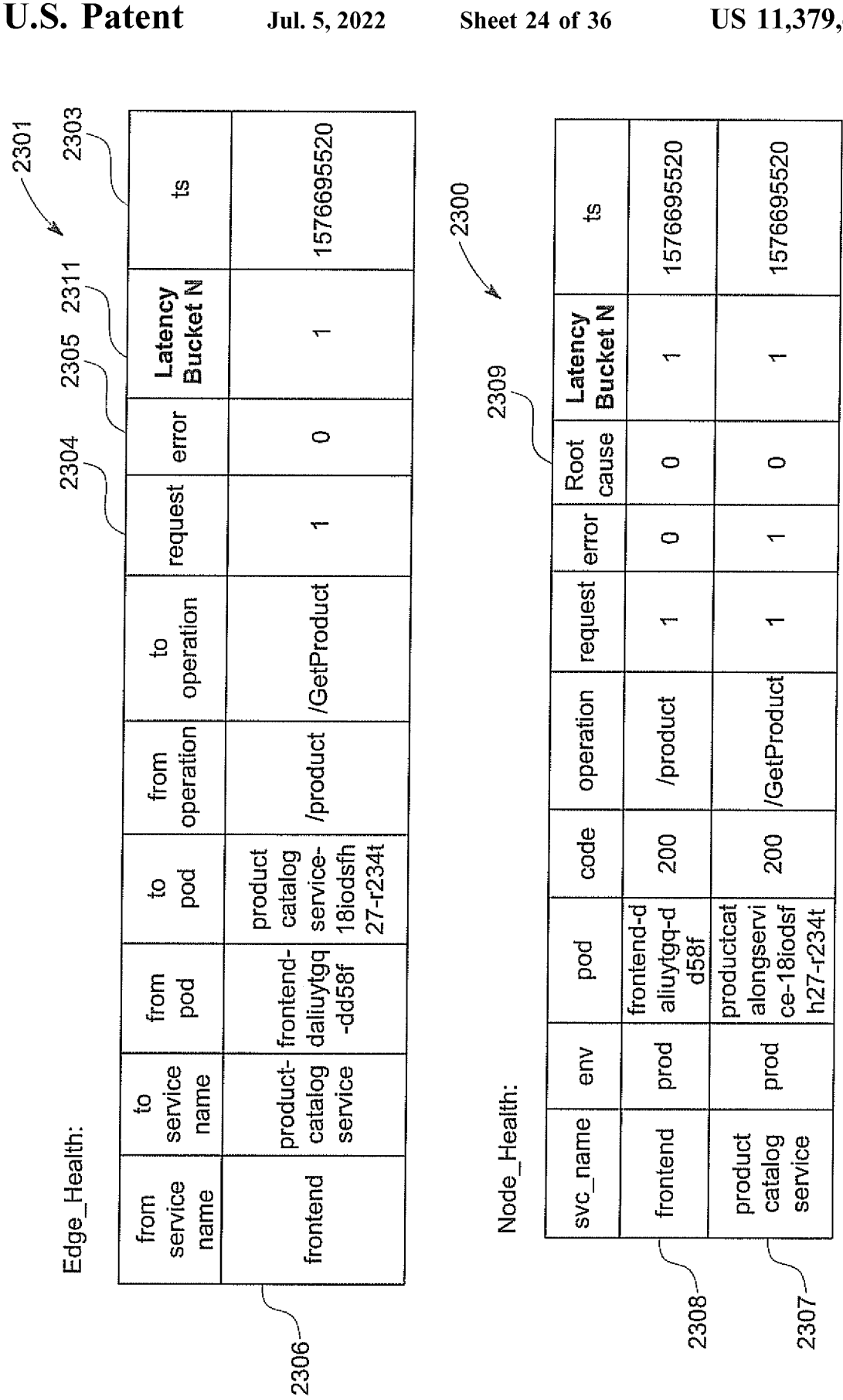
FIG. 23B illustrates the manner in which data in the metric events modality is persisted using an edge data object comprising a memory-resident table of tag attributes with associated counts and using a node data object comprising a memory-resident table of tags with associated counts, in accordance with an embodiment of the present invention.

FIG. 23B illustrates the manner in which data in the metric events modality is persisted using an edge data object comprising a memory-resident table of tag attributes with associated counts and using a node data object comprising a memory-resident table of tags with associated counts, in accordance with an embodiment of the present invention. In one embodiment of the present invention, a memory-resident table 2301 titled "Edge Health" may be maintained to keep track of the various dependencies in the application. The table 2301 may be stored in, for example, in the storage module 2166 (in FIG. 21). A memory-resident table 2300 titled "Node Health" may be maintained to keep track of the various service nodes in the application. Both tables comprise aggregated rows comprising metrics values. In one embodiment, these rows are stored efficiently for fast aggregation.

For example, the table 2301 may comprise one or more exemplary rows related to the cross-service span pair discussed in connection with FIG. 23A. Row 2306 is one exemplary row that may be generated for the cross-service span pair of FIG. 23A. Note that for simplicity, only tag attributes "from pod" and "to pod" are illustrated in row 2306 in FIG. 23B, but row 2306 would typically also comprise information for tag attributes associated with indexed tags "code" and "env" that are also indexed. As discussed above, each row for the cross-service span pair of FIG. 23A will comprise a unique set of "FROM" and "TO" tag attributes. For example, if the front-end service (e.g., front-end service 2339 in FIG. 23A) makes multiple calls to the product catalog service (e.g., product catalog service 2338 of FIG. 23A), but any of the calls are associated with different values for the "pod" tag from the values shown in row 2306, the information would be recorded in a new row. In other words, each row records a single unique combination of tag attributes and service names. If the value of either the "from pod" or "to pod" tag attribute changes, a new row is created to record the information. Accordingly, there may be multiple rows in the table 2301 for the cross-service call discussed in connection with FIG. 23A, where each row would comprise a unique combination of "FROM" and "TO" tag attributes for a given cross-service span pair.

Each row in the table 2301 comprises a count value for request metric 2304, error metric 2305 and latency 2311. The request metric 2304 is incremented each time the same cross-service call with the same unique set of attributes for a respective row is observed on a trace. The error metric 2305 is incremented each time a request associated with a respective row is observed on a trace that has an error. The latency 2311 metric relates to a histogram of the duration that a respective request took. Further, each row comprises a timestamp 2303 to record the time of the cross-service call.

Using the metrics associated with the request metric 2304, error metric 2305 and latency 2311 and the timestamp 2303, aggregations on the rows may be performed quickly and efficiently to determine SLIs for varying ranges of time as discussed previously. In response to a user query then, the numeric rows in the tables 2300 and 2301 may be summed into either timeseries buckets or into a single number depending on the query.

In one embodiment, the metric events modality may maintain a separate memory-resident table 2300 titled "Node Health" in system memory associated with the service nodes in the application. Each row in the memory-resident table 2301 comprises a unique combination of service names and associated tags. For example, row 2308 is associated with the front-end service (e.g., service 2339 in FIG. 23A) and comprises corresponding tag values for "env," "pod" and "code." Similarly, row 2307 is associated with the product catalog service (e.g., product catalog service 2338 of FIG. 23A) and comprises corresponding tag values for "env," "pod" and "code."

Each unique combination of service name and corresponding tag values is associated with metrics that are maintained in the memory-resident table 2300, e.g., request, error and latency (as discussed in connection with table 2301). These metrics may be used to perform fast and efficient aggregations. For example, if the user queried the number of times "env=prod" in the application, assuming the two exemplary services illustrated in table 2300 are the only ones where "env=prod," the request counts in each row would be aggregated to provide a result of 2.

Note that the memory-resident table 2300 may also comprise a "root cause" metric 2309 which tracks the number of times the corresponding service was the root cause of an error. For example, the "root cause" metric may be aggregated using the memory-resident table 2300 across multiple rows to determine the number of times each given service in an application was the root cause for an error.

In one embodiment, a software tool may be employed to perform faster aggregations across the rows of tables 2300 and 2301. For example, Apache Druid, which is an open-source data store designed for sub-second queries on real-time and historical data, may be used to perform the aggregations rapidly and efficiently. In different embodiments, other tools may also be used to perform aggregations. In one embodiment, the information in the memory-resident tables 2300 and 2301 may be used in the metric events modality to perform the metrics aggregations for rendering an associated service graph and computing the associated SLIs.

In one embodiment, the metrics event modality may also store Trace IDs associated for each unique combination of cross-service span pairs and corresponding indexed tags.

In one embodiment, the aggregation module 2122 (of FIG. 21) of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair. Accordingly, exemplary Trace IDs may be maintained for each unique cross-service call.

The exemplary Trace IDs stored with each unique set of "FROM" and "TO" tag attributes for a cross-service span pair may be used by the querying module 2182 to respond to queries requesting more particularized information pertaining to non-indexed tags associated with the spans. For example, if a user needs particularized information regarding span performance or span duration, the querying module 2182 may be able to use the aggregated rows of information stored in a database associated with the storage module 2166 to access one or more exemplary Trace IDs associated with the call. Using the Trace IDs then, the querying module may be able to access the sessionized traces 2108 and perform analytics on the retrieved exemplary traces to deliver the requisite span performance and span duration information. In one embodiment, the full trace information may be accessed from a storage set associated the full-fidelity modality, which stores the entire traces as ingested following sessionization. In a different embodiment, however, the metric events modality may save full trace information for traces associated with the exemplary Trace IDs in a separate storage from the data set associated with the full-fidelity modality. In one embodiment, because the metric events mode allows users to retrieve raw trace data, it also allows users to run an analysis on the retrieved data for an arbitrary set of tags (instead of being limited to the tags pre-indexed by indexing module 2107).

The metric events modality is particularly advantageous in circumstances where the user has identified a problem from the information provided by the metric time series. Having identified a problem either by manual monitoring of RED metrics or through an automatically generated alert, the user may be able to traverse deeper using the metric events data set and access relevant traces to receive more specific information regarding the problem. Also, the metric events mode allows the user to run an arbitrary analysis on the traces, e.g., on a set of tags that has not previously been indexed, which provides the user with specific information that may be used to diagnose and resolve the problem.

FIG. 23C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an embodiment of the present invention. In one embodiment of the present invention, a memory-resident table 2331 created to persist data is associated with the various dependencies in the application. Also, a memory-resident table 2330 created to persist data for the metric events modality is associated with the various service nodes in the application. Note that table 2331 is created in a similar way to table 2301 in FIG. 23B and that table 2330 is created in a similar way to table 2300 of FIG. 23B. Instead of tracking RED metrics, however, the tables in FIG. 23C comprise a column for Trace IDs 2390 and Exemplar Type 2391. It should be noted that, in one embodiment, memory-resident table 2331 may be maintained in combination with memory-resident table 2301 and that memory-resident table 2330 may be maintained in combination with memory-resident table 2300.

Row 2397 in table 2331 is one exemplary row that may be generated for the cross-service span pair of FIG. 23C. Note that for simplicity, only tag attributes "from pod" and "to pod" are illustrated in row 2397 in FIG. 23C, but row 2397 would typically also comprise information for tag attributes associated with indexed tags "code" and "env." As discussed previously, each row for the cross-service span pair of FIG. 23A will comprise a unique set of "FROM" and "TO" tag attributes. Accordingly, there may be multiple rows in table 2331 for the cross-service call discussed in connection with FIG. 23A, where each row would comprise a unique combination of "FROM" and "TO" tag attributes for a given cross-service span pair. Each row in table 2331 comprises a column forTrace IDs 2390, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one embodiment, the Exemplar Type column 2391 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one embodiment, the monitoring system may maintain a separate table 2330 associated with the service nodes in the application. Rows 2395 and 2396 in table 2330 are two exemplary rows that may be generated for the cross-service span pair of FIG. 23A. Each row in table 2330 comprises a unique combination of service and associated tags. For example, row 2395 is associated with the front-end service (e.g., service 2339 in FIG. 23A) and comprises corresponding tag values for "env," "pod" and "code." Similarly, row 2396 is associated with the product catalog service (e.g., product catalog service 2338 of FIG. 23A) and comprises corresponding tag values for "env," "pod" and "code."

Each unique combination of service name and corresponding tag values is associated with a Trace ID and Exemplar type that is maintained in table 2330.

As noted above, in one embodiment, metrics event data may be persisted in tables that represent a consolidation of the data shown in FIG. 23B and FIG. 23C. For example, table 2301 may comprise an additional column to track Trace IDs and similarly table 2300 may comprise an additional column to track Trace IDs.

The Trace IDs may be used in metrics events modality to retrieve full traces for more detailed analysis. In one embodiment, full traces associated with the exemplary Trace IDs may be maintained in a dedicated storage associated with the metric events. In a different embodiment, the full traces may be accessed from a data set associated with the full-fidelity mode.

It should be noted that the metric events modality can comprise higher-cardinality metrics information because a higher number of tags may be indexed for the metric events data set as compared to the dimensions associated with the metric time series. However, the metric time series modality may provide higher-fidelity information by comparison because it retains metadata associated with incoming spans (e.g., service name, operation name, count values, etc.). Further, the metric time series modality also allows users to configure alerts against one of more time series to monitor incoming data in real-time. Because metric events are generated from post-sessionized traces, the metrics data associated with metric events may not be computed as rapidly as compared with the metric time series modality.

4.3 Full-Fidelity Modality

In one embodiment, the full-fidelity module 1224 of FIG. 12 stores all the incoming trace data from the sessionization process in real time. Unlike the prior two modes, the full-fidelity modality stores the trace data in its raw form. In one embodiment, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one embodiment, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 24:
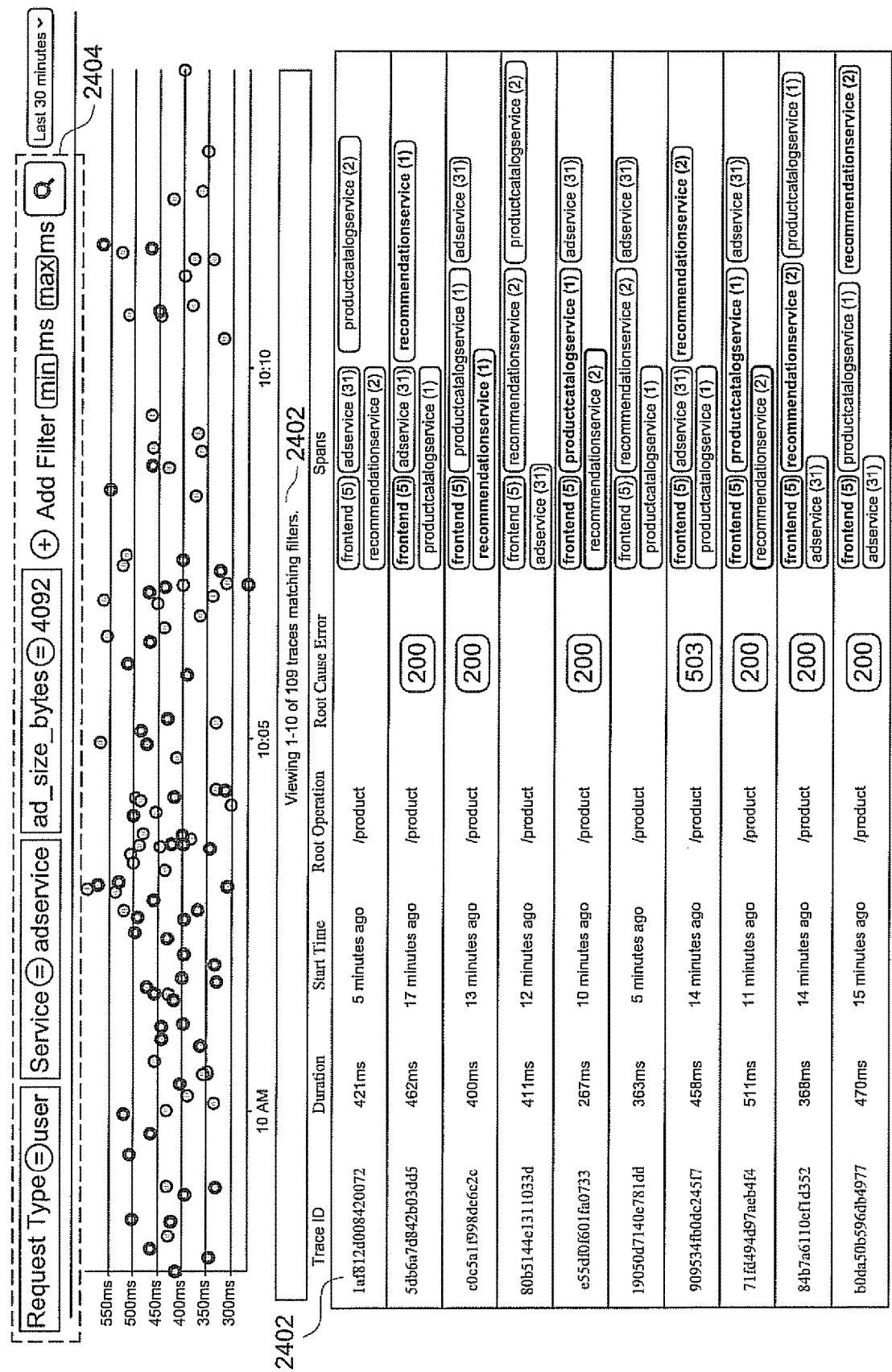
FIG. 24 is an on-screen GUI showing the manner in which a client may submit a query to be executed against the full set of traces stored in connection with the full-fidelity modality, in accordance with embodiments of the present invention.

FIG. 24 is an on-screen GUI showing the manner in which a client may submit a query to be executed against the full set of traces stored in connection with the full-fidelity modality, in accordance with embodiments of the present invention. The full-fidelity modality, in one embodiment, allows a user to execute query against arbitrary tags to receive a set of traces that matches the query. For example, in the GUI of FIG. 24, the user enters a query 2404 for traces where "Request Type=user," "Service=adservice" and the tag "ad_size_bytes=4092." In response, the platform returns a list 2402 of the traces matching the user-entered filters and, further, provides information about the traces, e.g., the Trace ID, duration, start time, root operation, root cause error status code and associated spans.

In one embodiment, the monitoring platform has the ability to run a full trace search (as shown in FIG. 24), and feed the traces collected into other modalities of analysis to get more detailed information about an arbitrary set of traces and an arbitrary set of attributes associated with the set of traces.

5.0 Application Performance Monitoring (APM) Detectors

Conventional monitoring technologies were not able to extract metrics in real-time from significant amounts of span and trace data generated by various services in an application owner's architecture, and use the generated metrics to identify errors in an application. Another related challenge is providing appropriately focused information related to an error to a developer depending on the level of detail sought.

In an embodiment, detectors can be configured to monitor incoming data associated with the metric time series modality. Detectors evaluate metric time series—which can themselves be the output of some analytics functions, not just the raw data being sent in—against a specified condition, and optionally for a duration. Stated differently, detectors can be monitor one or more metric time series (or computations associated with a metric time series) associated with incoming spans to detect anomalous behaviors. For example, detectors may be set up to monitor an error rate associated with a particular node or an error rate associated with a dependency.

When a condition has been met, detectors generate events of a specified level of severity. Events generated when detector conditions are met are referred to as alerts. Among other things, alerts can be used to trigger notifications in incident management platforms or messaging systems. Notifications pertaining to alerts also may be configured to be annotated in a GUI for a user to review. For example, an alert may be triggered if the error associated with a respective node or edge increases above a predetermined threshold. A notification pertaining to the alert may be displayed pertaining to the alert for a user to review.

Detectors generate alerts on aggregates and trends and, subsequently, use the alerts as triggers for deeper analysis and investigation using the other modalities, e.g., metric events and full-fidelity. The aggregates, in an embodiment, may be captured as metric time series (which comprise per span statistical summaries).

The monitoring platform may configure alerts associated with the metric time series data, wherein the alert may be triggered, for example, when a configured threshold has been reached. Other more complex alerts may also be configured. For example, the alert may be generated when an error rate is above a threshold. In an embodiment, alerts may be set for any of the RED metrics (e.g., request, error, latency). According to embodiments, an alert may be generated when an error rate is in violation of user or other defined rules (e.g., greater than 10% over a duration of 5 minutes, or the like), or when there is a growth in error rate (e.g., error rate over the last 5 minutes is more than twice the error rate of the preceding hour). It is understood that other alerts may similarly be generated with different thresholds. In this way, network traffic may be monitored for error rates associated with endpoints.

Detector conditions can be static values, e.g., CPU utilization percentage should not exceed a value of 90. However, static values may result in noisy alerting because they are generally simplistic. The value that is appropriate for one service on a particular time of day may not be appropriate for another service or a different time of day. Accordingly, embodiments of the present invention allow a user to define conditions that are dynamically generated. Dynamic thresholds are the result of an ongoing computation on streaming data, rather than a simple constant. For example, if the metric exhibits cyclical behavior, such that the best basis of comparison is the same metric but from a week ago, then a user can define a threshold that is a 1-week time-shifted version of the same metric. Or, if the relevant basis of comparison is the behavior of a population like a clustered service, then a user can define the threshold as a value that reflects that behavior—for example, the 90th percentile for the metric across the entire cluster over a moving 15-minute window.

Once an alert that is triggered off of one of the metric data series is received, the monitoring service may be configured to automatically query a data set associated with one or the other modalities, e.g., the metric events data set or the full-fidelity data set. By retaining sessionized trace data as metric events or full-fidelity data, the monitoring service ensures that executions which exemplify problems related to latency, errors, or request rates will be retained for further inspection and analysis. The metric events data set, for example, may be scoped by a time range determined by the alert. Further, the metric events data set may be explored for further information pertaining to the alert, e.g., reviewing a service graph where a path related to an error may be highlighted. Additionally, the full-fidelity data set may be explored to determine a collection of candidate error traces associated with an error. These candidate error traces may then be further explored by a user to identify a root cause of the error at the endpoint.

5.1 Alert Configuration

In one embodiment, additional value may be extracted from the time series metrics by identifying spikes and anomalies and determining when further investigations should occur. As mentioned previously, the metric time series modality can be configured, in an embodiment, to monitor RED metrics in real-time (with sub-second computation rates) and provide real-time alerting. In one embodiment, data can be ingested at one second resolution and alerts can be provided within a two to three second resolution if a condition is violated.

Figure 25A:
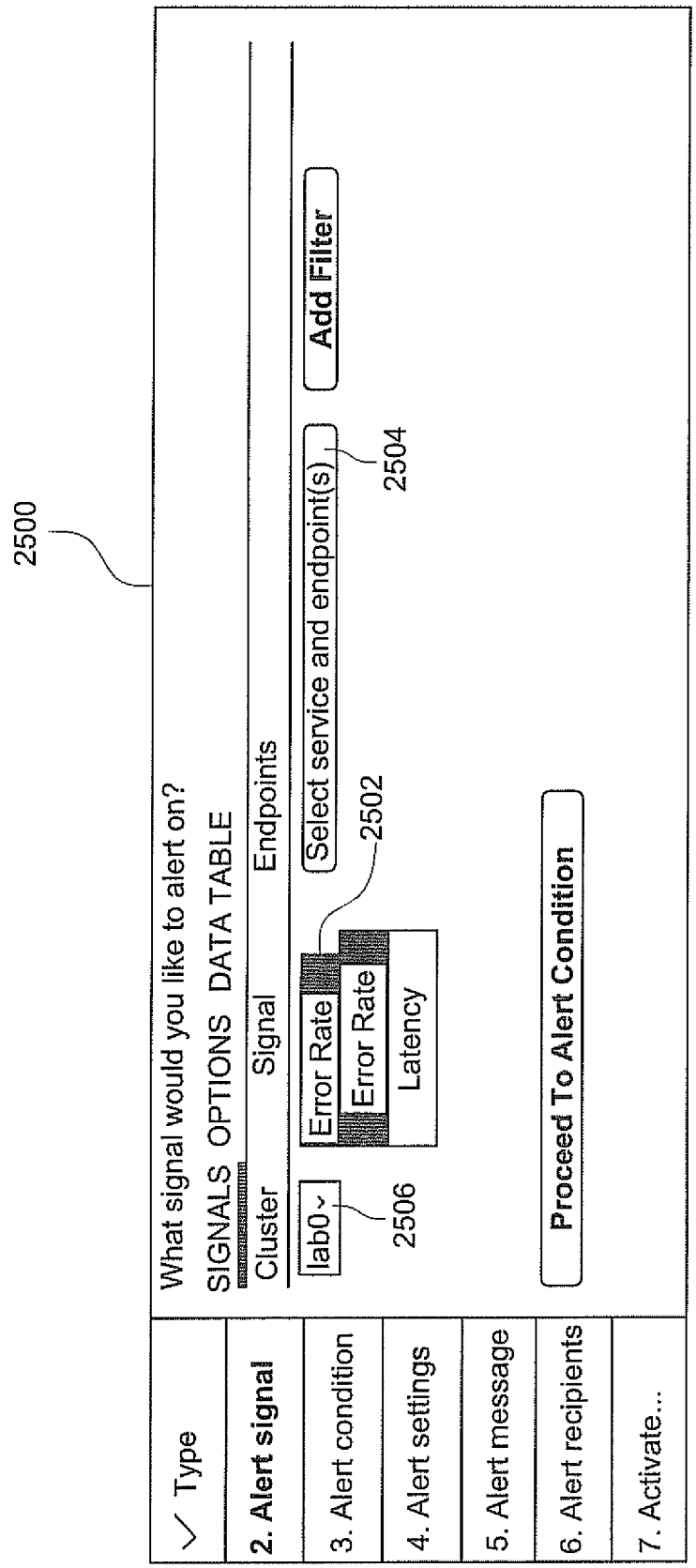
FIG. 25A is an exemplary on-screen GUI showing the manner in which a client may configure an alert signal in connection with the metric time series modality, in accordance with embodiments of the present invention.

FIG. 25A is an exemplary on-screen GUI 2500 showing the manner in which a client may configure an alert signal in connection with the metric time series modality, in accordance with embodiments of the present invention. As noted previously, in an embodiment, the alerting capability of the monitoring platform is based on the data set associated with the metric time series. One or more metric time series associated with an endpoint configured through field 2504 may be monitored to determine if an alert corresponding to the endpoint is triggered.

GUI 2500 allows a user to select a cluster 2506 associated with the alert signal. The user may also determine a type of alert 2502, e.g., error, latency or request rate. Further, the GUI comprises a field 2504 for the user to select an endpoint or service to be monitored.

FIG. 25B is an exemplary on-screen GUI 2501 showing the manner in which a client may configure a condition associated with the error alert configured in FIG. 25A, in accordance with embodiments of the present invention. As shown in GUI 2501, a user may configure an error alert based on a static threshold, which works well when a specific error rate threshold is known. Alternatively, the alert may be configured as a sudden change, where the current error rate is compared to the baseline error rate calculated for the immediately preceding time window.

FIG. 25C is an exemplary on-screen GUI 2512 showing the manner in which a client may configure a condition associated with a latency-based alert, in accordance with embodiments of the present invention. Embodiments of the present invention are able to track different percentiles of the latency distribution in connection with, for example, particular services and operations. In an embodiment, there may be multiple options to configure a latency-based alert. For example, latency may be compared against a baseline set, which may be selected from a recent history baseline set (corresponding to a 'sudden change' type alert 2514) or a baseline set that represents a same time window in previous cycles (corresponding to a 'historical anomaly' type alert 2515). The monitoring platform may also provide options for measuring abnormality. For example, the abnormality may be measured as a percentage change relative to the baseline or a number of deviations from the norm. In one embodiment, the latency may also be compared to a static threshold 2513 (in milliseconds). It should be noted that for both latency and error rate, in an embodiment, the static threshold detectors allow for comparisons to distinct trigger and clear thresholds (and durations) to eliminate possibly flappy alerts.

FIG. 25D is an exemplary on-screen GUI 2588 showing the manner in which a client may configure alert settings associated with a latency-based alert, in accordance with embodiments of the present invention. In an embodiment, the latency-based alert may be configured based on several settings. For example, the alert may be based on deviations from the norm as selected by field 2583. The alert settings also allow a user to define the size of the current window 2584 and the size of a historical window 2535. Further, the alert settings allow the user to set a trigger threshold 2586, which may be a number of deviations above which an alert is triggered. A clear threshold 2587 sets the threshold below which the alert clears. For example, if a value of 4 is selected for the clear threshold 2587, the latency threshold will clear if the latency is less than 4 deviations above the norm.

Analysis of percentiles may provide an important but incomplete picture of the health of an endpoint. To this end, the detectors can be configured using compound alert conditions (e.g., configuring an alert to trigger on a condition of the form "A and B," for example). For example, the detectors can be configured to make it possible to easily incorporate the volume of traffic an endpoint receives in determining when an alert should trigger. As a consequence, alerts for sparse data can be suppressed. For latency detectors, one of the volume parameters is "Min. requests/sec (absolute)," which is the minimum request rate (expressed as requests per second) required in the current window for the alert to trigger. GUI 2588 allows a user to set this value through field 2589. Note the default value of 0 means this volume condition has no effect.

The other volume parameter is "Min. req/sec (% of history)," which is the minimum request rate, as a percentage of the historical request rate, required in the current window to trigger or clear the alert. This can be set through field 2591. The historical request rate may be calculated on the same time windows used to determine the baseline and threshold (e.g., the immediately preceding window, or the same window from prior weeks). For the static threshold detector, the historical window may be up to five times longer than and immediately precedes the trigger duration period.

Note that settings are specific to the alerting strategy chosen. A different strategy may be employed for an error-based alert. In an embodiment, a request volume condition for the error rate detectors is also exposed. This can be used to ensure, for example, that an endpoint that receives just a few requests, one of which is an error, does not trigger an alert. In an embodiment, the user can also configure settings related to the type of alert message (e.g., by selecting interface 2575) and the alert recipients (e.g., by selecting interface 2576).

Figure 25E:
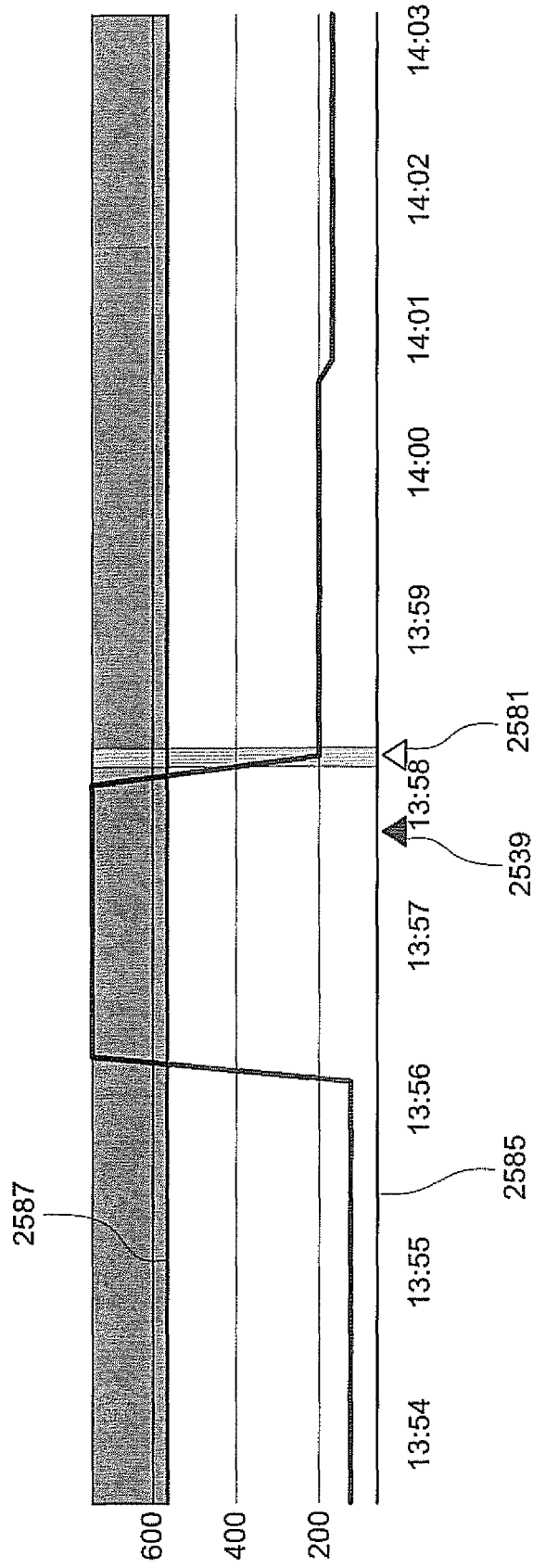
FIG. 25E is an exemplary on-screen GUI showing the manner in which a latency-based error is identified by a detector and depicted visually, in accordance with embodiments of the present invention.

FIG. 25E is an exemplary on-screen GUI showing the manner in which a latency-based error is identified by a detector and depicted visually, in accordance with embodiments of the present invention. As shown in FIG. 25E, an alert is triggered when the current latency increases just after time 13:56 and crosses the threshold 2587, which may be selected to be the historical median plus five historical deviations. The GUI also displays the historical baseline 2585, which may be selected to be the historical median. The historical baseline provides additional context to facilitate rapid evaluation of an alert. The filled triangle 2539 marks the beginning of the incident and the open triangle 2581 marks the end. It should be noted that any number of different sized, colored or shaped indicators may be used in connection with indicating problematic incidents.

Figure 26:
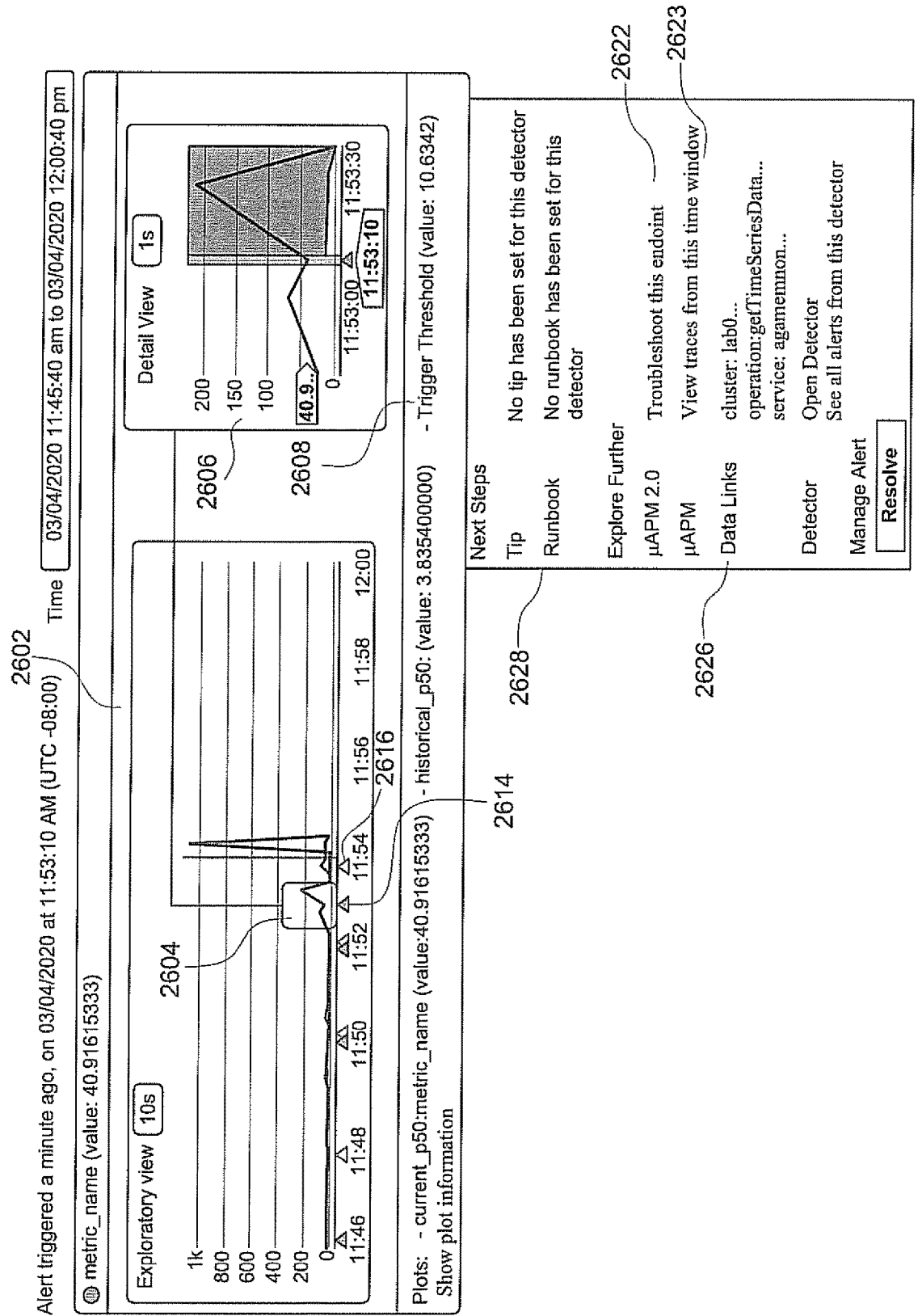
FIG. 26 is an exemplary on-screen GUI showing the manner in which an error is identified by a detector and depicted visually, in accordance with embodiments of the present invention.

FIG. 26 is an exemplary on-screen GUI 2602 showing the manner in which an error is identified by a detector and depicted visually, in accordance with embodiments of the present invention. GUI 2602 illustrates the alert modal comprising the visualization and alert details created when a monitored condition is met. In an embodiment, the alert condition may be reported along with an offending service name, operation name, or other details affiliated with the alert. Furthermore, additional tags associated with the alert may also be reported if they are stored as part of an extended span identity for a given metric time series.

As shown in GUI 2602, when the error rate increases over a critical threshold 2608 at time 2614 (a filled triangle marks the beginning of the incident), an alert is flagged. The end of the incident is indicated by an open triangle at time 2616. When the alert condition is met, the alert is generated and may be routed according to a notification policy specified in the configuration. In an embodiment, the region 2604 corresponding to the anomalous behavior is displayed in a window 2606, which provides a higher resolution view into the event. The visualization in window 2606 illustrates the behavior of the offending time series at the event time.

The GUI 2602 also comprises a window 2628 which comprises alert details specifying dimensions and metadata associated with an event. For example, the GUI 2602 provides additional metadata and dimensional details 2626 pertaining to the metric time series being monitored, e.g., the time series monitored in GUI 2602 is associated with cluster "lab0," operation "getTimeSeriesData" and service "agamemnon" as shown in window 2628.

5.2 Application of Alert Details

As noted above, the detectors can be configured to monitor one or more metric time series (or computations based on one or more metric time series) associated with incoming spans to detect anomalous behaviors. Detectors alert on aggregates and trends and, subsequently, use the alerts as triggers for deeper analysis and investigation using the other modalities, e.g., metric events and full-fidelity. Each monitored metric time series (or associated computation) will typically be associated with certain metadata or dimensions, e.g., service name, operation name, other user-configured dimensions, etc. as discussed earlier. If an alert is triggered, this collection of dimensions or metadata (plus the time range of the alert) may be used to write a query against one or more of the other data sets corresponding to the other modalities. Stated differently, any dimensions pertaining to an alert may be passed as a filter to data sets corresponding to either the metric events modality or the full-fidelity modality.

The GUI 2602 also provides an option to apply the alert details (e.g., the metadata and dimensional details 2626) to other modalities (e.g., metric events, full-fidelity, etc.) and other views of the monitoring platform. For example, the user may select a Troubleshooting view 2622, which directs the user to a "Troubleshooting" view with the alert filters (corresponding to the metadata and dimensional details 2626) applied. The user is also given an option 2623 to view the traces associated with the metric time series being monitored for an appropriate time window, e.g., the time window for which the alert was flagged. In this way, alert context can be automatically propagated to other views of the platform or other data sets associated with different modalities supported by the monitoring platform. A user, therefore, would not be required to have the expertise to manually craft queries against different data sets in response to an alert. In addition, automatically populating queries is also time-efficient.

Figure 27:
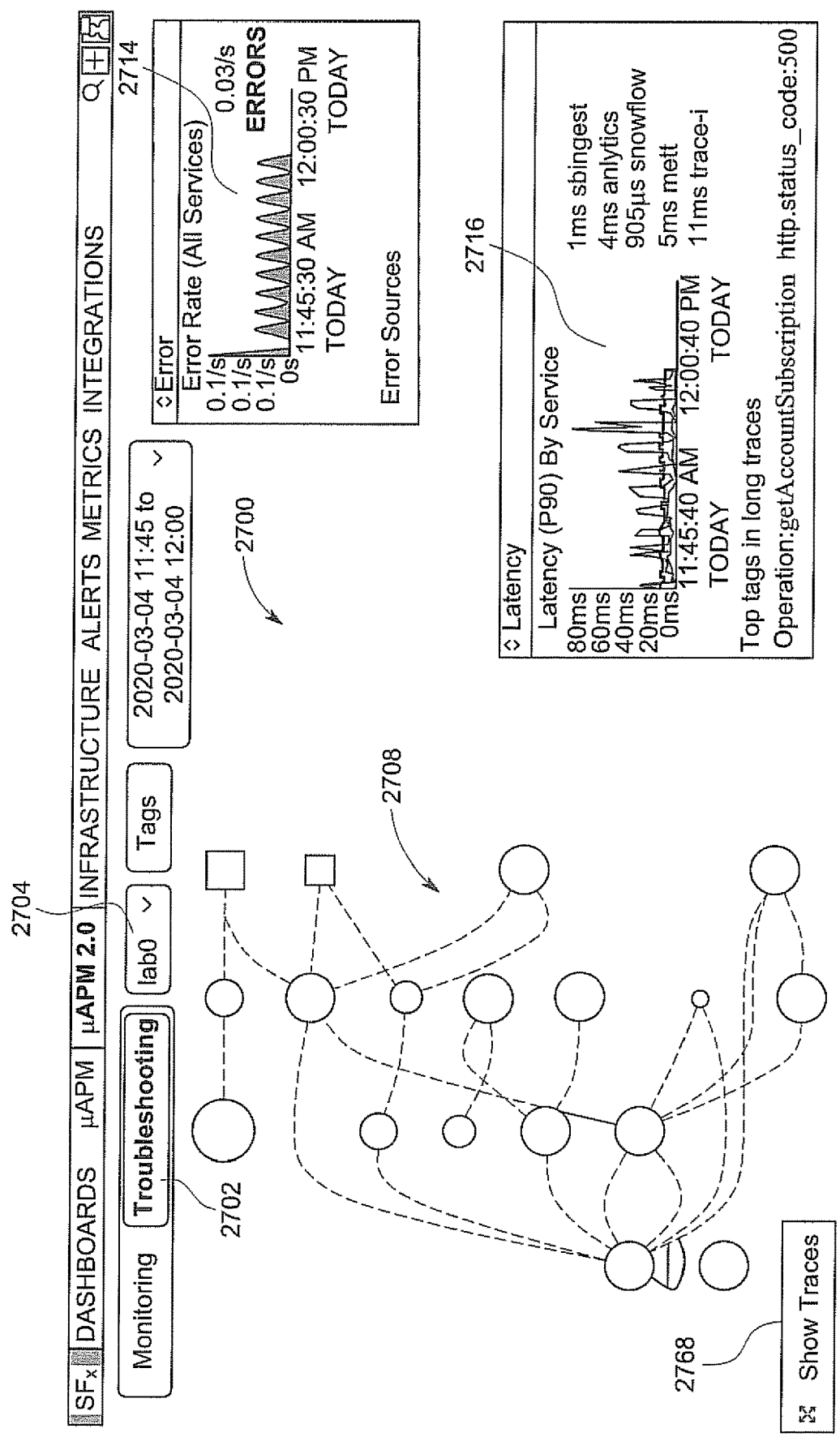
FIG. 27 is an exemplary on-screen GUI showing the manner in which the dimensions associated with the alert filters in FIG. 19 may be automatically applied to the metric events data set for further analysis, in accordance with embodiments of the present invention.

FIG. 27 is an exemplary on-screen GUI 2700 showing the manner in which the dimensions associated with the alert filters in FIG. 26 may be automatically applied to the metric events data set for further analysis, in accordance with embodiments of the present invention. In an embodiment, the alert filters may be used to automatically populate queries executed against the metric events or the full-fidelity data set. A Troubleshooting view 2702, for example, may be configured using the metric events data set and may, among other things, illustrate a service graph 2708 computed using the metric events data set.

For example, as shown in GUI 2700, the user is able to view a service graph 2708 filtered by dimensions pertaining to the error (e.g. metadata and dimensional details 2626). As seen in GUI 2700, the service graph 2708 is displayed filtered by the dimension "lab0" 2704, which was associated with the alert from FIG. 26 (e.g., metadata and dimensional details 2626). The cluster tag with the value "lab0" is a global tag and upon selecting the Troubleshooting view 2622 in FIG. 26, the user is automatically directed to the Troubleshooting view 2702 with the dependency graph filtered by the cluster tag. Because the metric events modality can comprise higher-cardinality metrics information (e.g. a higher number of tags may be indexed for the metric events data set as compared to the dimensions associated with the metric time series), the user is able to conduct a more in-depth analysis related to the anomalous behavior in an attempt to determine what caused the performance to deteriorate. For example, the user may determine what service the alert was associated with and can use the data provided in the Troubleshooting view 2702 to determine what other services are dependent on the offending service.

In an embodiment, the user is able to query and filter the metrics event data set by the additional dimensions and metadata indexed as part of the metric events and receive further information about each offending service or operation during troubleshooting. For example, if a user does not have an alert configured for a particular customer, but the user observes that latency associated with a given operation is high, the user may be able to analyze the metric events data set. The metrics event data set may have indexed tags corresponding to a customer name and type that may provide the user additional information to understand the anomalous behavior.

In an embodiment, the user may also be able to query and filter the metric events data set by additional tags that were not indexed initially. For example, as discussed above, the exemplary Trace IDs stored as part of the metric events data set allows a user to retrieve traces and conduct further queries to gather information regarding both indexed and unindexed tags. This provides the user with additional flexibility in investigating the metric events data set in response to a triggered alert.

In one embodiment, if the error which was alerted on is associated with a particular edge or dependency in the service graph, the edge may be highlighted in the service graph. Similarly, if the reported alert is associated with a path (comprising two or more edges), the path may be highlighted within the service graph. In an embodiment, the user may be given an option to receive further information by selecting and interacting with a particular offending infrastructure element (e.g., a node or dependency) related to the error on a service graph.

Embodiments of the present invention advantageously allow a user to derive further information regarding end user impact. Typically, in conventional analysis systems, if a computed metric changes significantly, the analysis system is not able to provide further information regarding end user impact for the associated metric. The multiple modalities of analysis provided by the monitoring platform in accordance with embodiments of the present invention allows a user to easily extract more structured information from the other more detailed modalities, e.g., full-fidelity or metric events. For example, the user may be able to retrieve exemplar traces associated with the alert from the metric events data set and tie the change in a monitored metric to an exemplary trace. Using a service graph and the exemplary trace, the user can then also correlate the incident with other related incidents in the vicinity of the trace, e.g., to determine if the offending incident was actually being caused by a service downstream from the service that generated the alert. Embodiments of the present invention, therefore, advantageously provide the user with a more structured experience for troubleshooting an alert and enable a user to make an in-depth investigation of the end user impact of the incident that formed the basis for the alert.

The GUI 2700 also comprises an error panel 2714 and latency panel 2716, which contain information filtered by the dimensions and metadata alerted in FIG. 26. The information in both error panel 2714 and latency panel 2716 is derived from the data set associated with the metric events. As mentioned earlier, metric events comprise additional higher cardinality metrics data and exemplary trace information that allows the user to perform a deeper investigation pertaining to the alert. Latency panel 2716 provides a user with an option to select "top tags in long traces," the information for which is retrieved using the exemplar traces stored as part of the metric events data set.

Referring back to FIG. 26, in an embodiment, the user is able to select option 2623 to perform an analysis directly on the traces associated with the spans connected to the alert. The traces retrieved for a user to inspect may, in one embodiment, be drawn from the data set associated with the full-fidelity modality. Referring to FIG. 27 again, in an embodiment, a user may be able to obtain the full trace view directly from GUI 2700 by selecting option 2768.

Figure 28:
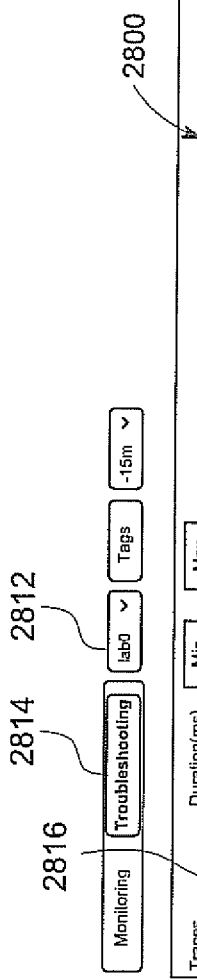
FIG. 28 is an exemplary on-screen GUI showing the manner in which the dimensions associated with the alert filters in FIG. 21 may be automatically applied to the full-fidelity data set for further analysis, in accordance with embodiments of the present invention.

FIG. 28 is an exemplary on-screen GUI 2800 showing the manner in which the dimensions associated with the alert filters in FIG. 28 may be automatically applied to the full-fidelity data set for further analysis, in accordance with embodiments of the present invention.

In an embodiment, alert filters may be used to automatically populate queries executed against the full-fidelity data set. A Troubleshooting view 2814, for example, may be associated with the full-fidelity data set and may, among other things, provide a list of traces (with Trace IDs 2816) associated with the alert for a user to perform further exploration.

As seen in GUI 2800, only those traces are displayed that are associated with the dimension "lab0" 2812, which was associated with the alert from FIG. 26. The cluster tag with the value "lab0" is a global tag and upon selecting the Troubleshooting view 2814 in FIG. 28, the user is automatically directed to GUI 2800 with the traces filtered by the cluster tag "lab0."

Figure 29:
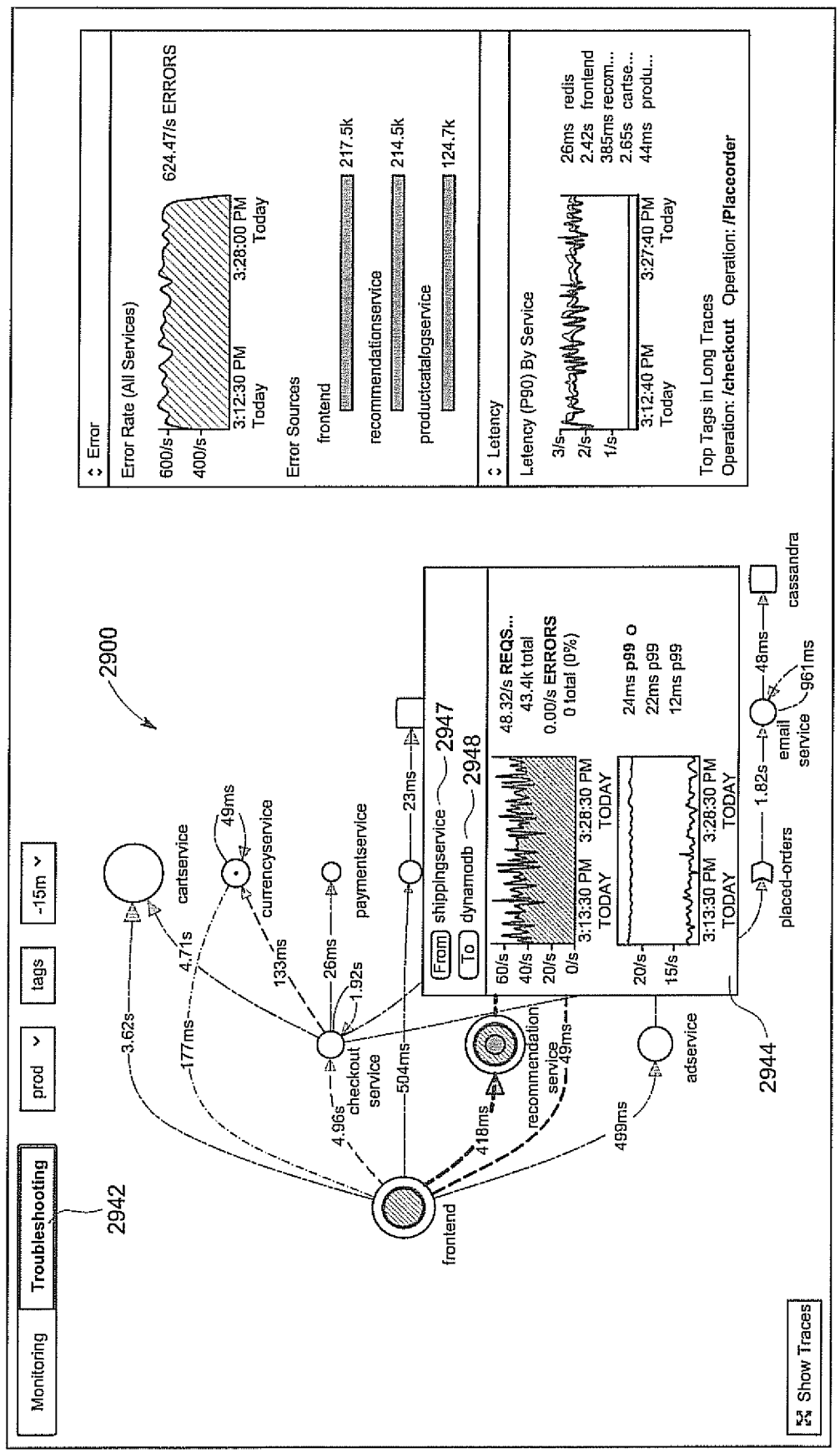
FIG. 29 is an exemplary on-screen GUI 2900 illustrating a troubleshooting mode comprising a dependency graph on which alerts may be annotated, in accordance with embodiments of the present invention.

FIG. 29 is an exemplary on-screen GUI illustrating a troubleshooting mode comprising a dependency graph on which alerts may be annotated, in accordance with embodiments of the present invention. In one embodiment, a user may be able to navigate to a troubleshooting view 2942 that will provide further details regarding the various endpoints and dependencies in the application. In an embodiment, the troubleshooting interface may be based on data from the metric events data set. The troubleshooting interface may allow a user to filter the nodes and edges by a number of dimensions. Further, the user may be able to select an edge that may be associated with an offending endpoint and review various metrics pertaining to the edge in a pop-up window 2944. For example, an alert may be associated with an error relating to a call from the shippingservice 2947 to the dynamodb 2948. The user may be able to review the statistics associated with the call to glean further information related to the alert.

In an embodiment, if an alert is triggered, details regarding the alert (not shown) may automatically be annotated on a service graph 2900 under the Troubleshooting view 2942. Using the dimensions and metadata associated with the alert, the user would then be able to engage in a more rigorous investigation in troubleshooting mode with additional resolution provided by the metric events modality.

In an embodiment, metadata associated with an alert may be used to identify additional dimensions associated with the alert using a higher fidelity data set, e.g., the metric events data set. For example, additional dimensions pertaining to an offending service or operation that is associated with the alert may be identified using the metric events data set. These additional dimensions may then be tracked (e.g., by a user and/or automatically based on a recurrence over one or more time periods) to conduct a more in-depth investigation of the alert. For example, the additional dimensions may be incorporated into a span identity (using the keyValueMap field in an extended span identity) and metrics pertaining to the additional dimensions may be computed and/or streamed as part of the metric time series data.

6.0 Analyzing Tags Associated with High-Latency and Error Spans for Instrumented Software As indicated above, a span is an atomic unit of instrumented code, and comprises at least an operation name (e.g., get_price) and service (e.g., widget_database). Spans may also be annotated with additional tags (key:value pairs) that provide further context regarding the execution environment, e.g., "customer:A", if code is instrumented to attach the user/customer making a request; "document:id_9656", if this detail is attached to spans that analyze documents; and "host:worker_4", if one wishes to track the infrastructure used in servicing a request.

In an embodiment, a trace, by comparison, comprises the set of spans carried out in servicing a single request, and its duration is the total time elapsed between the initiating request and its completion.

6.1 Analyzing Tags Associated with High-Latency Spans (Latency Analyzer)

As also discussed earlier, a reporting system 750 of FIG. 7 may be configured to generate a histogram to analyze generated spans and traces. In an implementation, the reporting system 750 may include a histogram generator 740 that interacts with the instrumentation analysis system 700 to generate a histogram.

In one embodiment, the histogram is generated based on up to 100% of incoming spans that are ingested by the analyzer (e.g., the analyzer 930 in FIG. 9). In this embodiment, the gateway 910 does not select or sample traces, instead, up to 100% or all the incoming spans are ingested into the monitoring platform. In one embodiment, the histogram is generated using data from either the metric events data set or the full-fidelity data set.

In one embodiment, the analyzer 930 comprises a latency analyzer, which may be configured to uncover patterns relating trace tags to trace durations (e.g., the histogram/distribution of trace durations), and thereby highlight possible explanations for degraded system performance (or slowness in steady state). For example, the histogram associated with patterns relating trace tags to trace durations may allow an application owner to determine whether slow and longer duration traces are associated with a particular customer (whose requests may be unusually large or somehow malformed). By way of further example, the histogram may also enable an application owner or developer to determine if slower traces tend to pass through the same possibly overloaded or misconfigured infrastructure.

Once ingested, the analyzer 930 may be configured to compare durations of a set of similar spans (e.g., spans for the same type of request) or traces with the tags associated with the respective spans or traces. Similar spans, which are related to each other, may, for example, be associated with one or more of a same type of request, a same service name, a same operation name, a same 'kind' value, a same client, etc. Similar traces, which are also related to each other, may, for example, be associated with one or more of a same type of request, same types of operations or services, same type of customer, etc. The analyzer 930 may then determine whether there are any patterns for a given tag. The analysis system generates a histogram that represents a distribution of durations for a set of spans or traces. While the discussion herein may reference generating histograms for either spans or traces, it should be noted that the histogram may be generated for either spans or traces. The histogram may, for example, be generated to analyze tags associated with spans for a particular type of request. Alternatively, the histogram may be generated at a higher level of detail to analyze tags associated with traces for a particular customer or type of request. For a given tag, the analyzer 930 may calculate a p-value indicating a likelihood that the ranks of the spans (or traces) for that tag in the distribution arose by chance.

The ranks of the spans refer to the location in the overall population of spans (or traces) being analyzed, sorted by duration. For example, the shortest duration span may have rank 0, the next shortest span may have rank 1, and the longest duration span may have rank (number of items–1). The ranks of items with a given tag may generally be towards the high end when spans (or traces) with that tag take longer than those without. The p-value is the probability that a particular arrangement of ranks (for spans with or without the tag) would arise assuming the tag has no influence on the duration distribution (e.g., the distributions with or without the tag are the same). In other words, the p-value indicates how likely it is that this outcome is due to chance alone (randomness associated with drawing from the same distribution). The p-value being small is viewed as evidence that the null hypothesis (e.g., durations with or without the tag come from the same distribution) should be rejected.

In an implementation, the analyzer 930 may calculate a Mann-Whitney U-statistic p-value that compares the ranks of the durations of the traces having the tag to the other traces in the distribution. For example, a larger U-statistic indicates that the spans for that tag skew rightward (e.g., that they tend to have long durations relative to other spans in the distribution).

The analyzer 930 may also be configured to provide alerts regarding the tags whose spans have a relatively long duration. This is because long duration spans may be indicative of configuration problems at the instrumented systems. As mentioned earlier, in some embodiments, the analyzer 930 can also be configured to provide alerts regarding tags with associated traces that have longer durations.

The analyzer 930 may correct the p-value for the number of hypotheses tested. For example, the analyzer 930 may be configured to multiply the p-value by the total number of tags. In this way, a mapping of tags to non-negative real numbers may be defined. The analyzer 930 may then sort the tags by the associated p-value (e.g., in ascending order) and returns those with p-value less than or equal to a pre-defined threshold (e.g., 0.01).

In one embodiment, the alerts regarding the tags whose spans (or traces) have a relatively long duration may be configured in a way similar to the manner discussed in connection with FIGS. 25A-25D. In one embodiment, once an alert is triggered (e.g., similar to the manner discussed in connection with FIGS. 25E and 26), the tags and other metadata associated with the alert may be used to automatically query a data set associated with one or more modalities, e.g., the metric events data set or the full-fidelity data set. By retaining sessionized trace data as metric events or full-fidelity data, the monitoring service ensures that spans and traces associated with executions which exemplify problems related to latency, for example, will be retained for further inspection and analysis. The metric events data set, for example, may be scoped by a time range determined by the alert. Further, the metric events data set may be explored for further information pertaining to the alert, e.g., reviewing a service graph where an execution path related to high latency may be highlighted. Because the metric event data set stores exemplar Trace IDs as explained above, the unindexed tags may also be analyzed in addition to the indexed tags to determine which tags are associated with spans with relatively long durations. Additionally, in one embodiment, the full-fidelity data set may be explored to discover all traces associated with tags that have a relatively long duration. In an embodiment, a user may be provided a GUI (e.g., an alert modal similar to the one illustrated in FIG. 26) that comprises links (e.g., similar to options 2626, 2623, etc.) to metric events and full-fidelity explorers with filters associated with the alerts applied.

As discussed previously, FIG. 10 illustrates a generated histogram 1000 for analysis of spans and traces, according to an embodiment of the present disclosure. The histogram 1000 may be generated by querying stored traces through a user interface. As shown, the histogram 1000 illustrates latencies of the traces in a given time period. For example, the histogram 1000 may be right-skewed.

In one embodiment, the histogram may be generated based on an arbitrary set of spans or traces expressible as a result set of a query. These set of spans or traces may be obtained from, for example, the full-fidelity data set by executing a specified query.

For example, the arbitrary set of traces for generating the histogram may also be extracted by using the exemplary Trace IDs stored as part of the metric event data set. In one embodiment, generating the histogram using the exemplar traces stored in the metric event data set may yield faster results as compared to using the full-fidelity data set. Whether the histogram is generated using the exemplar traces retrieved using the Trace IDs in the metric events data set or traces retrieved from the full-fidelity data set, all the tags (both indexed and non-indexed) in the traces may be analyzed using either data set. The exemplary traces retrieved using the Trace IDs in the metric events data contain information regarding both indexed and non-indexed tags, which may be used to generate the histogram.

In addition to generating the histogram directly from spans and traces, in one or more embodiments, the histogram may be generated using metric events themselves, e.g., information expressed in the tables shown in, for example, FIGS. 23B and 23C. Because indexed tags are stored as part of the rows for the metric events data set as illustrated in FIGS. 23B and 23C, the histogram may be generated directly using the indexed tags. In an embodiment, unindexed tags may also be analyzed using the histogram, where information regarding the unindexed tags is obtained by retrieving exemplary traces associated with the Trace IDs stored in the metric events data set. It should be noted, however, that the histogram may be more accurate if it comprises information pertaining to indexed tags only because the metric events comprise counts per latency bucket (e.g., counts for latency 2311 in FIG. 23B). Results related to unindexed tags (which are approximate, because only exemplary traces are stored as part of the metric events data set), may be less accurate than results associated with the indexed tags.

As discussed above, each trace is comprised of multiple spans, and each span may include tags (e.g., key:value pairs) that provide information regarding characteristics of the span (e.g., such as what hosts the span ran on, or the user that made the request). For each trace, all of the tags on all of the spans that make up that trace may be accumulated. A comparison may then be made between traces containing a specific tag with traces not containing the specific tag. For example, distributions of traces containing the specific tag may be compared with distributions not containing the specific tag to determine a difference between the distributions. A statistic may be calculated based on the determined difference for each comparison. The calculated statistics may then be compared with each other to determine which tags 1010 are most overrepresented on the right hand side of the distribution. For example, it may be determined that the presence of these tags 1010 (e.g., for traces that took longer than a second) correlate to a particular host or were requests made by a particular user. With this information, steps may be taken to remedy the appropriate characteristic.

As noted previously, according to embodiments, the histogram 1000 uncovers patterns relating trace tags to trace durations (e.g., the histogram/distribution of trace durations), and thereby highlights possible explanations for degraded system performance (or slowness in steady state). For example, the histogram 1000 may be utilized to explain whether slow (e.g., longer duration) traces come from a particular customer, whose requests might be large or somehow malformed. The histogram may also be utilized to explain whether the slow traces tend to pass through the same (e.g., possibly overloaded or misconfigured) infrastructure. As mentioned previously, the histogram may also uncover patterns relating span tags to span durations.

In an implementation, an algorithm for analyzing the tail-based samples of spans and traces may be as follows:

(1) Given a collection of traces, associate with each trace the tags of all its constituent spans. This may be represented as a multimap of {key: {values}} because different spans in the same trace may have different values for the same key. For example, in a microservices environment, a trace will typically traverse many hosts.

(2) For every tag k:v, T(k:v) is defined to be those traces containing the tag on some span (i.e., the value v is in the set associated with the key k).

(3) For each tag, the p-value of the Mann-Whitney U-statistic is computed comparing the ranks of the durations of the traces in T(k:v) (traces containing the tag) to the ranks of the durations of its complement (traces not containing the tag). A larger U-statistic corresponds to a smaller p-value, which corresponds to more rightward skew. This means traces with the tag are overrepresented among the slower traces. The statistic can be viewed as a measure of stochastic dominance. The p-value for the number of hypotheses tested is corrected, for example by multiplying the p-value by the total number of tags. In other embodiments, different statistics besides the Mann-Whitney U-statistic may also be used.

(4) Altogether the procedure of the preceding paragraph defines a map from tags to non-negative real numbers. The tags are sorted by the associated p-value (in ascending order) and those with p-value less than or equal to a pre-defined threshold (e.g., 0.01) are returned.

The methodology discussed above may also be applied to spans directly. According to embodiments, this computer implemented algorithm may be integrated into a user interface that supports querying for and visualizing of trace data. The result is a list of tags, sorted by how overrepresented they are among the slower traces. The results can easily be used as filters to further refine the trace query. In particular, the procedure can be applied iteratively (e.g., using the first result until a certain dataset size is reached).

In an embodiment, the identified tags may be used to populate queries automatically against one or more data sets, e.g., metric events or full-fidelity. For example, if a tag associated with a particular customer is identified, the tag may be used as a filter to be executed against the metric events or the full-fidelity data set. A Troubleshooting View, similar to Troubleshooting View 2702 shown in FIG. 27 may be automatically configured with the filters associated with the customer tag automatically applied. In an embodiment, a GUI may be presented to a user including a service graph (similar to service graph 2708 in FIG. 27) filtered by the customer tag. The high-latency path associated with the offending customer may be highlighted in the service graph. A user may also be presented with information pertaining to other related indexed tags and non-indexed tags associated with the identified customer tag, where the information is obtained from either the metric events or full-fidelity data set. For example, information pertaining to non-indexed tags may be obtained from the metric events data set by using the exemplary Trace IDs. In one embodiment, a user may be able to query exemplary traces comprising the customer tag in an interface similar to the one shown in FIG. 28, where the traces are retrieved from the full-fidelity data set.

As mentioned previously, the computer implemented procedure (comprising steps (1) to (4) discussed above) can be applied iteratively (e.g., using the first result until a certain dataset size is reached). For example, the result set of a query "q" may result in a set of traces. The procedure first finds tags k1:v1 associated with higher latency. The resultant tags, in one embodiment, may be selectable or "clickable" (e.g., through a GUI), wherein selecting the tags adds them to the query. The query is re-executed to provide the set resulting from a subsequent query that includes the initial query (e.g., "q and k1:v1"). The analysis procedure may then be run again on the set finding k2:v2. Selecting these results may then add them to another query (e.g., "q and k1:v1 and k2:v2"). In one embodiment, the procedure can be applied iteratively for both traces and metric events. In an embodiment, the iteration may also cross modalities, e.g., q may be executed on metric events and subsequent queries thereafter may be executed against the full traces from the full-fidelity data set.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 30:
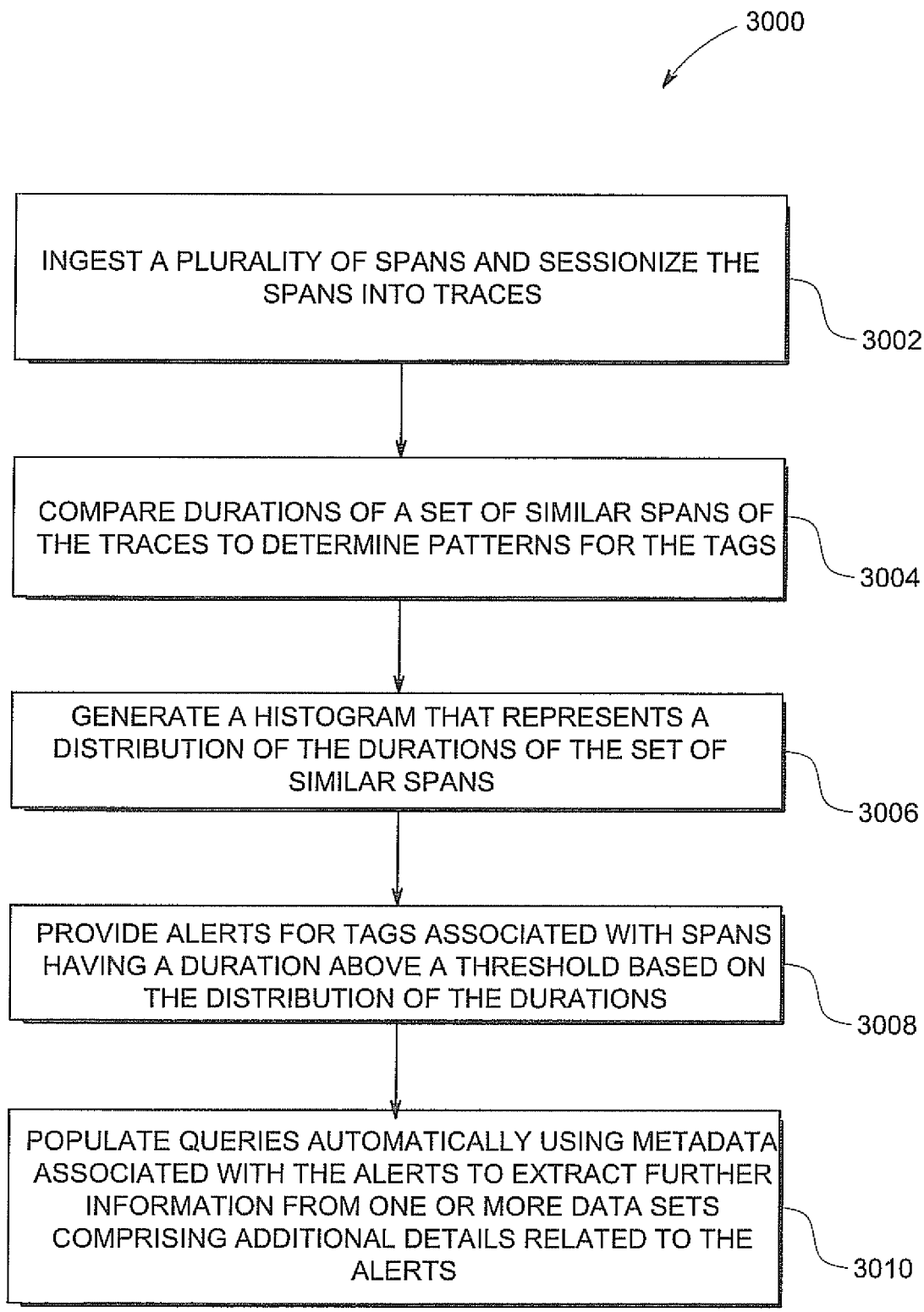
FIG. 30 is a flow diagram illustrative of an embodiment of a process 3000 for analyzing tags associated with high latency spans and traces for instrumented software, according to embodiments of the present disclosure.

FIG. 30 is a flow diagram illustrative of an embodiment of a computer implemented process 3000 for analyzing tags associated with high latency spans and traces for instrumented software, according to embodiments of the present disclosure. For explanatory purposes, the steps of the example process 3000 are described herein as occurring in serial, or linearly. However, multiple instances of the example process 3000 may occur in parallel.

At step 3002, incoming spans are received from client devices and sessionized into traces. The sessionized traces may include spans associated with tags. At step 3004, durations of a set of similar traces of the selected traces are compared to determine patterns for the tags. At step 3006, a histogram is generated that represents a distribution of the durations of the set of similar traces. At step 3008, alerts are provided for tags associated with traces having a duration above a threshold based on the distribution of the durations. At step 3010, metadata and dimensions associated with the alert may be used to automatically populate and execute queries to extract further information from one or more additional data sets associated with different modalities of analysis, e.g., metric events and/or full-fidelity. It should be noted that the procedure illustrated in FIG. 30 may also be applied directly to a set of similar spans of the incoming spans to generate the histogram.

In an implementation, an analyzer (e.g., analyzer 930 of FIG. 9) resident within a monitoring platform (e.g., a monitoring platform implemented as a SaaS on a cloud architecture) may be configured to compare durations of similar spans (or traces) to determine patterns for tags of the spans. The analyzer may further be configured to generate a histogram (e.g., histogram 1000 of FIG. 10) that represents a distribution of durations for the similar spans (or traces). The analyzer may further be configured to generate alerts based on tags associated with the spans to improve performance of the instrumented software.

According to embodiments, the process 3000 further includes partitioning a set of spans based on at least one of an operation, a service, or an error, and partitioning a set of traces by at least one of an initiating span, an initiating service, or an HTTP method. According to embodiments, the process 3000 further includes calculating a score for each received span or trace.

According to embodiments, the process 3000 further includes defining a duration of each trace based on a dynamic timeout mechanism, the dynamic timeout mechanism including a fixed duration and a variable duration, the variable duration calculated based on durations of other traces. According to embodiments, the process 3000 further includes defining the duration of each trace based on a longer of the fixed duration and the variable duration.

According to embodiments, the process 3000 further includes calculating a Mann-Whitney U-statistic p-value to compare ranks of durations of traces having a specific tag to other traces in the distribution. According to embodiments, the process 3000 further includes sorting the tags by an associated p-value, and identifying tags with p-values less than or equal to a pre-defined threshold.

6.2 Analyzing Tags Associated with Error Spans (Error Analyzer)

In addition to extracting and analyzing tags associated with high latency, embodiments of the present invention also extract tags associated with errors. An instrumentation analysis system 700 or a reporting system 750 of FIG. 7 may, for example, be configured to extract and report tags associated with error spans.

According to embodiments, the analyzer 930 comprises an error analyzer, which may be configured to uncover patterns relating span tags to error spans, which are spans that cause an error or an exception to be thrown. This can highlight possible explanations for errors and help users understand patterns among errors. For example, the analyzer 930 may determine if error spans tend to come from a particular user (e.g., whose requests might be somehow malformed).

To analyze such errors, the analyzer 930 may compute, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analyzer 930 may correct the p-value for the number of hypotheses tested, for example by multiplying the p-value by the total number of tags. This procedure defines a map from tags to non-negative real numbers. The analyzer 930 sorts the tags by the associated p-value (in ascending order) and returns those with p-value less than or equal to a pre-defined threshold (e.g., 0.01).

Note that in some embodiments, the analyzer 930 may conduct the same procedure at the trace level. The analyzer 930 may, therefore, compute patterns relating tags to errors at the trace level. Patterns may be examined for tags appearing anywhere in the trace to errors occurring within the trace.

According to embodiments, the statistic besides a chi-squared statistic, the statistic may comprise a hypergeometric p-value, a likelihood ratio test, a t-test or a, Fisher's exact test/hypergeometric p-value, etc.

In one embodiment, alerts may be configured as associated with tags that are more common among error spans. The alerts may be configured in a way similar to the manner discussed in connection with FIGS. 25A-25D. In one embodiment, once an alert is triggered (e.g., similar to the manner discussed in connection with FIGS. 25E and 26), the tags and other metadata associated with the alert may be used to automatically query a data set associated with one or more modalities, e.g., the metric events data set or the full-fidelity data set. By retaining sessionized trace data as metric events or full-fidelity data, the monitoring service ensures that spans and traces associated with executions that result in errors, for example, will be retained for further inspection and analysis. The metric events data set, for example, may be scoped by a time range determined by the alert. Further, the metric events data set may be explored for further information pertaining to the alert, e.g., reviewing a service graph where an execution path related to an error may be highlighted. Because the metric event data set stores exemplar Trace IDs as explained above, the unindexed tags may also be analyzed in addition to the indexed tags to determine which tags are associated with error spans. Additionally, in one embodiment, the full-fidelity data set may be explored to surface all traces associated with error spans. In an embodiment, a user may be provided a GUI (e.g., an alert modal similar to the one illustrated in FIG. 26) that comprises links (e.g., similar to options 2626, 2623, etc.) to metric events and full-fidelity explorers with filters associated with the alerts applied.

In one embodiment, tags associated with p-values less than or equal to a pre-defined threshold may be used to automatically populate queries executed against the metric events or full-fidelity data set to surface information pertaining to the tags, which the user can inspect to conduct further analysis. In an embodiment, tags associated with p-values less than or equal to a pre-defined threshold are used as a starting point to conduct a detailed calculation or computation on a more carefully scoped set of metric events or trace data.

In an embodiment, the error analyzer may analyze both indexed and non-indexed tags, e.g., from a metric events data set. The indexed tags are stored as part of the rows for the metric events data set (e.g., as shown in FIGS. 23B and 23C) and, accordingly, the analysis can be conducted on the metric events directly. For non-indexed tags, the Trace IDs stored within the metric events data set may be used to retrieve exemplary traces on which the analysis may be conducted. Note, that for error analysis, the results can be calculated exactly on the indexed tags (since complete information is present in the metric events). For non-indexed tags, using exemplars allows for an approximation of the error analysis.

Figure 31:
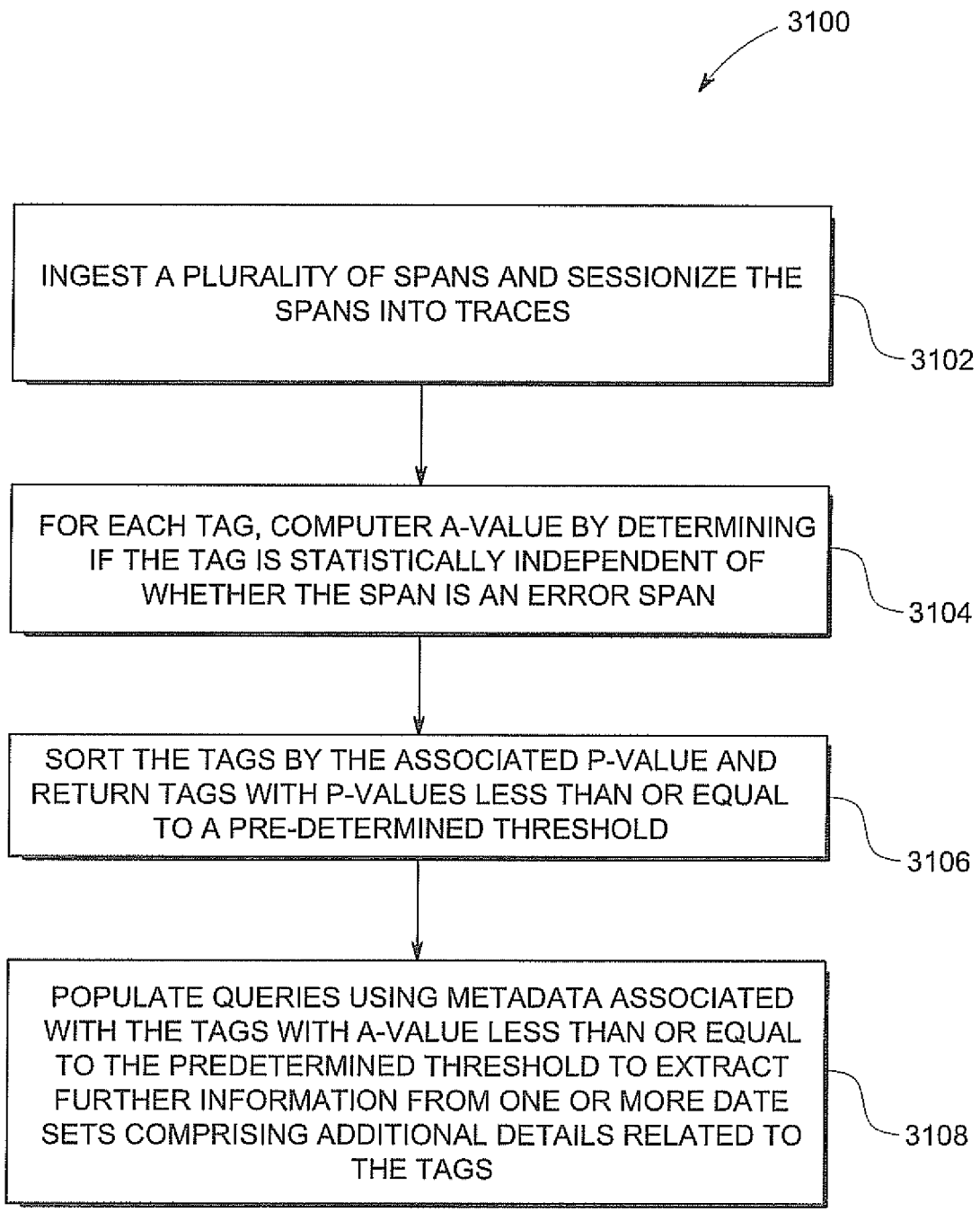
FIG. 31 is a flow diagram illustrative of an embodiment of a process 3100 for analyzing tags associated with error spans for instrumented software, according to embodiments of the present disclosure.

FIG. 31 is a flow diagram illustrative of an embodiment of a computer implemented process 3100 for analyzing tags associated with error spans for instrumented software, according to embodiments of the present disclosure. For explanatory purposes, the steps of the example process 3100 are described herein as occurring in serial, or linearly. However, multiple instances of the example process 3100 may occur in parallel.

At step 3102, incoming spans are received from client devices and sessionized into traces. The sessionized traces may include spans associated with tags. At step 3104, for each tag, the analyzer 930 computes the chi-squared statistic (or other comparable statistic) for the null hypothesis that the presence of the tag is statistically independent of whether the span (or trace) is an error. The analyzer may correct the p-value for the number of hypotheses tested, for example by multiplying the p-value by the total number of tags. This procedure defines a map from tags to non-negative real numbers. At step 3106, the analyzer 930 sorts the tags by the associated p-value (in ascending order) and returns those with p-value less than or equal to a pre-defined threshold (e.g., 0.01). At step 3108, the metadata associated with tags with p-value less than or equal to the threshold is used to conduct a deeper analysis of one or more other data sets, e.g., a metric events or high-fidelity data set. In an embodiment, metadata associated with the tags may be used to automatically populate and execute queries to extract further information from one or more additional data sets, e.g., metric events and/or full-fidelity.

7.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components of the data intake and query system 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 by managing computing resources configured to implement various aspects of the system (e.g., search head 210, indexers 206, etc.) and by providing access to the system to end users via a network.

When implemented as a cloud-based service, various components of the system 108 can be implemented using containerization or operating-system-level virtualization, or other virtualization technique. For example, one or more components of the system 108 (e.g., search head 210, indexers 206, etc.) can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of analyzing spans and traces associated with a micro services-based application executing in a distributed computing environment, the method comprising:
    aggregating a plurality of ingested spans associated with one or more applications executing in the distributed computing environment into a plurality of traces, wherein each trace of the plurality of traces comprises one or more of the plurality of ingested spans comprising a same trace identifier, wherein each of the plurality of ingested spans is annotated with a plurality of tags, wherein each tag of the plurality of tags is associated with a tag attribute and a corresponding value, wherein each tag corresponds to a context pertaining to an execution environment associated with a respective span, and wherein at least one tag associated with an ingested span of the plurality of ingested spans comprises dependency information between spans in an associated trace;
    comparing durations of a set of related traces of the plurality of traces to determine patterns for the plurality of tags;
    generating a histogram representing a distribution of the durations of the set of related traces;
    providing alerts for a tag from the plurality of tags associated with traces having a duration above a threshold based on the distribution of the durations
    retrieving additional information associated with the alerts by querying a data set using the tag; and
    annotating the additional information associated with the alerts on a dependency graph rendered for display in a graphical user interface, wherein edges for the dependency graph are rendered based on the dependency information.
2. The computer-implemented method of claim 1, wherein traces in the set of related traces are related by at least one of: a same type of request, a same type of operation, a same type of service, or a same type of customer.

3. The computer-implemented method of claim 1, further comprising:
    wherein the data set is associated with an analysis modality of a plurality of analysis modalities, and wherein each analysis modality from the plurality of analysis modalities extracts a different level of detail from the plurality of ingested spans.
4. The computer-implemented method of claim 1, wherein the data set is associated with an analysis modality of a plurality of analysis modalities, wherein the plurality of analysis modalities comprises a first analysis modality and a second analysis modality, wherein the first analysis modality is associated with computing metrics associated with services in the microservices-based application using information extracted from indexed tags associated with the plurality of traces, and wherein the second analysis modality is associated with analyzing raw trace data associated with the plurality of traces.
5. The computer-implemented method of claim 1, wherein the data set is associated with an analysis modality of a plurality of analysis modalities, wherein the plurality of analysis modalities comprises a first analysis modality and a second analysis modality, wherein the first analysis modality is associated with a functionality of sampling traces to extract information associated with indexed and non-indexed tags from the plurality of traces, and wherein the second analysis modality is associated with analyzing raw trace data associated with the plurality of traces.
6. The computer-implemented method of claim 1, wherein the traces having a duration above the threshold associated with the tag are highlighted in the graphical user interface.
7. The computer-implemented method of claim 1, wherein the traces having a duration above the threshold associated with the tag are highlighted in the graphical user interface, and wherein the dependency graph is filtered in accordance with metadata associated with the tag.
8. The computer-implemented method of claim 1, further comprising calculating a Mann-Whitney U-statistic p-value to compare ranks of durations of traces of the plurality of traces comprising the tag to other traces in the distribution.
9. The computer-implemented method of claim 1, further comprising:
    determining p-values for each of the plurality of tags;
    sorting the plurality of tags by an associated p-value; and
    identifying tags from the plurality of tags with p-values less than or equal to a pre-defined threshold.
10. The computer-implemented method of claim 1, wherein the generating comprises generating the histogram using a data set for an analysis modality comprising metrics computations for a combination of services in the microservices-based application and indexed tags associated with the plurality of traces.
11. The computer-implemented method of claim 1, wherein the generating comprises generating the histogram using a data set for an analysis modality comprising exemplary traces associated with a combination of services in the microservices-based application and indexed tags associated with the plurality of traces.
12. The computer-implemented method of claim 1, wherein the generating comprises generating the histogram using a data set for an analysis modality associated with storing and analyzing raw trace data for the plurality of traces.

13. The computer-implemented method of claim 1, further comprising:
for each tag of the plurality of tags, determining a p-value by computing whether the tag is statistically independent of whether an associated span is an error span;
sorting the plurality of tags by an associated p-value; and
for each tag less than or equal to a predetermined threshold p-value, retrieving additional information pertaining to the tag by querying a data set using metadata associated with the tag.

14. The computer-implemented method of claim 1, further comprising:
for each tag of the plurality of tags, determining a p-value by computing whether the tag is statistically independent of whether an associated span is an error span by using at least one of: a chi-squared statistic, a hypergeometric p-value, a likelihood ratio test, a t-test, or a Fisher's exact test/hypergeometric p-value;
sorting the plurality of tags by an associated p-value; and
for each tag less than or equal to a predetermine threshold p-value, retrieving additional information pertaining to the tag by querying a data set using metadata associated with the tag.

15. A system for analyzing spans and traces associated with a micro services-based application executing in a distributed computing environment, the system comprising:
at least one memory having instructions stored thereon; and
at least one processor configured to execute the instructions, wherein the at least one processor is configured to:
aggregate a plurality of ingested spans associated with one or more applications executing in the distributed computing environment into a plurality of traces, wherein each trace of the plurality of traces comprises one or more of the plurality of ingested spans comprising a same trace identifier, wherein each of the plurality of ingested spans is annotated with a plurality of tags, wherein each tag of the plurality of tags is associated with a tag attribute and a corresponding value, wherein each tag corresponds to a context pertaining to an execution environment associated with a respective span, and wherein at least one tag associated with an ingested span of the plurality of ingested spans comprises dependency information between spans in an associated trace;
compare durations of a set of related traces of the plurality of traces to determine patterns for the plurality of tags;
generate a histogram representing a distribution of the durations of the set of related traces; and
provide alerts for a tag from the plurality of tags associated with traces having a duration above a threshold based on the distribution of the durations
retrieve additional information associated with the alerts by querying a data set using the tag; and
annotate the additional information associated with the alerts on a dependency graph rendered for display in a graphical user interface, wherein edges for the dependency graph are rendered based on the dependency information.

16. The system of claim 15,
wherein traces in the set of related traces are related by at least one of: a same type of request, a same type of operation, a same type of service, or a same type of customer.

17. The system of claim 15,
wherein the data set is associated with an analysis modality of a plurality of analysis modalities, and wherein each analysis modality from the plurality of analysis modalities extracts a different level of detail from the plurality of ingested spans.

18. The system of claim 15,
wherein the data set is associated with an analysis modality of a plurality of analysis modalities, wherein the plurality of analysis modalities comprises a first analysis modality and a second analysis modality, wherein the first analysis modality is associated with computing metrics associated with services in the microservices-based application using information extracted from indexed tags associated with the plurality of traces, and wherein the second analysis modality is associated with analyzing raw trace data associated with the plurality of traces.

19. A non-transitory computer-readable storage medium comprising instructions stored thereon, which when executed by one or more processors, cause the one or more processors to perform operations for analyzing spans and traces associated with a micro services-based application executing in a distributed computing environment, comprising:
aggregating a plurality of ingested spans associated with one or more applications executing in the distributed computing environment into a plurality of traces, wherein each trace of the plurality of traces comprises one or more of the plurality of ingested spans comprising a same trace identifier, wherein each of the plurality of ingested spans is annotated with a plurality of tags, wherein each tag of the plurality of tags is associated with a tag attribute and a corresponding value, wherein each tag corresponds to a context pertaining to an execution environment associated with a respective span, and wherein at least one tag associated with an ingested span of the plurality of ingested spans comprises dependency information between spans in an associated trace;;
comparing durations of a set of related traces of the plurality of traces to determine patterns for the plurality of tags;
generating a histogram representing a distribution of the durations of the set of related traces;
providing alerts for a tag from the plurality of tags associated with traces having a duration above a threshold based on the distribution of the durations
retrieving additional information associated with the alerts by querying a data set using the tag; and
annotating the additional information associated with the alerts on a dependency graph rendered for display in a graphical user interface, wherein edges for the dependency graph are rendered based on the dependency information.

20. The non-transitory computer-readable storage medium of claim 19,
wherein traces in the set of related traces are related by at least one of: a same type of request, a same type of operation, a same type of service, or a same type of customer.

* * * * *